United States Patent
Li et al.

(10) Patent No.: US 11,696,018 B2
(45) Date of Patent: *Jul. 4, 2023

(54) METHOD FOR DISPLAYING IMAGE IN PHOTOGRAPHING SCENARIO AND ELECTRONIC DEVICE

(71) Applicant: Huawei Technologies Co., Ltd., Shenzhen (CN)

(72) Inventors: Yuanyou Li, Oerlikon (CH); Bin Hu, Shanghai (CN); Yongxing Yang, Shenzhen (CN); Wei Luo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,706

(22) Filed: Dec. 7, 2021

(65) Prior Publication Data

US 2022/0094859 A1 Mar. 24, 2022

Related U.S. Application Data

(63) Continuation of application No. 17/285,818, filed as application No. PCT/CN2018/110306 on Oct. 15, 2018, now Pat. No. 11,223,772.

(51) Int. Cl.
*H04N 23/63* (2023.01)
*H04N 5/76* (2006.01)
(Continued)

(52) U.S. Cl.
CPC ............ *H04N 23/632* (2023.01); *H04N 5/76* (2013.01); *H04N 23/611* (2023.01); *H04N 23/667* (2023.01); *H04N 23/84* (2023.01)

(58) Field of Classification Search
CPC ..................... H04N 5/232935; H04N 5/23245
See application file for complete search history.

(56) References Cited

U.S. PATENT DOCUMENTS

| 11,223,772 B2* | 1/2022 | Li ...................... H04N 5/23216 |
| 2003/0128379 A1* | 7/2003 | Inoue ....................... H04N 1/56 |
| | | 358/1.9 |

(Continued)

FOREIGN PATENT DOCUMENTS

| CN | 101828202 A | 9/2010 |
| CN | 103137096 A | 6/2013 |

(Continued)

OTHER PUBLICATIONS

U.S. Appl. No. 17/285,818, filed Apr. 15, 2021.

*Primary Examiner* — Christopher K Peterson
(74) *Attorney, Agent, or Firm* — Leydig, Voit & Mayer, Ltd.

(57) ABSTRACT

Disclosed herein is a method for generating an image using an electronic device having a color camera, comprising: activating the color camera and a camera application on the electronic device; displaying, through the camera application, a preview image generated by the color camera; determining, automatically, whether the preview image includes an image of a first object; displaying, through the camera application in response to a determination that the preview image includes the image of the first object, a first image generated by the color camera, the first image including a color region corresponding to the first object and a grayscale region corresponding to objects that are not the first object; and displaying, through the camera application in response to a determine that the preview image does not include any image of the first object, a second image generated by the color camera, the second image is a grayscale image.

18 Claims, 44 Drawing Sheets

(51) Int. Cl.
*H04N 23/611* (2023.01)
*H04N 23/667* (2023.01)
*H04N 23/84* (2023.01)
*H04N 23/62* (2023.01)
*H04N 23/80* (2023.01)
*H04N 23/60* (2023.01)
*H04N 9/75* (2006.01)

(56) References Cited

U.S. PATENT DOCUMENTS

| | | | |
|---|---|---|---|
| 2013/0148853 A1 | 6/2013 | Hwang et al. | |
| 2015/0373414 A1* | 12/2015 | Kinoshita | H04N 21/47205 386/282 |
| 2016/0073036 A1 | 3/2016 | Chen et al. | |
| 2017/0032725 A1 | 2/2017 | Li et al. | |
| 2017/0099476 A1 | 4/2017 | Kim et al. | |
| 2017/0134667 A1 | 5/2017 | Zhou et al. | |

FOREIGN PATENT DOCUMENTS

| | | |
|---|---|---|
| CN | 103618886 A | 3/2014 |
| CN | 104660905 A | 5/2015 |
| CN | 105118026 A | 12/2015 |
| CN | 105608668 A | 5/2016 |
| CN | 105812668 A | 7/2016 |
| CN | 105959554 A | 9/2016 |
| CN | 106101666 A | 11/2016 |
| CN | 106506962 A | 3/2017 |
| CN | 106791379 A | 5/2017 |
| CN | 106879263 A | 6/2017 |
| CN | 107170016 A | 9/2017 |
| CN | 107329573 A | 11/2017 |
| CN | 107730433 A | 2/2018 |
| CN | 107809580 A | 3/2018 |
| CN | 107835402 A | 3/2018 |
| CN | 107909553 A | 4/2018 |
| CN | 108182031 A | 6/2018 |
| CN | 108234826 A | 6/2018 |
| CN | 108605099 B | 10/2020 |
| EP | 2634772 A1 | 9/2013 |
| KR | 20140134844 A | 11/2014 |

* cited by examiner (a)

(b)

(a)

(b)

(a)

(b)

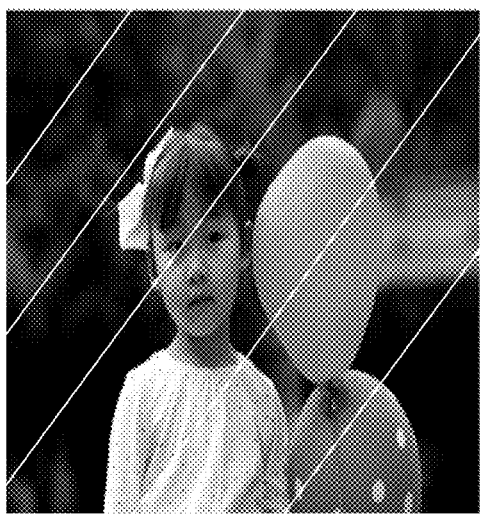
(a)
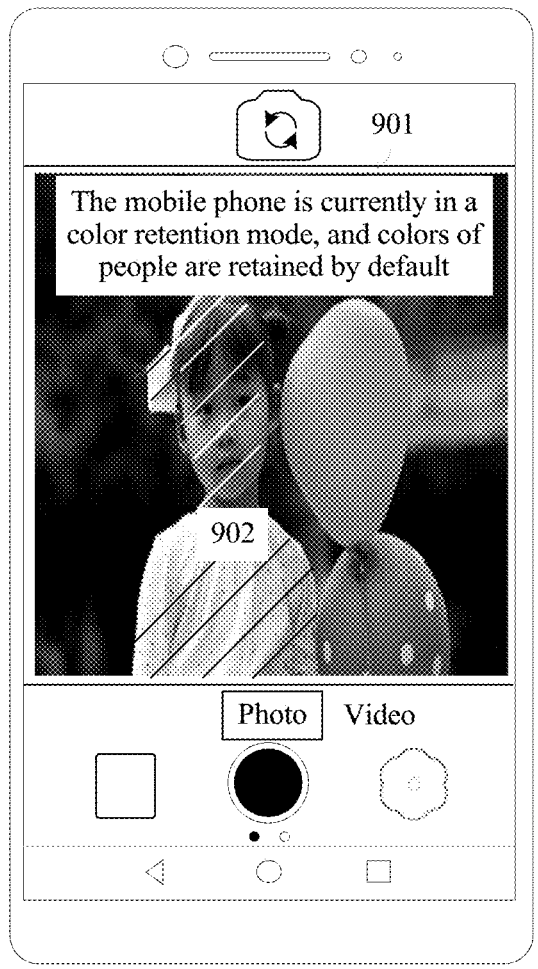
(b)
TO
FIG. 9B
FIG. 9A

TO (a)

(a)

(b)

(c)

(a)

(b)

METHOD FOR DISPLAYING IMAGE IN PHOTOGRAPHING SCENARIO AND ELECTRONIC DEVICE

CROSS-REFERENCE TO RELATED APPLICATIONS

This application is a continuation of U.S. patent application Ser. No. 17/285,818, filed on Apr. 15, 2021, which is a national stage of International Application No. PCT/CN2018/110306, filed on Oct. 15, 2018. Both of the aforementioned applications are hereby incorporated by reference in their entireties.

TECHNICAL FIELD

Embodiments of this application relate to the field of electronic technologies, and in particular, to a method for displaying an image in a photographing scenario and an electronic device.

BACKGROUND

With development of electronic technologies, a camera in an electronic device has an increasing quantity of photographing functions. Currently, a color retention photographing function emerges. When using the function, a user may specify a color, and an electronic device may retain, on a captured image, pixel values of pixels that are the same as or similar to the color specified by the user, and convert, into grayscale values, pixel values of pixels that greatly differ from the color specified by the user.

Because a to-be-photographed body usually does not have only one single color, but has more than one color, or colors of the body are gradually varied, colors of an image obtained by using the color retention solution may be unnatural, and a visual effect is relatively poor.

For example, when a user specifies a color: blue to retain a color of a balloon on a color image, because most (namely, a region 02) of a region of the balloon is blue or close to blue, as shown in FIG. 1, a color of the region 02 filled with slashes on the balloon may be retained after color retention processing. However, because a color of a highlighted part (namely, a region 01) on the top of the balloon on the color image greatly differs from the color: blue specified by the user, the color of the region 01 of the balloon cannot be retained after the color retention processing, and the region 01 is a grayscale image. Because a region 03 other than the balloon on the color image greatly differs from the color: blue specified by the user, a color of the region 03 cannot be retained after the color retention processing, and the region 03 is also a grayscale image. It can be seen from FIG. 1 that, after the color retention processing, a part of the balloon is a color image, and the other part of the balloon is a grayscale image. Consequently, an image obtained after the color retention processing has a relatively poor effect.

SUMMARY

Embodiments of this application provide a method for displaying an image in a photographing scenario and an electronic device, so that a color of an entire region in which a body is located on an image can be retained in a photographing scenario, and a user visual effect is relatively good.

To achieve the foregoing objective, the following technical solutions are used in the embodiments of this application.

According to one aspect, a technical solution of this application provides a method for displaying an image. The method may be applied to an electronic device having a touchscreen and a camera lens, and the method may include: displaying, by the electronic device, a capture screen on the touchscreen after detecting a first operation performed by a user to open a camera, where the capture screen includes a viewfinder frame, and the viewfinder frame includes a color first image; after detecting a second operation performed by the user to indicate a first processing mode, displaying, by the electronic device, a second image in the viewfinder frame in response to the second operation, where the second image is an image obtained after first processing is performed on a first original image captured by the camera lens, the second image includes a first region and a second region, the first region is a region in which a first target object is located on the second image, the second region is a region other than the first region on the second image, the first region is a color image, the second region is a grayscale image, and the first target object is one or more body types, or the first target object is one or more bodies.

When the first target object is a body type, the region in which the first target object is located is a region in which a body belonging to a first target type is located.

The first processing mode is a color retention mode, and the first processing is color retention processing.

In this solution, according to an image displayed by the electronic device in the viewfinder frame in the first processing mode of a photographing scenario, an entire region in which a particular body is located is a color image, and a case in which a part of a region of a body is a color image and the other part is a grayscale image does not occur.

In a possible implementation, an image in the first region is the same as an image in a region in which the first target object is located on the first original image, a color of the image in the first region is the same as a color of the image in the region in which the first target object is located on the first original image, and an image in the second region of the second image is an image obtained after grayscale processing is performed on an image in a region other than the region in which the first target object is located on the original image.

In other words, in the first processing mode of the photographing scenario, the electronic device may retain a color of an image in entire regions in which one or more bodies corresponding to the first target object are located on the original image captured by the camera lens, and process the other region on the original image as a grayscale image, to obtain the second image.

In another possible implementation, the displaying, by the electronic device, a second image in the viewfinder frame includes: obtaining, by the electronic device, the first original image captured by the camera lens, and then performing, by the electronic device, first processing on the first original image, to generate and display the second image; and the performing, by the electronic device, first processing on the first original image includes: performing, by the electronic device, image segmentation on the first original image, to obtain regions in which a plurality of objects included in the first original image are respectively located, where the object is a body type or a body; retaining, by the electronic device, pixel values of pixels in the first region in which the first target object is located on the first original image; and converting pixel values of pixels in a region other than the first region on the first original image into grayscale values.

In other words, the electronic device segments, through image segmentation, the first original image into regions in which the bodies are located or regions corresponding to the body types (namely, regions in which the bodies belonging to the body types are located), to retain the region in which the first target object is located, namely, regions in which one or more bodies included in the first target object are located, as a color image, and process the other region on the original image as a grayscale image.

In another possible implementation, the first target object is a preset target object, or the first target object is a target object that is automatically determined based on a to-be-photographed subject on the first original image.

In this solution, in the first processing mode of the photographing scenario, the electronic device may automatically display, based on the first target object, the second image obtained after the color retention processing.

In another possible implementation, the displaying, by the electronic device, a second image in the viewfinder frame in response to the second operation includes: in response to the second operation, prompting, by the electronic device, the user to specify the first target object; and if the electronic device detects a third operation performed by the user to specify the first target object, displaying, by the electronic device, the second image in the viewfinder frame in response to the third operation.

In this solution, in the first processing mode of the photographing scenario, only after obtaining a target object indicated by the user, the electronic device displays, based on the target object, the second image obtained after the color retention processing.

In another possible implementation, after the displaying, by the electronic device, a second image in the viewfinder frame, the method may further include: displaying, by the electronic device, a third image in the viewfinder frame after the camera lens captures a second original image, where the third image is an image obtained after first processing is performed on the second original image, the third image includes a third region and a fourth region, the third region is a region in which the first target object is located on the third image, the fourth region is a region other than the third region on the third image, the third region is a color image, and the fourth region is a grayscale image.

In other words, in the first processing mode of the photographing scenario, the electronic device may constantly obtain and display, in real time based on an original image currently captured by the camera lens, an image obtain after the color retention processing.

In another possible implementation, the method may further include: detecting, by the electronic device, a fourth operation performed by the user to indicate a second target object, where the second target object is one or more body types, or the second target object is one or more bodies; and displaying, by the electronic device, a fourth image in the viewfinder frame in response to the fourth operation, where the fourth image is an image obtained after first processing is performed on a third original image captured by the camera lens, where the fourth image includes a fifth region and a sixth region, the fifth region is a region in which the second target object is located on the fourth image, the sixth region is a region other than the fifth region on the fourth image, the fifth region is a color image, and the sixth region is a grayscale image.

In this solution, the user may further change a target object, so that the electronic device performs color retention processing based on the target object changed by the user, and displays an image obtained after the color retention processing.

In another possible implementation, the method may further include: detecting, by the electronic device, the fifth operation performed by the user to instruct to take a photo; and storing, by the electronic device in response to the fifth operation, an image displayed in the viewfinder frame.

In this way, the electronic device may store and record an image obtained after the color retention processing. In other words, a photographed image is an image obtained after the color retention processing.

In another possible implementation, the detecting, by the electronic device, the fourth operation performed by the user to instruct to take a photo includes: detecting, by the electronic device, the fourth operation performed by the user to instruct to take a photo in a video shooting mode or a continuous capture mode; and the storing, by the electronic device in response to the fourth operation, an image displayed in the viewfinder frame includes: in response to the fourth operation, storing, by the electronic device, a plurality of frames of images displayed in the viewfinder frame in a photographing process, where the plurality of frames of images displayed in the viewfinder frame are images obtained after first processing is performed on a plurality of frames of original images captured by the camera lens.

In this way, in the continuous capture mode and the video recording mode, the electronic device may store and record a plurality of images obtained after the color retention processing.

In another possible implementation, before the electronic device detects the second operation performed by the user to indicate the first processing mode, the method may further include: detecting, by the electronic device, a sixth operation performed by the user to instruct to shoot a video; and in response to the fifth operation, displaying, by the electronic device in the viewfinder frame, color images captured by the camera lens in a video shooting process, and storing the color images; after the electronic device detects the second operation, the displaying, by the electronic device, a second image in the viewfinder frame in response to the second operation includes: in response to the second operation, displaying, by the electronic device in the viewfinder frame in the video shooting process, the second image obtained after first processing is performed on each frame of image captured by the camera lens; and the method may further include: storing, by the electronic device, a plurality of frames of images displayed in the viewfinder frame in the video recording process.

In this solution, the electronic device may first shoot a video segment including normal color images, and after the electronic device enters a color retention mode, the electronic device continues to shoot a video segment including images obtained after the color retention processing.

In another possible implementation, the capture screen of the electronic device includes a control used to indicate the first processing mode, and the second operation is an operation that the user taps the control.

In this way, by tapping the control on the capture screen that is used to indicate the first processing mode, the user can more conveniently instruct to enter the color retention mode.

In another possible implementation, the capture screen of the electronic device displays a control 1, and that the second operation is detected includes: detecting that the user taps the control 1; displaying a function list, where the function list includes a control 2 used to indicate the first processing mode; and detecting an operation that the user taps the control 2.

In another possible implementation, that the electronic device detects the second operation includes: detecting, by the electronic device, a preset gesture of the user on the capture screen, for example, a gesture operation of drawing a round track.

In this solution, the user may instruct, by using the preset gesture on the photographing screen, the electronic device to enter the first processing mode.

In another possible implementation, that the electronic device detects the third operation performed by the user to specify the first target object includes: detecting, by the electronic device, an operation that the user taps a first body on the image displayed in the viewfinder frame, where the first target object is the first body, or the first target object is a body type of the first body.

In this solution, the user may set the first target object by tapping a body on the image displayed in the viewfinder frame.

In another possible implementation, that the electronic device detects the third operation performed by the user to specify the first target object includes: detecting, by the electronic device, an operation that the user selects, by drawing a track, a fifth region on the image displayed in the viewfinder frame, where the first target object is a body included in the fifth region, or the first target object is a body type of a body included in the fifth region.

In this solution, the user may set the first target object by selecting some bodies on the image displayed in the viewfinder frame.

In another possible implementation, the prompting, by the electronic device, the user to specify the first target object includes: displaying, by the electronic device, a body type list; and that the electronic device detects the third operation performed by the user to specify the first target object includes: detecting, by the electronic device, an operation that the user taps a first body type in the body type list, where the first body type is the first target object.

In this solution, the body type list is prompted to the user, so that the user can conveniently specify a body type from the body type list to serve as the first target object.

In another possible implementation, the prompting, by the electronic device, the user to specify the first target object includes: displaying, by the electronic device, a body list; and that the electronic device detects the third operation performed by the user to specify the first target object includes: detecting, by the electronic device, an operation that the user taps a first body in the body type list, where the first body or a body type of the first body is the first target object.

In this solution, the body list is prompted to the user, so that the user can conveniently specify a body from the body list to use the body or a body type of the body as the first target object.

In another possible implementation, the electronic device stores, in response to the fourth operation, the image displayed in the viewfinder frame and a corresponding original image.

In this way, the electronic device can store both a color original image and an image obtained after the color retention processing.

According to another aspect, a technical solution of this application provides a method for displaying an image, applied to an electronic device having a touchscreen. The method includes: detecting, by the electronic device, a first operation performed by a user to open a first image; displaying the first image on the touchscreen in response to the first operation, where the first image is a color image; detecting a second operation performed by the user to indicate a first processing mode; displaying a second image in response to the second operation, where the second image is an image obtained after the first image is processed; and storing the second image after detecting an operation performed by the user to instruct to store an image, where the second image and the first image each include a first region and a second region, the first region is a region in which a first target object is located, and the second region is a region other than the first region; and the first region on the second image is a color image, an image in the first region on the second image is the same as an image in the first region on the first image, and the second region on the second image is a grayscale image.

In this solution, the electronic device may perform color retention processing on a photographed color image, to retain a color of an entire region in which a particular body is located.

According to another aspect, a technical solution of this application provides a method for displaying an image, applied to an electronic device having a touchscreen. The method includes: detecting, by the electronic device, a first operation performed by a user to open a first video, where the first video includes a plurality of frames of first images; in response to the first operation, displaying, on the touchscreen of the electronic device, a first screen corresponding to the first video; detecting a second operation performed by the user to indicate a first processing mode; detecting a third operation performed by the user to instruct to play the first video; playing and displaying the first video in response to the third operation, where each frame of image in the displayed first video is a second image obtained after the first image is processed; and storing the first video after detecting an operation performed by the user to instruct to store a video, where an image in the first video is the second image, where the second image and the first image each include a first region and a second region, the first region is a region in which a first target object is located, and the second region is a region other than the first region; and the first region on the second image is a color image, an image in the first region on the second image is the same as an image in the first region on the first image, and the second region on the second image is a grayscale image.

In this solution, the electronic device may perform color retention processing on a color image included in a shot video, to retain a color of an entire region in which a particular body is located on the image.

According to another aspect, a technical solution provides an apparatus for displaying an image. The apparatus is included in an electronic device, and the apparatus has a function of implementing behavior of the electronic device in the foregoing aspects and the possible implementations of the foregoing aspects. The function may be implemented by hardware, or may be implemented by executing corresponding software by hardware. The hardware or software includes one or more modules or units corresponding to the foregoing function, for example, a detection module or unit, a display module or unit, and a storage module or unit.

According to another aspect, this technical solution provides an electronic device, including a touchscreen, where the touchscreen includes a touch-sensitive surface and a display, a camera lens, one or more processors, a memory, a plurality of applications, and one or more computer programs, where the one or more computer programs are stored in the memory, the one or more computer programs include an instruction, and when the instruction is executed by the electronic device, the electronic device is enabled to perform the method for displaying an image in any possible implementation of any one of the foregoing aspects.

According to another aspect, this technical solution provides an electronic device, including one or more processors and one or more memories, where the one or more memories are coupled to the one or more processors, the one or more memories are configured to store computer program code, the computer program code includes a computer instruction, and when the one or more processors execute the computer instruction, the electronic device is enabled to perform the method for displaying an image in any possible implementation of any one of the foregoing aspects.

According to another aspect, this technical solution provides a computer storage medium, including a computer instruction, where when the computer instruction runs on an electronic device, the electronic device is enabled to perform the method for displaying an image in any possible implementation of any one of the foregoing aspects.

According to another aspect, this technical solution provides a computer program product, where when the computer program product runs on an electronic device, the electronic device is enabled to perform the method for displaying an image in any possible implementation of any one of the foregoing aspects.

BRIEF DESCRIPTION OF DRAWINGS

FIG. 9A and FIG. 9B are a schematic diagram of a group of images according to an embodiment of this application;

FIG. 15A-1 and FIG A-2 are a schematic diagram of another group of display interfaces according to an embodiment of this application;

FIG. 15B-1 and FIG. 15B-2 are a schematic diagram of another group of display interfaces according to an embodiment of this application;

DESCRIPTION OF EMBODIMENTS

Figure 1:
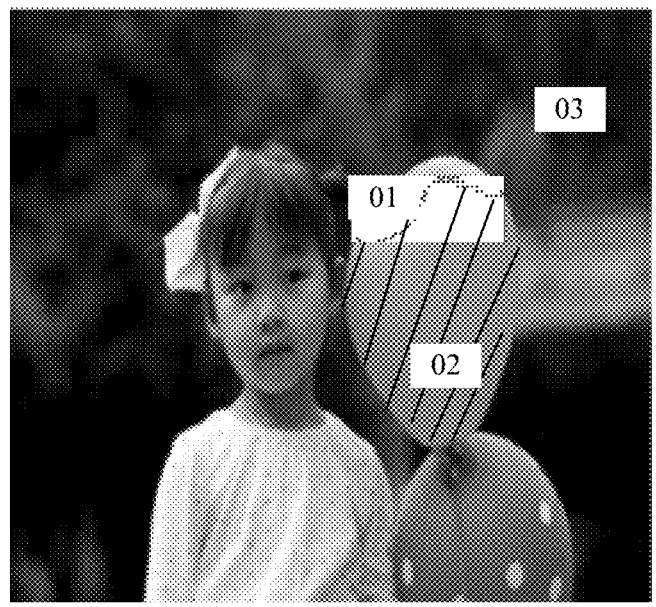
FIG. 1 is a schematic diagram of a color retention effect in the prior art.

The following describes the technical solutions in the embodiments of this application with reference to the accompanying drawings in the embodiments of this application. In the descriptions of the embodiments of this application, "I" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the description of the embodiments of this application, "a plurality of" means at least two.

The terms "first" and "second" mentioned below are merely used for the purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means at least two.

The embodiments of this application provide a method for displaying an image. The method may be applied to an electronic device, so that during photo taking or video shooting, regions in which bodies are located or regions corresponding to body types on an image can be obtained through image segmentation, and colors of regions in which one or more particular bodies are located are retained based on the regions in which the bodies are located or regions corresponding to the body types, to retain a color of an entire region in which a particular body is located, thereby improving an image processing effect and user visual experience. A prior-art problem that a part of a region of a body is a color image and the other part is a grayscale image because color retention is performed based on a specified color does not occur.

There may be a plurality of body types such as people, vehicles, flowers, animals, buildings, ground, and sky. One body type may include a plurality of bodies of the body type. A region corresponding to a body type is a region in which a body of the body type is located. One or more particular bodies are one or more bodies specified by a user, or one or more bodies preset by the electronic device, or one or more bodies determined by the electronic device based on a body on a color image captured by a camera lens, a position and a size of the body, and the like. Alternatively, one or more particular bodies are bodies belonging to one or more body types specified by a user, or bodies belonging to one or more body types preset by the electronic device, or bodies belonging to one or more body types determined by the electronic device based on a body on a color image captured by a camera lens, a position and a size of the body, and the like.

Image segmentation may be also referred to as semantic segmentation, and is a technology and a process of segmenting an image into several particular regions having special properties, and specifying a target attracting an interest. There may be a plurality of image segmentation methods, for example, a convolutional neural network (convolutional neural network, CNN)-based segmentation method, a threshold-based segmentation method, a region-based segmentation method, an edge-based segmentation method, and a particular theory-based segmentation method.

The method for displaying an image in the embodiments of this application may be applied to an electronic device such as a mobile phone, a tablet computer, a wearable device, an in-vehicle device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in the embodiments of this application.

Figure 2:
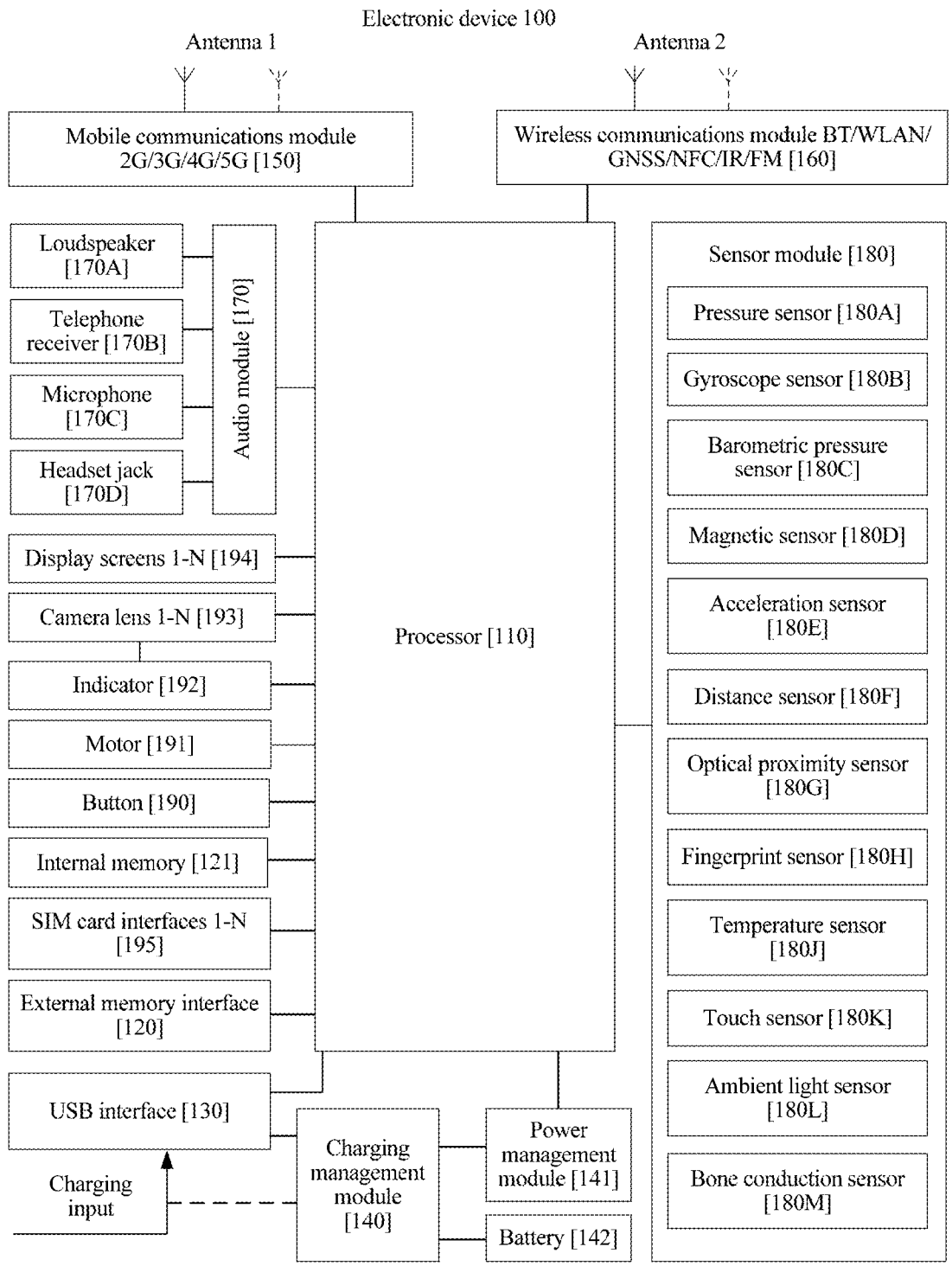
FIG. 2 is a schematic diagram of a hardware structure of an electronic device according to an embodiment of this application.

For example, FIG. 2 is a schematic structural diagram of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a loudspeaker 170A, a telephone receiver 170B, a microphone 170C, a headset jack 170D, a sensor module 180, a button 190, a motor 191, an indicator 192, a camera lens 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the schematic structure in this embodiment of this application constitutes no specific limitation on the electronic device 100. In some other embodiments of this application, the electronic device 100 may include more or fewer components than those shown in the figure, or some components may be combined, or some components may be split, or components are arranged in different manners. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be separate components, or may be integrated into one or more processors.

The controller may be a nerve center and a command center of the electronic device 100. The controller may generate an operation control signal based on an instruction operation code and a time sequence signal, to complete control of instruction reading and instruction execution.

The memory may be further disposed in the processor 110, to store an instruction and data. In some embodiments, the memory in the processor 110 is a cache. The memory may store an instruction or data that is used or cyclically used by the processor 110. If the processor 110 needs to use the instruction or the data again, the processor 110 may directly invoke the instruction or the data from the memory, so as to avoid repeated access, and reduce a waiting time of the processor 110, thereby improving system efficiency.

In some embodiments, the processor 110 may include one or more interfaces. The interface may be an integrated circuit (I2C) interface, an integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (SCL). In some embodiments, the processor 110 may include a plurality of groups of I2C buses. The processor 110 may be separately coupled to the touch sensor 180K, a charger, a flash, the camera lens 193, and the like over different I2C bus interfaces. For example, the processor 110 may be coupled to the touch sensor 180K over an I2C interface, so that the processor 110 communicates with the touch sensor 180K over an I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 over an I2S bus, to implement communication between the processor 110 and the audio module 170. In some embodiments, the audio module 170 may transmit an audio signal to the wireless communications module 160 over an I2S interface, to implement a function of answering a call over a Bluetooth headset.

The PCM interface may be also configured to perform audio communication, to perform sampling, quantization, and encoding on an analog signal. In some embodiments, the audio module 170 may be coupled to the wireless communications module 160 over a PCM bus interface. In some embodiments, the audio module 170 may also transmit an audio signal to the wireless communications module 160 over a PCM interface, to implement a function of answering a call over a Bluetooth headset. Both the I2S interface and the PCM interface may be configured to perform audio communication.

The UART interface is a universal serial data line, and is configured to perform asynchronous communication. The bus may be a two-way communications bus. The UART interface switches to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 over the UART interface, to implement a Bluetooth function. In some embodiments, the audio module 170 may transmit an audio signal to the wireless communications module 160 over the UART interface, to implement a function of playing music over a Bluetooth headset.

The MIPI interface may be configured to connect the processor 110 to a peripheral component such as the display screen 194 or the camera lens 193. The MIPI interface includes a camera serial interface (camera serial interface, CSI), a display serial interface (display serial interface, DSI), and the like. In some embodiments, the processor 110 communicates with the camera lens 193 over the CSI interface, to implement a photographing function of the electronic device 100. The processor 110 communicates with the display screen 194 over the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera lens 193, the display screen 194, the wireless communications module 160, the audio module 170, the sensor module 180, and the like. The GPIO interface may be further configured as an I2C interface, an I2S interface, a UART interface, an MIPI interface, or the like.

The USB interface 130 is an interface that meets a USB standard specification, and may be specifically a Mini USB interface, a Micro USB interface, a USB Type C interface, or the like. The USB interface 130 may be configured to connect to the charger to charge the electronic device, or may be configured to transmit data between the electronic device 100 and a peripheral device, or may be configured to connect to a headset, to play audio over the headset. The interface may be further configured to connect to another electronic device such as an AR device.

It may be understood that a schematic interface connection relationship between the modules in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger, or may be a wired charger. In some embodiments in which the charger is a wired charger, the charging management module 140 may receive a charging input from the wired charger over the USB interface 130. In some embodiments in which the charger is a wireless charger, the charging management module 140 may receive a charging input from the wireless charger over a wireless charging coil of the electronic device 100. When charging the battery 142, the charging management module 140 may further supply power to the electronic device over the power management module 141.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display screen 194, the camera lens 193, the wireless communications module 160, and the like. The power management module 141 may be further configured to monitor parameters such as a battery capacity, a battery cycle count, and a battery state of health (electric leakage and impedance). In some other embodiments, the power management module 141 may be alternatively disposed in the processor 110. In some other embodiments, the power management module 141 and the charging management module 140 may be alternatively disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may be multiplexed to improve utilization of the antennas. For example, the antenna 1 may be multiplexed as a diversity antenna of a wireless local area network. In some other embodiments, the antenna may be used in combination with a tuning switch.

The mobile communications module 150 may provide a solution to wireless communication such as 2G/3G/4G/5G applied to the electronic device 100. The mobile communications module 150 may include at least one filter, a switch, a power amplifier, a low noise amplifier (low noise amplifier, LNA), and the like. The mobile communications module 150 may receive an electromagnetic wave over the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation over the antenna 1. In some embodiments, at least some function modules of the mobile communications module 150 may be disposed in the processor 110. In some embodiments, at least some function modules of the mobile communications module 150 and at least some modules of the processor 110 may be disposed in a same component.

The modem processor may include a modulator and a demodulator. The modulator is configured to modulate a to-be-sent low-frequency baseband signal into an intermediate-and-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal over an audio device (which is not limited to the loudspeaker 170A, the telephone receiver 170B, and the like), or displays an image or a video over the display screen 194. In some embodiments, the modem processor may be an independent component. In some other embodiments, the modem processor may be separate from the processor 110, and the modem processor and the mobile communications module 150 or another function module may be disposed in a same component.

The wireless communications module 160 may provide a solution to wireless communication applied to the electronic device 100, for example, a wireless local area network (WLAN) (for example, a wireless fidelity (wireless fidelity, Wi-Fi) network), Bluetooth (BT), a global navigation satellite system (global navigation satellite system, GNSS), frequency modulation (frequency modulation, FM), near field communication (near field communication, NFC) technology, and an infrared (infrared, IR) technology. The wireless communications module 160 may be one or more components into which at least one communication processing module is integrated. The wireless communications module 160 receives an electromagnetic wave over the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation over the antenna 2.

In some embodiments, the antenna 1 and the mobile communications module 150 of the electronic device 100 are coupled, and the antenna 2 and the wireless communications module 160 of the electronic device 100 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a beidou navigation satellite system (BDS), a quasi-zenith satellite system (QZSS), and/or a satellite based augmentation system (SBAS).

The electronic device 100 implements a display function over the GPU, the display screen 194, the application processor, and the like. The GPU is a microprocessor for image processing, and connects to the display screen 194 and the application processor. The GPU is configured to perform mathematical and geometrical calculation, and is configured to perform graphics rendering. The processor 110 may include one or more GPUs, and execute a program instruction to generate or change display information.

The display screen 194 is configured to display an image, a video, and the like. The display screen 194 includes a display panel. The display panel may use a liquid crystal display (liquid crystal display, LCD), an organic light-emitting diode (organic light-emitting diode, OLED), an active-matrix organic light emitting diode (AMOLED), a flexible light-emitting diode (flex light-emitting diode, FLED), a MiniLed, a MicroLed, a Micro-oLed, a quantum dot light emitting diode (QLED), and the like. In some embodiments, the electronic device 100 may include one or N display screens 194, and N is a positive integer greater than 1.

The electronic device 100 may implement a photographing function over the ISP, the camera lens 193, the video codec, the GPU, the display screen 194, the application processor, and the like.

The ISP is configured to process data fed back by the camera lens 193. For example, during photo taking, a shutter is pressed, a ray of light is transmitted to a light-sensitive element of the camera lens through a lens, an optical signal is converted into an electrical signal, and the light-sensitive element of the camera lens transmits the electrical signal to the ISP for processing, and converts the electrical signal into an image that can be seen. The ISP may further perform algorithm optimization on noise, luminance, and complexion of the image. The ISP may further optimize parameters such as exposure and a color temperature of a photographing scenario. In some embodiments, the ISP may be disposed in the camera lens 193.

The camera lens 193 is configured to capture a static image or a video. An optical image of a body is generated through the lens, and the image is projected to the light-sensitive element. The light-sensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some embodiments, the electronic device 100 may include one or N camera lenses 193, and N is a positive integer greater than 1.

The digital signal processor is configured to process a digital signal, and in addition to a digital image signal, may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (MPEG) 1, MPEG 2, MPEG 3, and MPEG 4.

The NPU is a neural-network (neural-network, NN) computing processor, and quickly processes input information by using a biological neural network structure such as a mode of transmission between human-brain nerve cells, and may further constantly perform self-learning. The NPU may be used to implement an application such as intelligent cognition of the electronic device 100, for example, image recognition, facial recognition, voice recognition, and text understanding.

The external memory interface 120 may be configured to connect to an external storage card such as a micro SD card, to extend a storage capability of the electronic device 100. The external storage card communicates with the processor 110 over the external memory interface 120, to implement a data storage function, for example, to store files such as music and videos in the external storage card.

The internal memory 121 may be configured to store computer executable program code, and the executable program code includes an instruction. The processor 110 runs the instruction stored in the internal memory 121, to perform various function applications and data processing of the electronic device 100. The internal memory 121 may include a program storage region and a data storage region. The program storage region may store an operating system, an application required by at least one function (for example, a voice playing function or an image playing function), and the like. The data storage region may store data (for example, audio data and an address book) and the like created when the electronic device 100 is used. In addition, the internal memory 121 may include a high-speed random access memory, or may include a non-volatile memory such as at least one magnetic disk memory, a flash memory, or a universal flash storage (universal flash storage, UFS).

The electronic device 100 may implement an audio function such as music playing or recording over the audio module 170, the loudspeaker 170A, the telephone receiver 170B, the microphone 170C, the headset jack 170D, the application processor, and the like.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The loudspeaker 170A is configured to convert an audio electrical signal into a sound signal. The electronic device 100 may be used to listen to music or answer a call in a hands-free mode over the loudspeaker 170A.

The telephone receiver 170B is configured to convert an audio electrical signal into a voice signal. When the electronic device 100 is used to answer a call or receive voice information, the telephone receiver 170B may be put close to a human ear, to receive the voice information.

The microphone 170C is configured to convert a sound signal into an electrical signal. When making a call or sending voice information, a user may speak with the mouth approaching the microphone 170C, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may be alternatively disposed in the electronic device 100, to collect a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed in the display screen 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When force is exerted on the pressure sensor 180A, capacitance between electrodes changes. The electronic device 100 determines strength of pressure based on a change of the capacitance. When a touch operation is performed on the display screen 194, the electronic device 100 detects strength of the touch operation by using the pressure sensor 180A. The electronic device 100 may further calculate a position of the touch based on a detection signal of the pressure sensor 180A. In some embodiments, touch operations that are performed on a same touch position but have different touch operation strength may be corresponding to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The gyroscope sensor 180B may be configured to determine a motion posture of the electronic device 100. In some embodiments, the gyroscope sensor 180B may be used to determine angular velocities of the electronic device 100 around three axes (namely, axes x, y, and z). The gyroscope sensor 180B may be configured to perform image stabilization during photo taking. For example, when a shutter is pressed, the gyroscope sensor 180B detects a jittering angle of the electronic device 100, calculates, based on the angle, a distance for which a lens module needs to compensate, and enables the lens to offset jittering of the electronic device 100 through reverse motion, so as to implement image stabilization. The gyroscope sensor 180B may be further used for a navigation scenario and a motion sensing game scenario.

The barometric pressure sensor 180C is configured to measure atmospheric pressure. In some embodiments, the electronic device 100 calculates an altitude by using the atmospheric pressure measured by the barometric pressure sensor 180C, to assist positioning and navigation.

The magnetic sensor 180D includes a Hall sensor. The electronic device 100 may detect opening and closing of a flip leather cover by using the magnetic sensor 180D. In some embodiments, when the electronic device 100 is a flip device, the electronic device 100 may detect opening and closing of a flip cover by using the magnetic sensor 180D, to set a feature such as automatic unlocking of the flip cover based on a detected opening and closing state of the leather cover or a detected opening and closing state of the flip cover.

The acceleration sensor 180E may detect magnitude of acceleration of the electronic device 100 in various directions (usually on three axes). When the electronic device 100 is static, the acceleration sensor 180E may detect magnitude and a direction of gravity. The acceleration sensor 180E may be further configured to recognize a posture of the electronic device, and is applied to an application such as switching between landscape orientation and vertical orientation and a pedometer.

The distance sensor 180F is configured to measure a distance. The electronic device 100 may measure a distance through infrared or laser. In some embodiments, in a photographing scenario, the electronic device 100 may measure a distance by using the distance sensor 180F, to implement quick focusing.

The optical proximity sensor 180G may include, for example, a light emitting diode (LED) and an optical detector such as a photodiode. The light emitting diode may be an infrared light emitting diode. The electronic device 100 may emit infrared light by using the light emitting diode. The electronic device 100 detects infrared reflected light from a nearby body by using the photodiode. When detecting sufficient reflected light, the electronic device 100 may determine that there is a body near the electronic device 100. When detecting insufficient reflected light, the electronic device 100 may determine that there is no body near the electronic device 100. The electronic device 100 may detect, by using the optical proximity sensor 180G that a user puts the electronic device 100 close to an ear for conversation, so that automatic screen-off is implemented, to achieve power saving. The optical proximity sensor 180G may be further configured to automatically unlock and lock the screen in a leather cover mode and a pocket mode.

The ambient light sensor 180L is configured to sense luminance of ambient light.

The electronic device 100 may adaptively adjust luminance of the display screen 194 based on the sensed luminance of the ambient light. The ambient light sensor 180L may be further configured to automatically adjust white balance during photo taking. The ambient light sensor 180L may further cooperate with the optical proximity sensor 180G to detect whether the electronic device 100 is in a pocket, so as to prevent an accidental touch.

The fingerprint sensor 180H is configured to collect a fingerprint. The electronic device 100 may implement fingerprint unlock, application access lock, fingerprint photographing, fingerprint-based call answering, and the like by using a feature of the collected fingerprint.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 reduces performance of a processor near the temperature sensor 180J, to reduce power consumption and implement heat protection. In some other embodiments, when the temperature is lower than another threshold, the electronic device 100 heats the battery 142, to avoid an abnormal shutdown of the electronic device 100 caused by a low temperature. In some other embodiments, when the temperature is lower than still another threshold, the electronic device 100 boosts an output voltage of the battery 142, to avoid an abnormal shutdown caused by a low temperature.

The touch sensor 180K is also referred to as a "touch panel". The touch sensor 180K may be disposed in the display screen 194, and the touch sensor 180K and the display screen 194 constitute a touchscreen. The touch sensor 180K is configured to detect a touch operation performed on or near the touch sensor 180K. The touch sensor may transmit the detected touch operation to the application processor, to determine a touch event type. The touch sensor 180K may provide, over the display screen 194, a visual output related to the touch operation. In some other embodiments, the touch sensor 180K may be alternatively disposed on a surface of the electronic device 100, and is located on a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may contact a human pulse, and receive a blood pressure beating signal. In some embodiments, the bone conduction sensor 180M may be alternatively disposed in a headset, to obtain a bone conduction headset. The audio module 170 may obtain a voice signal through parsing based on the vibration signal, of the vibration bone of the vocal-cord part, that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user setting and function control of the electronic device 100.

The motor 191 may generate a vibration prompt. The motor 191 may be configured to provide a vibration prompt for an incoming call, and may be further configured to provide a touch vibration feedback. For example, touch operations performed on different applications (for example, photo taking and audio playing) may be corresponding to different vibration feedback effects. For touch operations performed on different regions of the display screen 194, the motor 191 may also be corresponding to different vibration feedback effects. Different application scenarios (for example, a time prompt, information receiving, an alarm clock, and a game) may also be corresponding to different vibration feedback effects. A touch vibration feedback effect may be further customized.

The indicator 192 may be an indicator light, may be configured to indicate a charging state and a battery change, and may be further configured to indicate a message, a missed call, a notification, and the like.

The SIM card interface 195 is configured to connect to a SIM card. The SIM card may be inserted into the SIM card interface 195 or detached from the SIM card interface 195, to implement contact with and detaching from the electronic device 100. The electronic device 100 may support one or N SIM card interfaces, and N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be alternatively compatible with different types of SIM cards. The SIM card interface 195 may be also compatible with an external storage card. The electronic device 100 interacts with a network by using a SIM card, to implement functions such as conversation and data communication. In some embodiments, the electronic device 100 uses an eSIM, namely, an embedded SIM card. The eSIM card may be embedded into the electronic device 100, and cannot be detached from the electronic device 100.

In this embodiment of this application, in the photographing scenario, the camera lens 193 captures a color image, the ISP processes data fed back by the camera lens 193, and the NPU in the processor 110 may perform image segmentation on an image processed by the ISP, to determine regions in which different bodies are located or regions corresponding to different body types on the image. The processor 110 may retain colors of regions in which one or more particular bodies are located, and perform grayscale processing on a region other than the regions of the one or more particular bodies, to retain a color of an entire region in which a particular body is located.

Grayscale processing means that pixel values of pixels are converted into grayscale values, to convert a color image into a grayscale image (also referred to as a monochrome image). The pixel value is used to indicate a color of a pixel, for example, the pixel value may be an R (red) G (green) B (blue) value. Grayscale processing may be performed to process an RGB value of a pixel as follows: R value=G value=B value.

A software system of the electronic device 100 may use a layered architecture, an event-driven architecture, a microkernel architecture, a micro service architecture, or a cloud architecture. In this embodiment of this application, the software structure of the electronic device 100 is illustrated by using an Android system with a layered architecture as an example.

Figure 3:
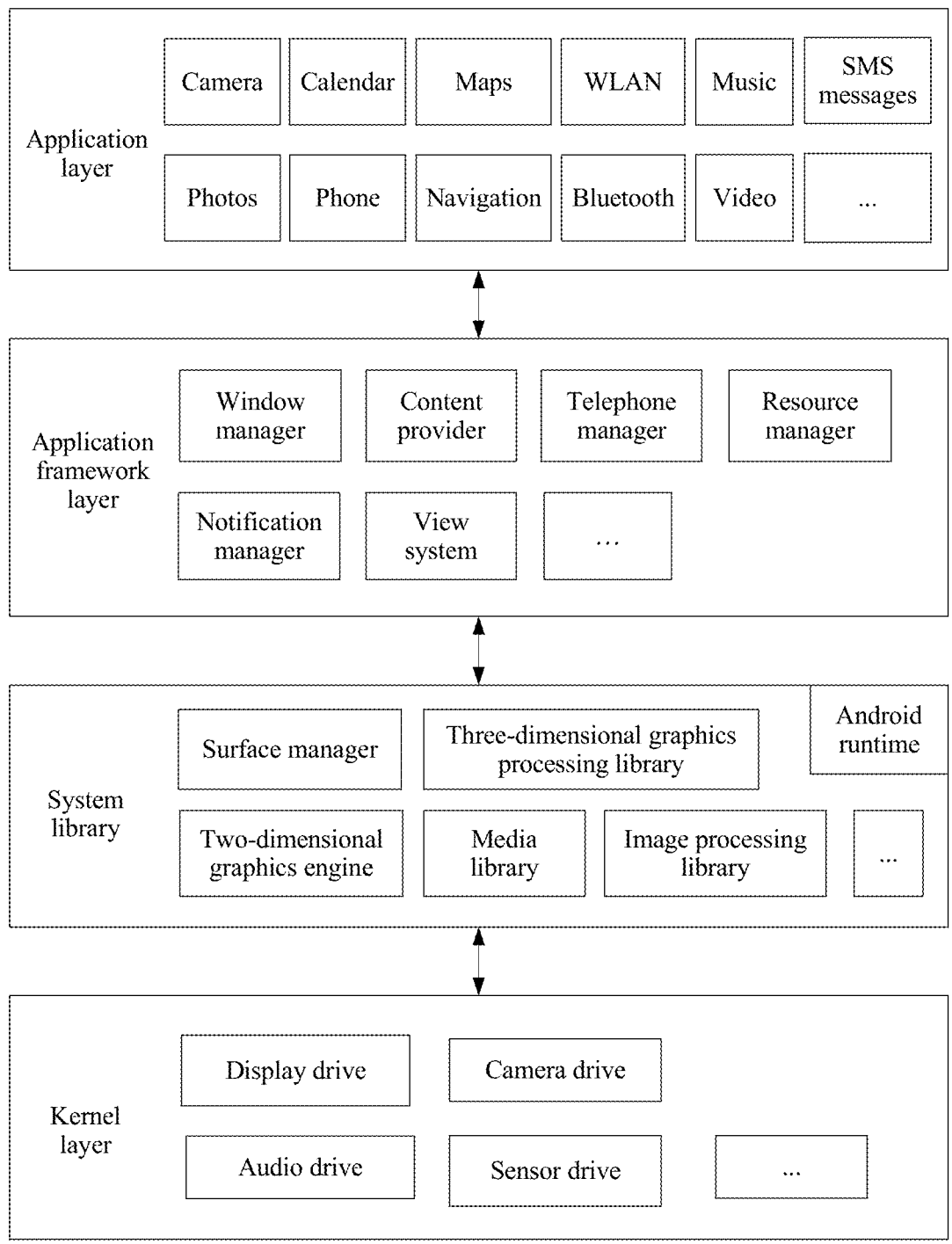
FIG. 3 is a schematic diagram of a software structure of an electronic device according to an embodiment of this application.

FIG. 3 is a block diagram of the software structure of the electronic device 100 in this embodiment of this application. In the layered architecture, software is divided into several layers, and each layer has a clear role and task. Layers communicate with each other over a software interface. In some embodiments, the Android system is divided into four layers that are respectively an application layer, an application framework layer, an Android runtime (Android runtime) and system library, and a kernel layer from top to bottom. The application layer may include a series of application packages.

As shown in FIG. 3, the application packages may include applications such as camera, photos, calendar, phone, maps, navigation, WLAN, Bluetooth, music, videos, and SMS messages.

The application framework layer provides an application programming interface (application programming interface, API) and a programming framework for the applications at the application layer. The application framework layer includes some predefined functions.

As shown in FIG. 3, the application framework layer may include a window manager, a content provider, a view system, a telephone manager, a resource manager, a notification manager, and the like.

The window manager is configured to manage a window application. The window manager may obtain a size of a display screen, determine whether there is a status bar, lock the screen, capture the screen, and the like.

The content provider is configured to store and obtain data, so that the data can be accessed by an application. The data may include a video, an image, an audio, calls that are made and received, a browsing history and bookmarks, an address book, and the like.

The view system includes a visual control such as a control for text display or a control for image display. The view system may be configured to construct an application. The display interface may include one or more views. For example, a display interface including an SMS message notification icon may include a view for text display and a view for image display.

The telephone manager is configured to provide a communication function of the electronic device 100, for example, to manage a call status (including answering or declining).

The resource manager provides various resources for an application, for example, a localized character string, an icon, a image, a layout file, and a video file.

The notification manager enables an application to display notification information on a status bar. The notification information may be a message used to indicate a notification type, and may automatically disappear after a short stay without interacting with a user. For example, the notification manager is configured to notify download completing, a message prompt, and the like. The notification manager may be a notification that appears on a top status bar of the system in a form of a graph or a scroll bar text, for example, a notification of an application running on the background, or may be a notification that appears on the screen in a form of a dialog window. For example, text information is prompted on a status bar, a prompt tone is made, the electronic device vibrates, or an indicator light flashes.

The Android runtime includes a kernel library and a virtual machine. The Android runtime is responsible for scheduling and managing the Android system.

The kernel library includes two parts: One part is a performance function that the Java language needs to schedule, and the other part is a kernel library of the Android.

The application layer and the application framework layer run on the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of function modules such as a surface manager (surface manager), a media library, a three-dimensional graphics processing library (for example, OpenGL ES), and a 2D graphics engine (for example, SGL).

The surface manager is configured to manage a display subsystem, converges 2D and 3D layers of a plurality of applications.

The media library supports playback and recording of a plurality of common audio and video formats, a static image file, and the like. The media library may support a plurality of audio and video encoding formats, for example, MPEG 4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display drive, a camera lens drive, an audio drive, and a sensor drive.

In this embodiment of this application, referring to FIG. 3, the system library may further include an image processing library. After a camera application is started, the camera application may obtain an image captured by the electronic device. After obtaining a region in which each body is located, the image processing library may retain pixel values of pixels of regions in which one or more particular bodies are located, and convert pixel values of pixels in a region other than the regions in which the one or more particular bodies are located into grayscale values, to retain a color of an entire region in which a particular body is located.

For ease of understanding, in the following embodiments of this application, the method for displaying an image in a photographing scenario in the embodiments of this application is specifically described with reference to the accompanying drawings by using a mobile phone with the structures shown in FIG. 2 and FIG. 3 as an example.

Figure 4A:
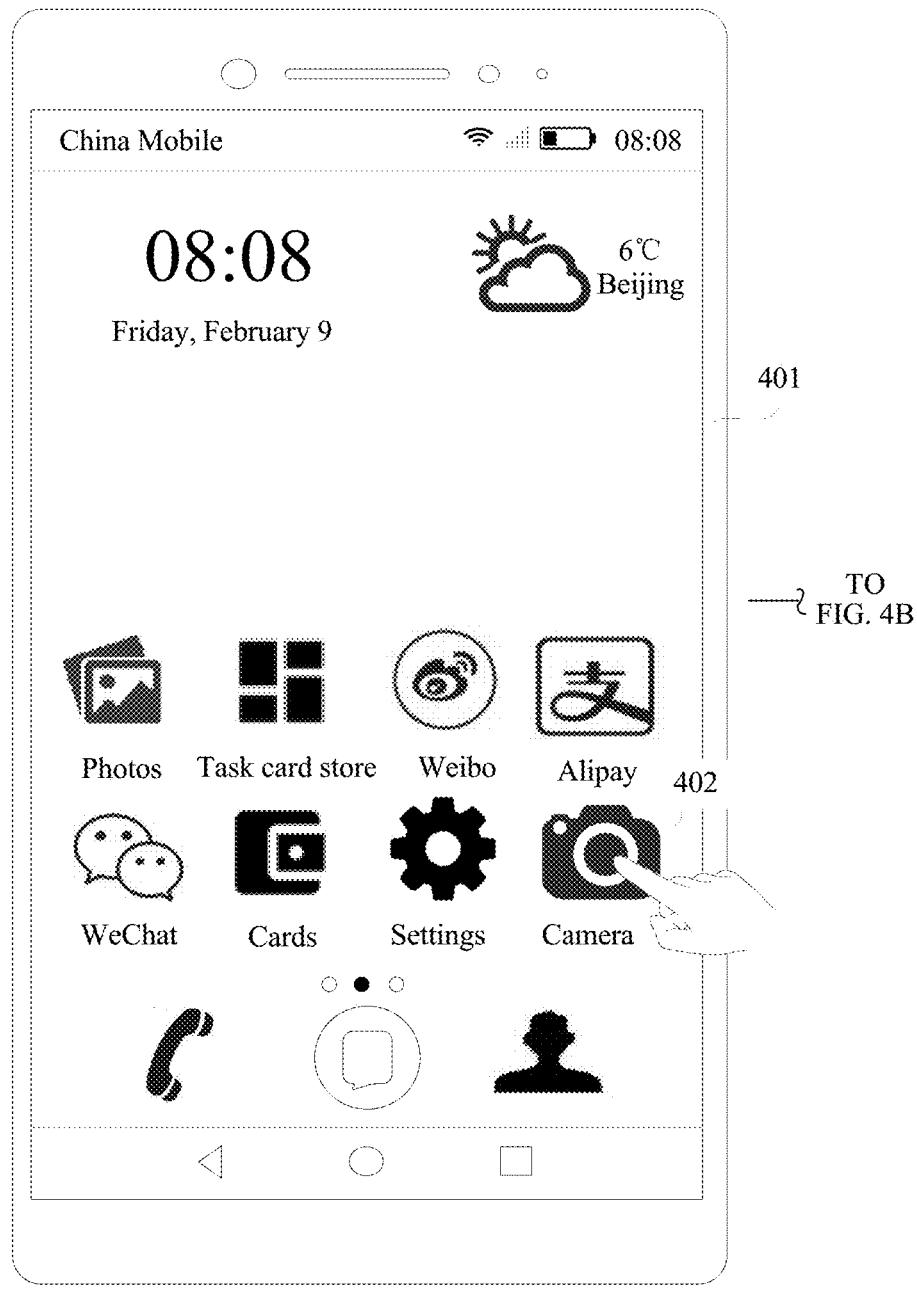
FIG. 4A and FIG. 4B are a schematic diagram of a group of display interfaces according to an embodiment of this application.
Figure 4B:
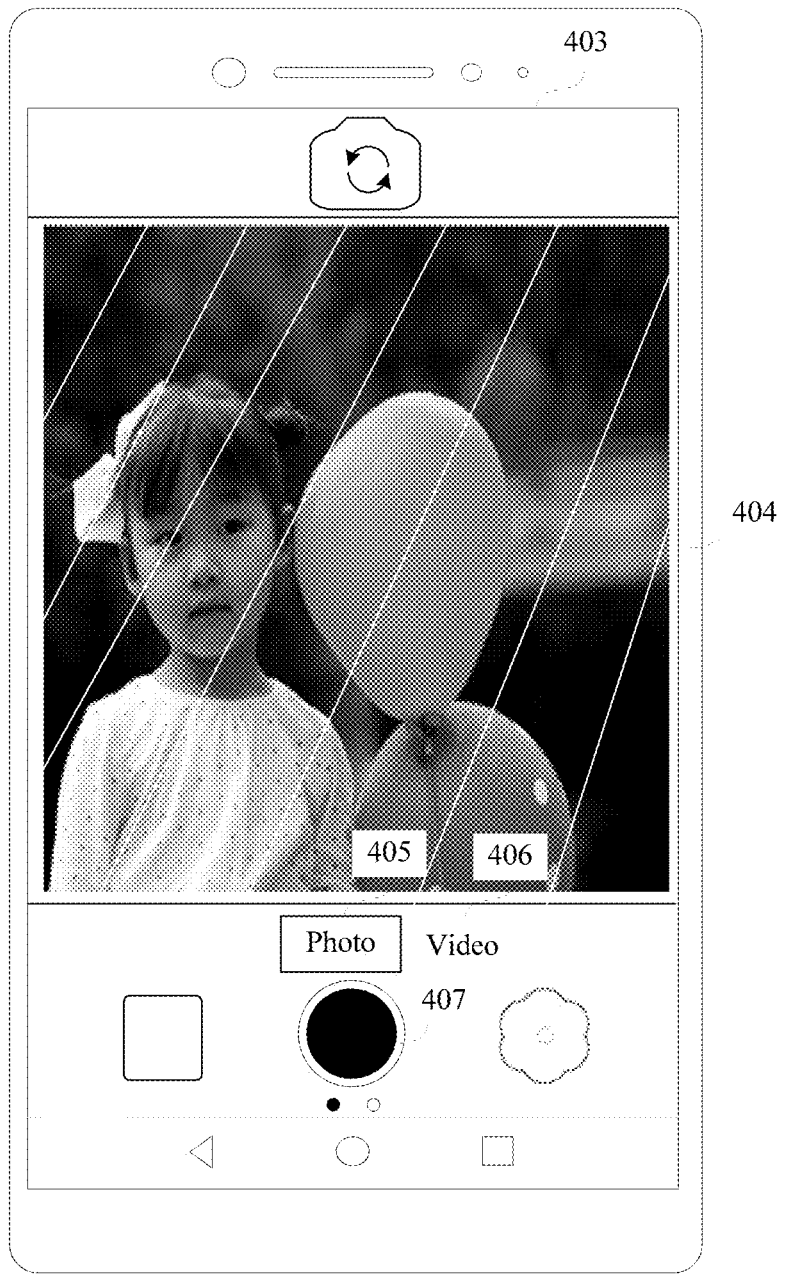

(a) in FIG. 4A and FIG. 4B shows a graphical user interface (graphical user interface, GUI) of the mobile phone, and the GUI is a desktop 401 of the mobile phone. When detecting an operation that a user taps an icon 402 of a camera application (application, APP) on the desktop 401, the mobile phone may start the camera application, and display another GUI shown in (b) in FIG. 4 FIG. 4A and FIG. 4B. The GUI may be referred to as a capture screen 403. The capture screen 403 may include a viewfinder frame 404. In a preview state, the viewfinder frame 404 may display a preview image in real time. It may be understood that in a photo taking mode and a video recording mode (namely, a video shooting mode), the viewfinder frame 404 may have different sizes. For example, the viewfinder frame shown in (b) in FIG. 4A and FIG. 4B may be a viewfinder frame in the photo taking mode. In the video recording mode, the viewfinder frame 404 may be an entire touchscreen.

For example, referring to (b) in FIG. 4 FIG 4A and FIG. 4B, after the mobile phone starts the camera, the viewfinder frame 404 may display an image 1, and the image 1 is a color image. The capture screen may further include a control 405 used to indicate a photo taking mode, a control 406 used to indicate a video recording mode, and a photographing control 407. In the photo taking mode, after the mobile phone detects an operation that the user taps the photographing control 407, the mobile phone performs a photo taking operation. In the video recording mode, after the mobile phone detects an operation that the user taps the photographing control 407, the mobile phone performs a video shooting operation.

It should be noted that in this embodiment of this application, a color image part is distinguished from a grayscale image part by filling the color image part with slashes.

After the mobile phone detects an operation performed by the user to indicate a color retention mode, the mobile phone enters the color retention mode. In the color retention mode, the mobile phone may perform color retention processing on a color original image captured by a camera lens, so that a part of a region on an image obtained after the color retention processing is a color image, and the other part of the region is a grayscale image.

The user may indicate the color retention mode in a plurality of manners.

Figure 5:
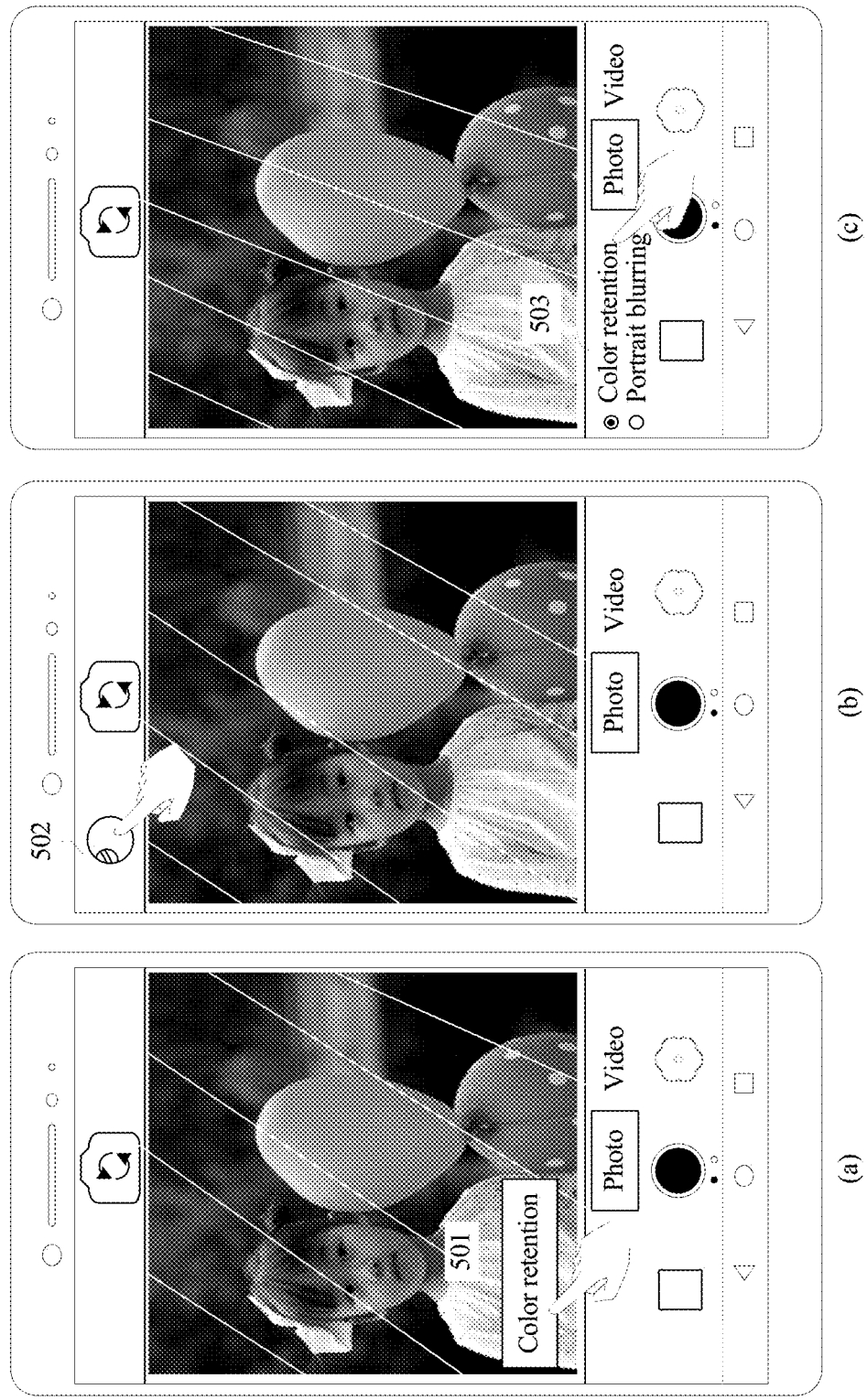
FIG. 5 is a schematic diagram of another group of display interfaces according to an embodiment of this application.

In an embodiment, the capture screen includes a first control used to indicate a color retention mode. When the mobile phone detects an operation that the user taps the first control, the mobile phone enters the color retention mode. For example, the first control may be a control 501 shown in (a) in FIG. 5, or a control 502 shown in (b) in FIG. 5, or a control 503 shown in (c) in FIG. 5.

Figure 6A:
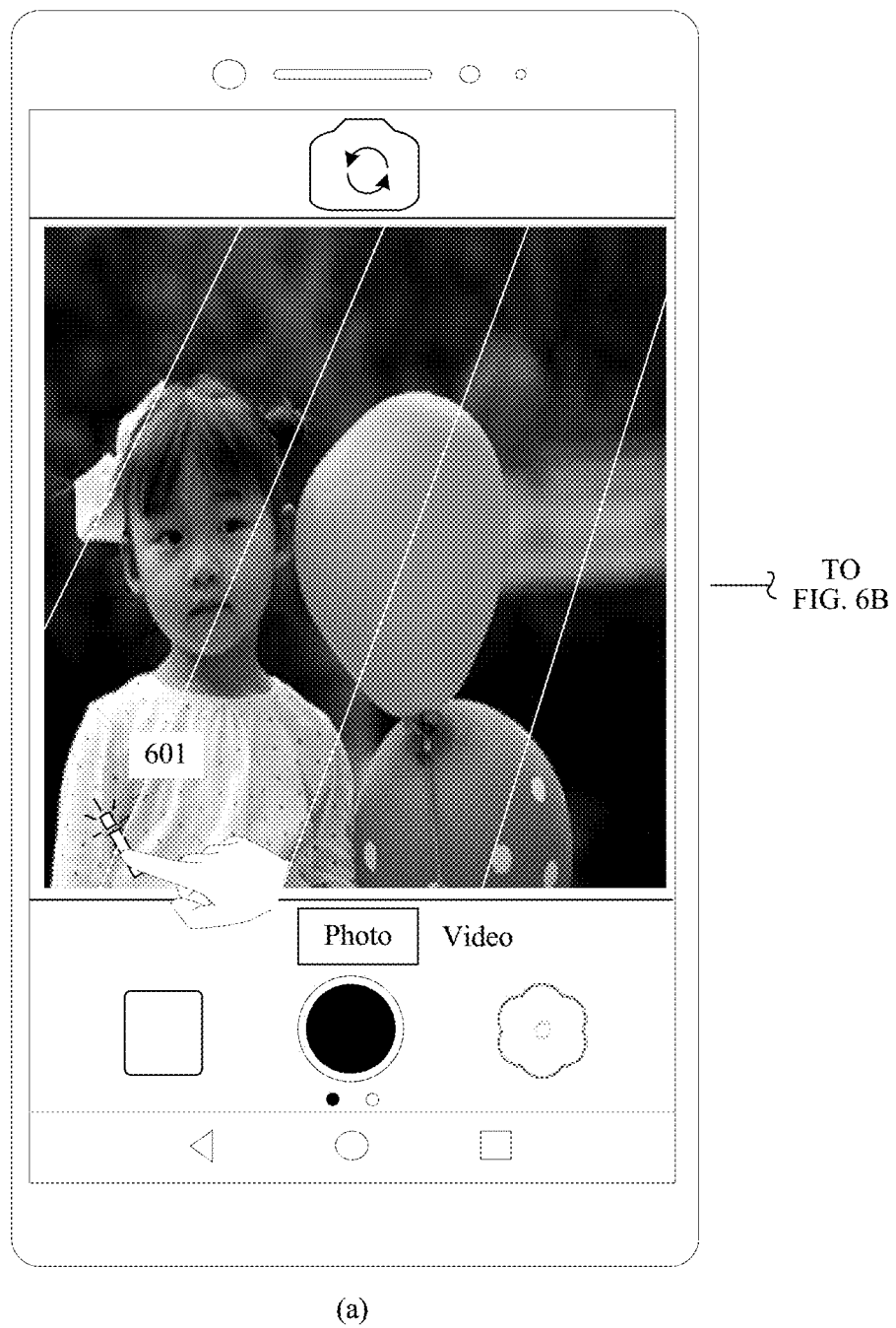
FIG. 6A and FIG. 6B are a schematic diagram of another group of display interfaces according to an embodiment of this application.
Figure 6B:
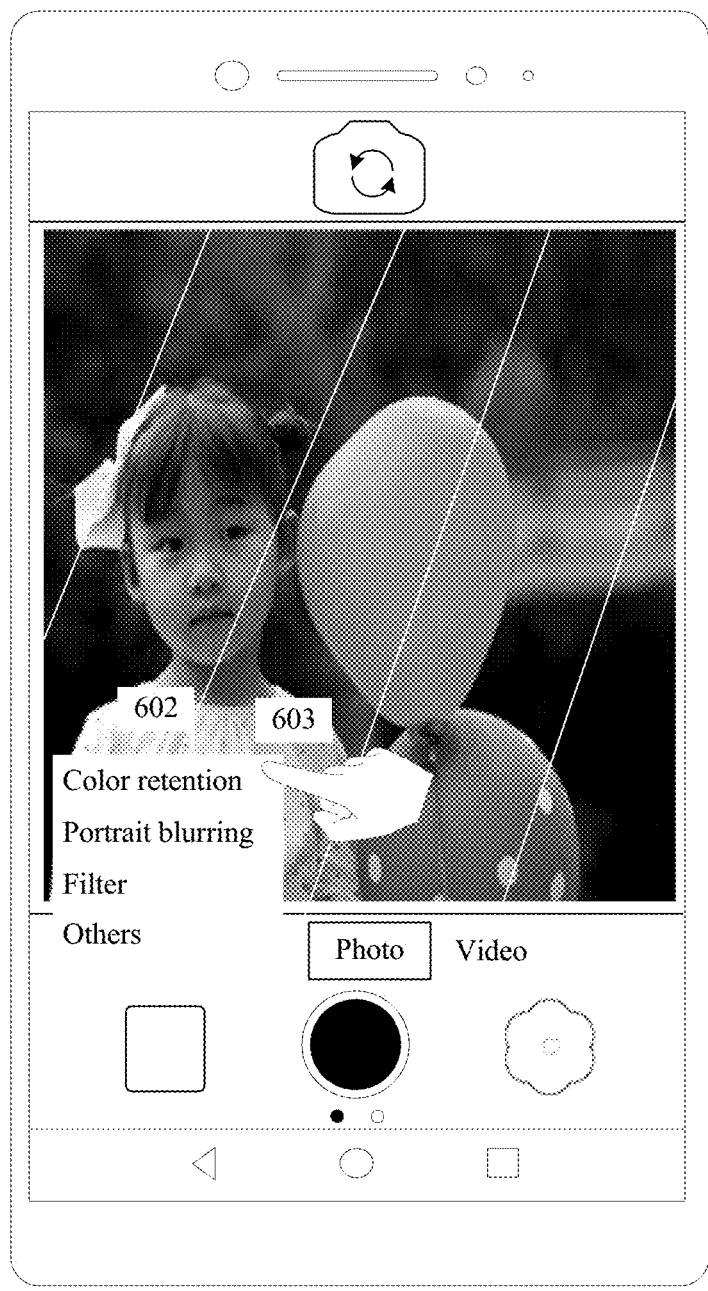

In another embodiment, referring to (a) in FIG. 6A and FIG. 6B, the capture screen includes a magic wand control 601. After the mobile phone detects that the user taps the control 601, referring to (b) in FIG. 6A and FIG. 6B, the mobile phone displays a function list 602. The function list 602 includes a control 603 used to indicate a color retention mode, a control used to indicate portrait blurring, a control used to indicate a filter, and the like. After the mobile phone detects that the user taps the control 603, the mobile phone enters the color retention mode.

Figure 7A:
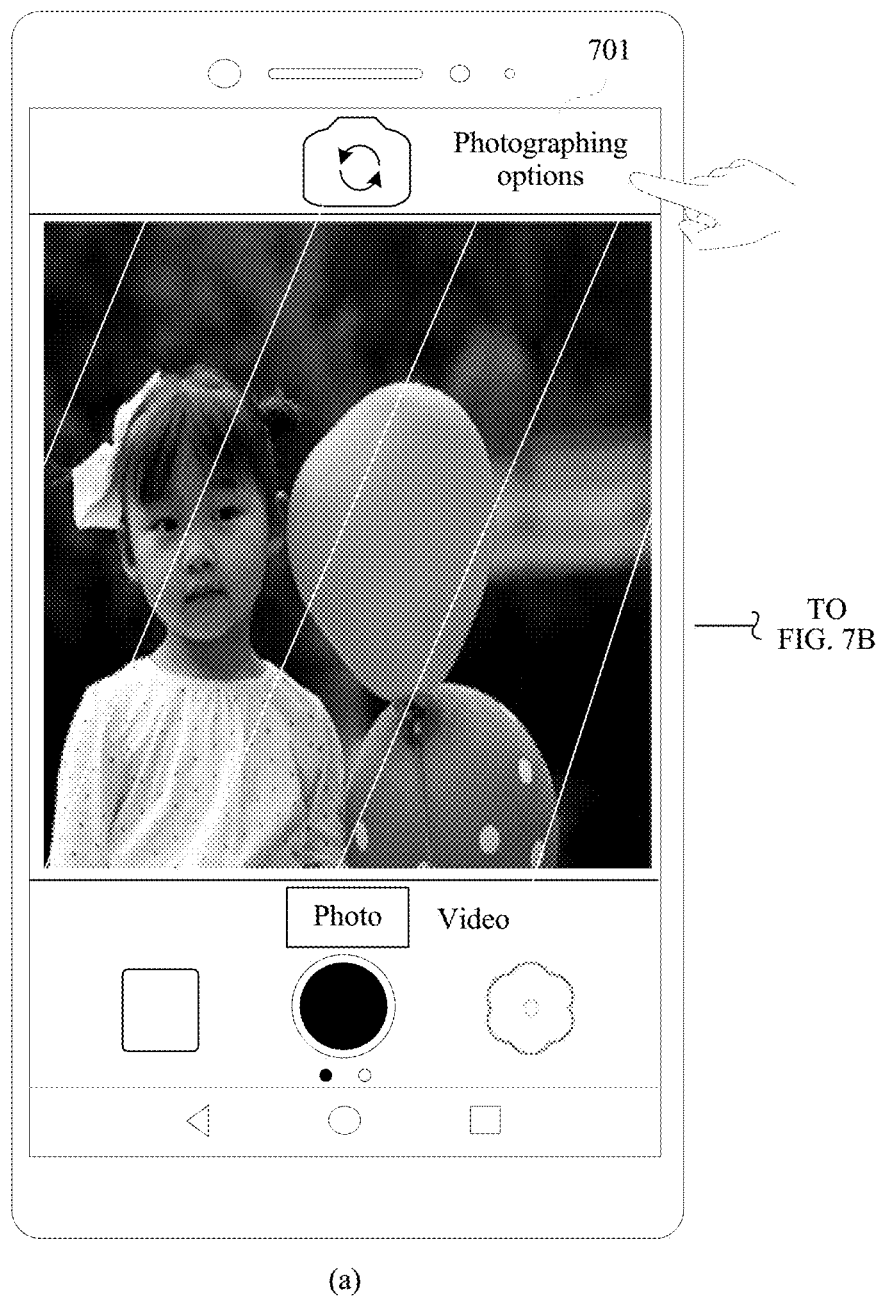
FIG. 7A and FIG. 7B are a schematic diagram of another group of display interfaces according to an embodiment of this application.
Figure 7B:
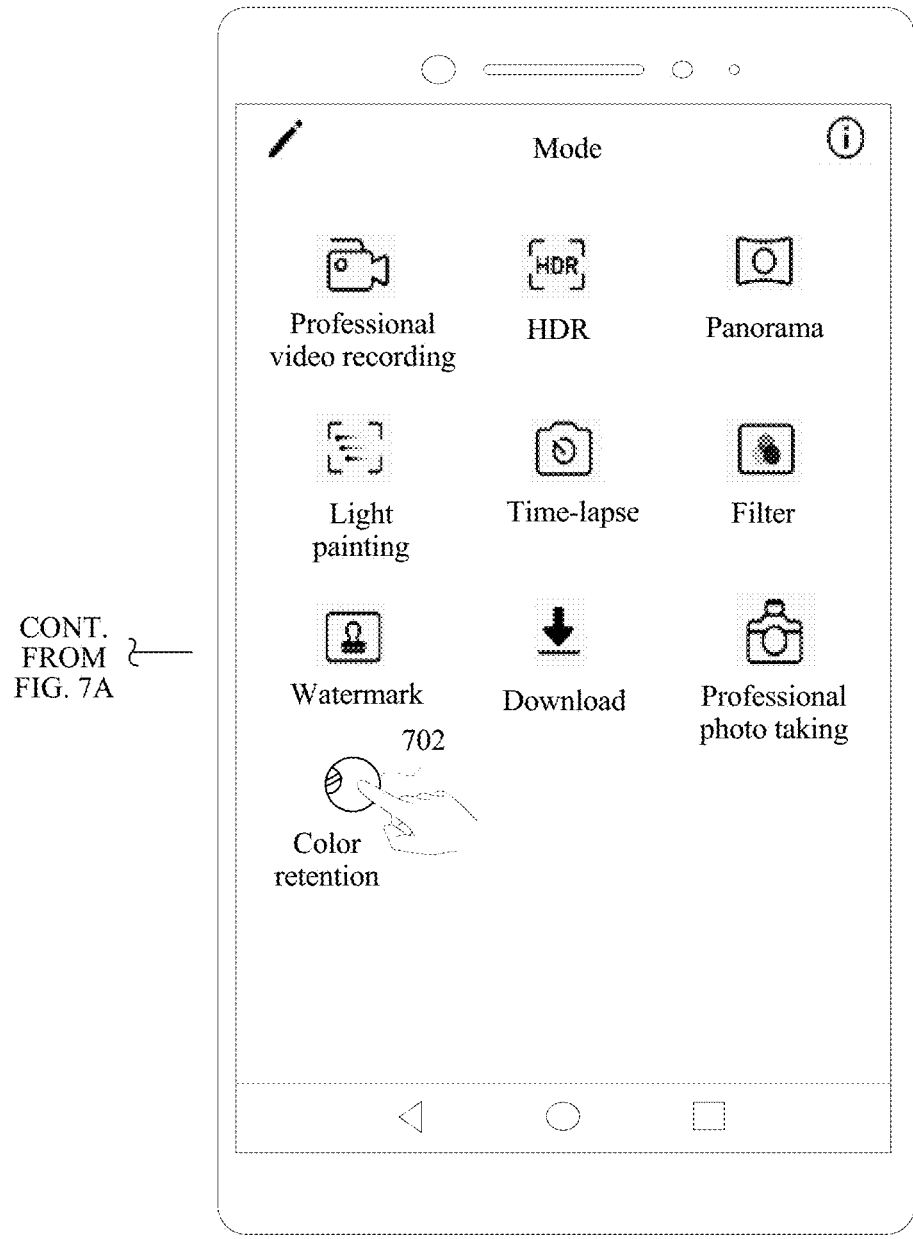

In another embodiment, referring to (a) in FIG. 7A and FIG. 7B, the capture screen includes a photographing option 701. After the mobile phone detects that the user taps the photographing option 701, referring to (b) in FIG. 7A and FIG. 7B, the mobile phone displays a photographing mode screen. After the mobile phone detects that the user taps a control 702 used to indicate a color retention mode on the photographing mode screen, the mobile phone enters the color retention mode.

In another embodiment, after detecting a preset gesture of the user on the capture screen, the mobile phone enters the color retention mode. For example, referring to (a) in FIG. 8A, FIG. 8B, and FIG. 8C, after detecting a gesture operation that the user draws a round track on the capture screen, the mobile phone enters the color retention mode. For another example, after detecting a touching and holding operation of the user in the viewfinder frame on the capture screen, the mobile phone enters the color retention mode. For another example, after detecting a pressing operation in the viewfinder frame on the capture screen (strength of the pressing is greater than or equal to a preset value), the mobile phone enters the color retention mode.

Figure 8A:
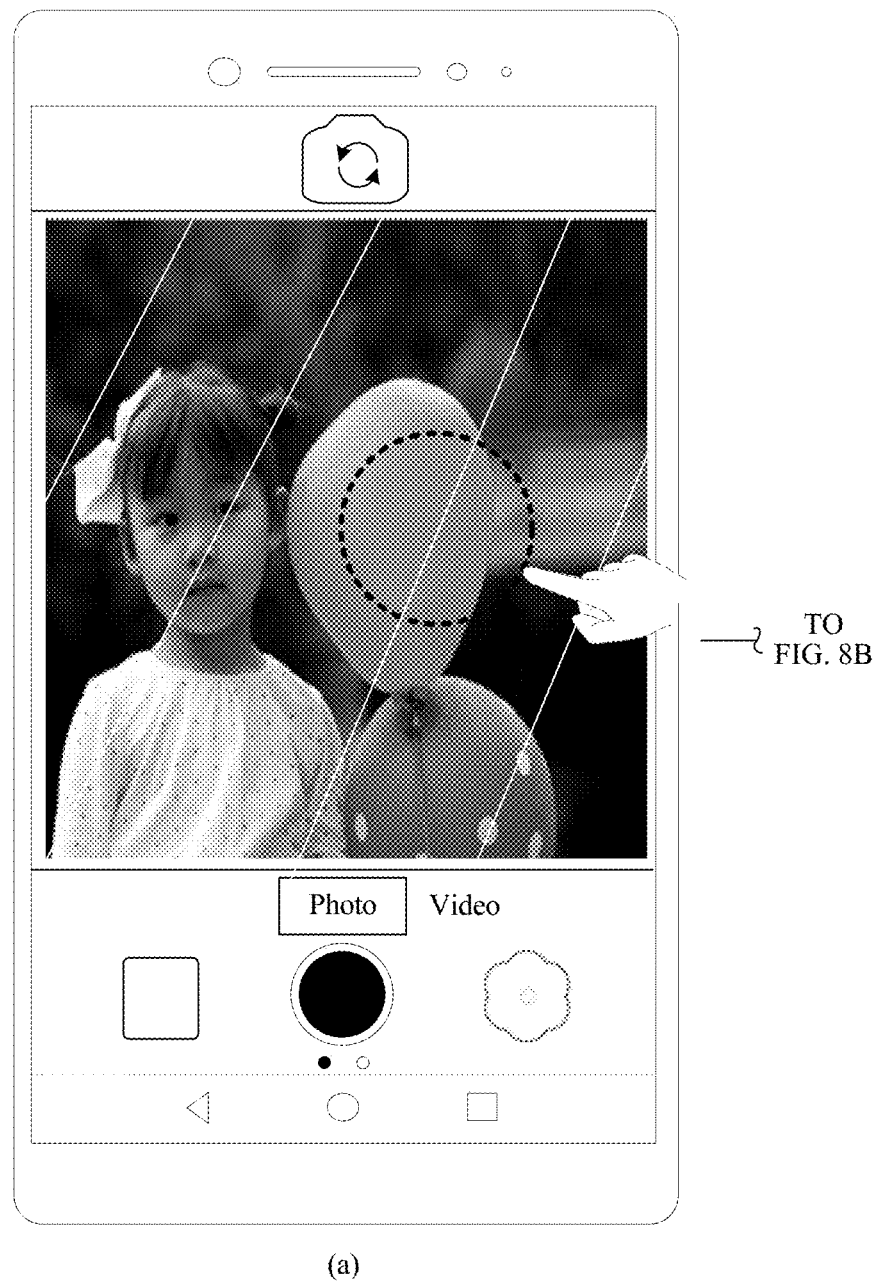
FIG. 8A, FIG. 8B, and FIG. 8C are a schematic diagram of another group of display interfaces according to an embodiment of this application.
Figure 8B:
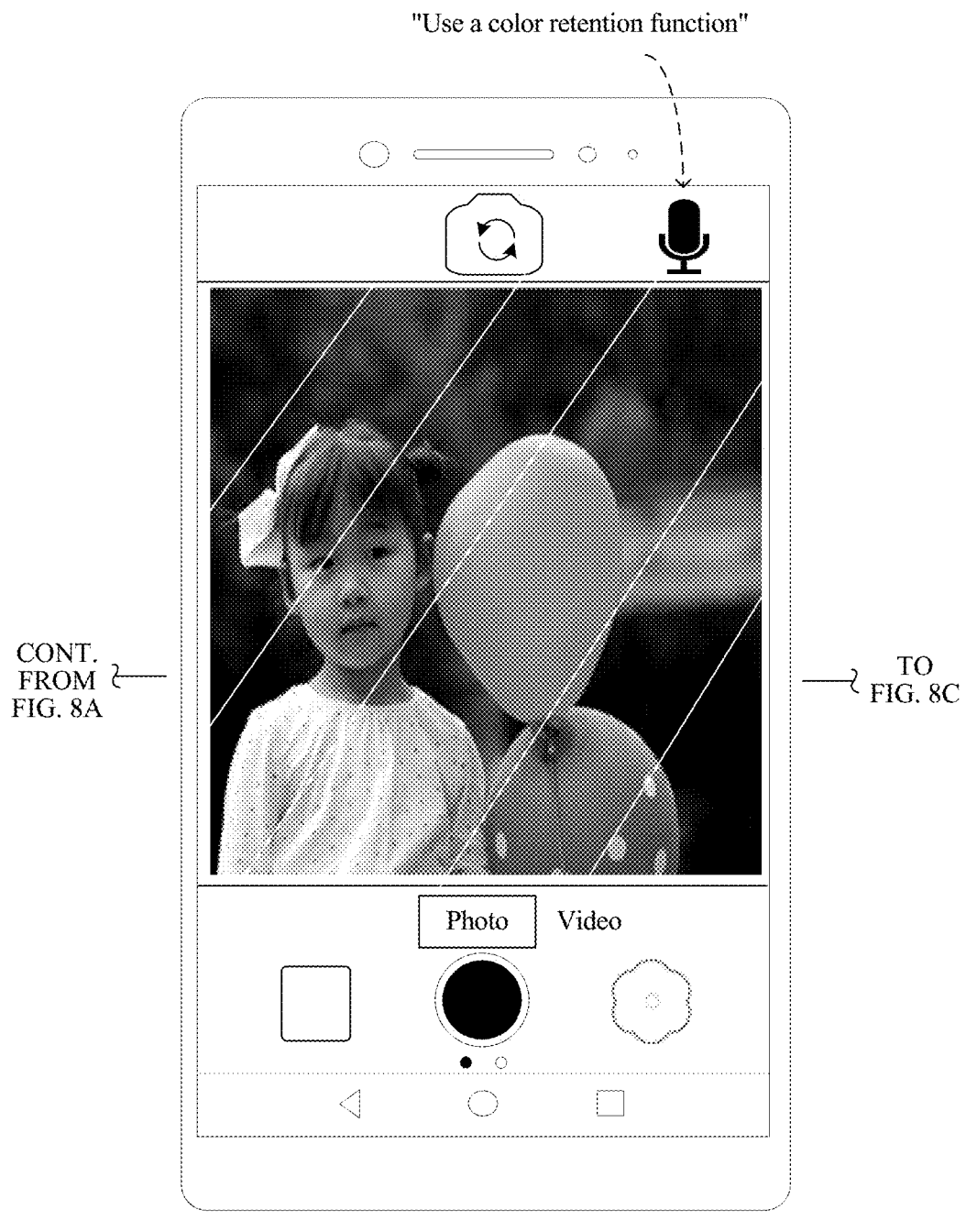
Figure 8C:
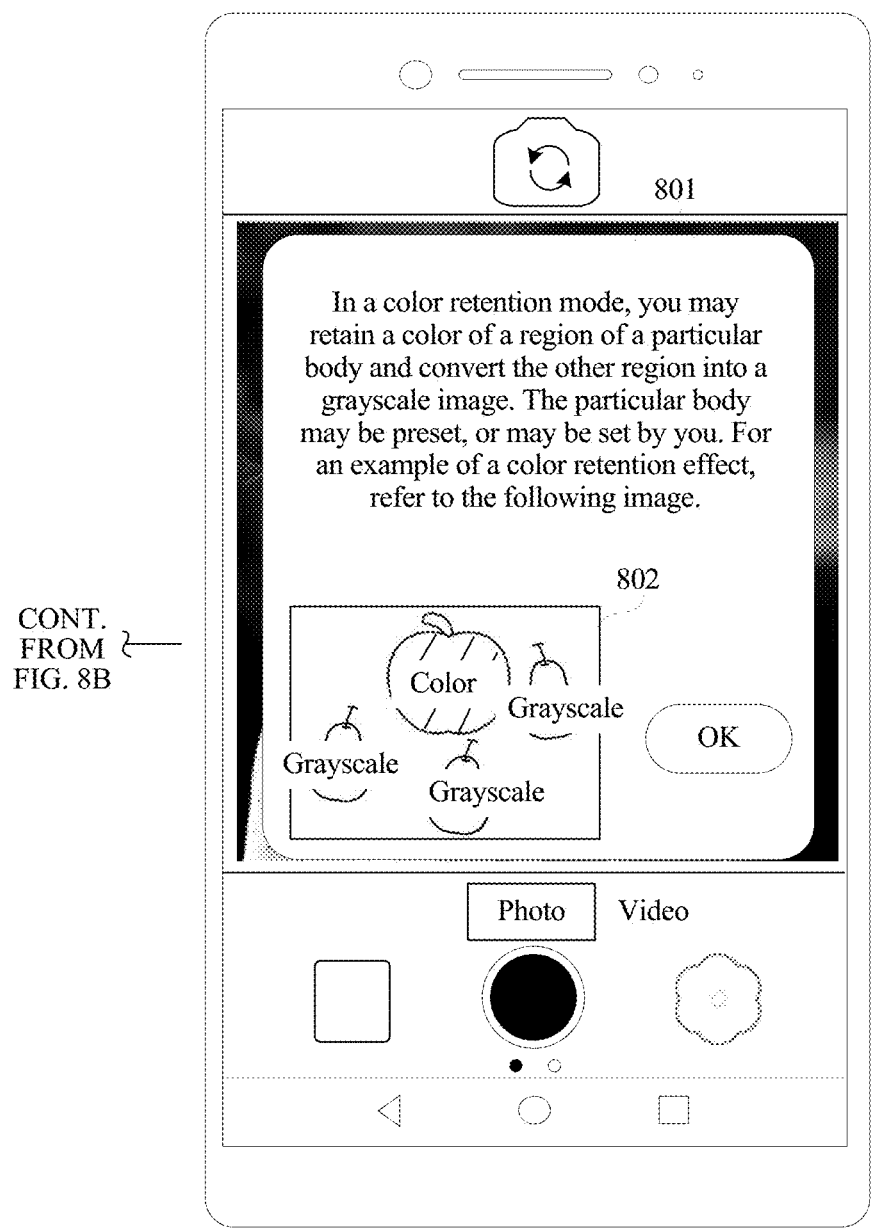

In another embodiment, after the mobile phone displays the capture screen, referring to (b) in FIG. 8A, FIG. 8B, and FIG. 8C, if the mobile phone detects an operation that the user instructs, in a voice manner, to enter the color retention mode or to use a color retention function, the mobile phone enters the color retention mode.

After the mobile phone enters the color retention mode for the first time, or each time the mobile phone enters the color retention mode, the mobile phone may provide a prompt description for the user by displaying the prompt description on the touchscreen or providing the prompt description in a voice manner, to notify the user of a function and a role of the color retention mode. For example, the mobile phone may display text information to prompt the user that "in this mode, you may retain a color of a region in which a particular body is located and convert the other region into a grayscale image". For another example, referring to (c) in FIG. 8A, FIG. 8B, and FIG. 8C, the mobile phone may use a window 801 to prompt the user that in the color retention mode, the user may retain a color of a region in which a particular body is located, and the other region is converted into a grayscale image. The mobile phone provides a schematic diagram 802 of a color retention effect for the user, so that the user understands a function of color retention processing.

After entering the color retention mode, the mobile phone may further provide another prompt for the user, so that the user learns that the mobile phone is currently in the color retention mode. In addition, after entering the color retention mode, the mobile phone may perform color retention processing on an original image currently captured by the camera lens, to display, in the viewfinder frame, an image 2 obtained after the color retention processing. The original image is a color image. A part of a region on the image 2 is a color image, and the other part of the region is a grayscale image. For example, the original image may be an image 3 shown in (a) in FIG. 9A and FIG. 9B. It can be learned, by comparing (a) in FIG. 9A and FIG. 9B with (b) in FIG. 4A and FIG. 4B, that an original image captured by the camera lens changes in real time, the image 3 and the image 1 that are captured by the camera lens at different moments may be different, and positions of the girl on the image 3 and the image 1 are different.

Specifically, after entering the color retention mode, the mobile phone may retain a color of an image in a region in which a target object 1 is located on an original image, and process a region other than the region in which the target object 1 is located as a grayscale image, to obtain the image 2 obtained after the color retention processing. In other words, an image and a color in a region in which the target object 1 is located on the image 2 are the same as an image and a color in the region in which the target object 1 is located on the original image, and an image in a region other than the region in which the target object 1 is located on the image 2 is a grayscale image on an image in a region other than the region in which the target object 1 is located on the original image.

An object may be one or more body types, or the object may be one or more bodies. On one image, one body type may be corresponding to one or more bodies of the type. When the target object 1 is a body type, the target object 1 includes all bodies of the body type, and a region corresponding to the body type is regions in which all bodies of the body type are located on an image. For example, one image includes a person 1 and a person 2, and a body type: "people" may include the two bodies: the person 1 and the person 2. If the target object 1 is the body type "people", the target object 1 also includes the person 1 and the person 2, and the region in which the target object 1 is located is regions in which the person 1 and the person 2 are located.

In other words, a region that is a color image on the image 2 is target regions 1 in which one or more bodies corresponding to the target object 1 are located, a region that is a color image on the image 2 is regions in outlines of one or more bodies corresponding to the target object 1, or a region that is a color image on the image 2 is an entire region in which a body is located instead of a part of a region of a body. A region that is a grayscale image on the image 2 is a region other than the target region 1. In other words, colors of the regions in which the one or more bodies corresponding to the target object 1 are located on the original image may be retained on the image 2, to retain the colors of all regions in which the one or more bodies are located on the original image.

Specifically, in this embodiment of this application, after entering the color retention mode, the mobile phone obtains a region in which each body is located or a region corresponding to each body type on an original image through image segmentation, to retain colors of regions in which one or more bodies corresponding to the target object 1 are located on the original image, and convert the other region on the original image into a grayscale image.

It can be learned that in the color retention processing solution provided in this embodiment of this application, color retention is performed based on a body instead of a color like in the prior art. Therefore, a color of an entire region in which a body is located on an image can be retained, so that a color of an image obtained after the color retention processing is more nature, and a user visual effect is better.

In an embodiment, the target object 1 may be a target object preset by the mobile phone. For example, the target object 1 is a body type "people" preset by the mobile phone. For another example, the target object 1 is a body type "balloon" preset by the mobile phone. In this embodiment, after entering the color retention mode, the mobile phone may automatically display the image 2 based on the preset target object 1.

Figure 9B:
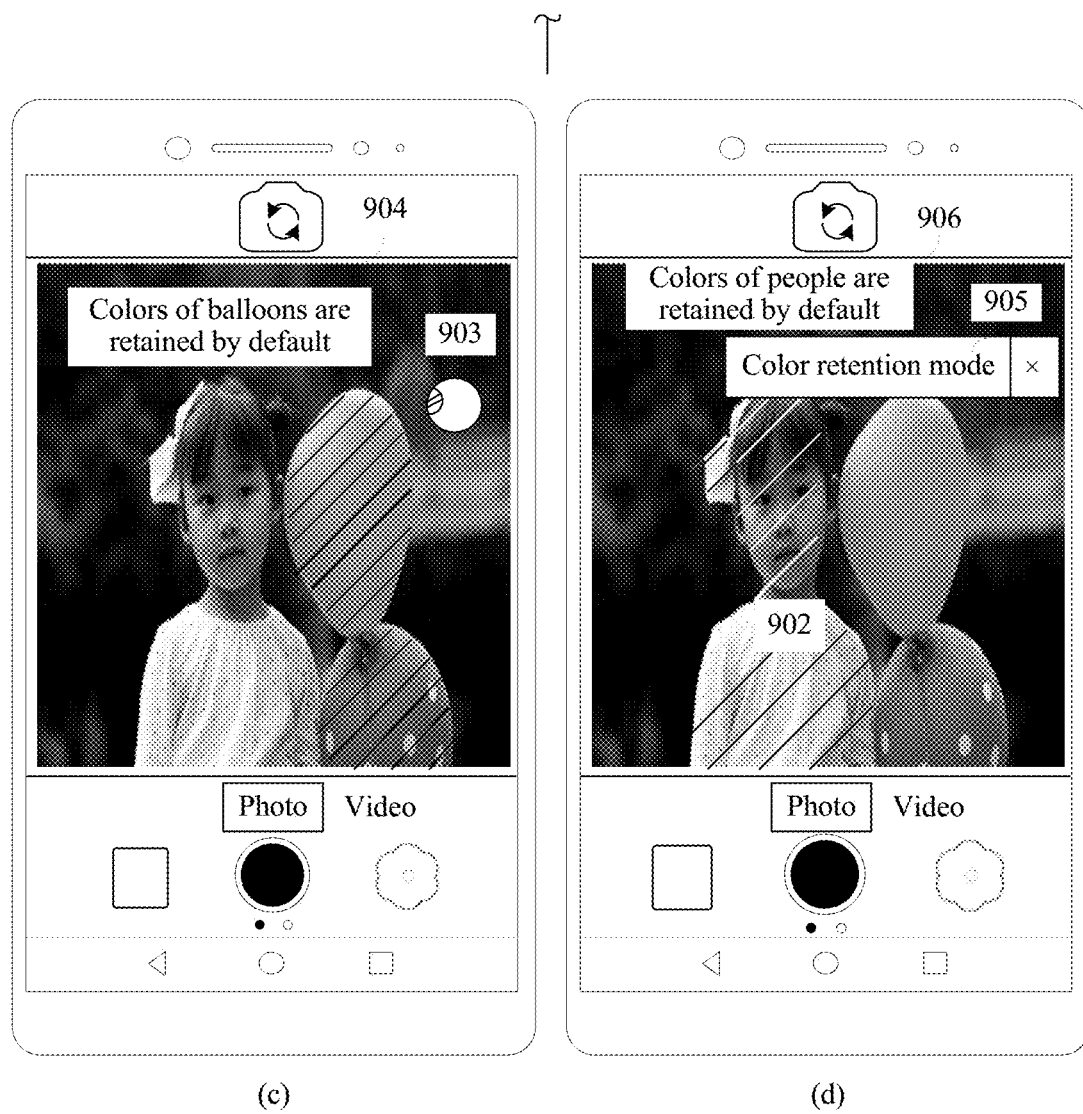

For example, after the mobile phone enters the color retention mode, if an original image captured by the mobile phone is the image 3 shown in (a) in FIG. 9A and FIG. 9B, the target object 1 is the preset target object, and the preset target object is the body type "people", referring to (b) in FIG. 9A and FIG. 9B, the mobile phone may prompt, by using text information 901, the user that "the mobile phone is currently in the color retention mode, and colors of people are retained by default", and display the image 2 shown in (b) in FIG. 9A and FIG. 9B. On the image 2, because the girl belongs to the type "people", a color of a region 902 (filled with slashes in the figure) in which the girl is located is retained, and the region in which the girl is located is a color image and a region other than the region in which the girl is located is a grayscale image.

It should be noted that in this embodiment of this application, if clothes of the girl on the original image are yellow, and hair accessories are pink, on the image 2 shown in (b) in FIG. 9A and FIG. 9B, the clothes of the girl are still yellow, and the hair accessories are still pink. In other words, the mobile phone can completely retain a color of an entire region in which the girl is located. In the prior art, when the user instructs to retain a color: yellow, after color retention processing is performed, a color of the clothes of the girl may be retained, but a color: pink of the hair accessories of the girl is not retained. In other words, only a part of the clothes of the girl is a yellow image, and the other part of the girl is a grayscale image.

For another example, referring to (c) in FIG. 9A and FIG. 9B, the target object 1 is a preset target object, and the preset target object is the body type "balloon". The mobile phone displays an identifier 903 on the capture screen, to indicate that the mobile phone is currently in the color retention mode, and the mobile phone may prompt, by using text information 904, the user that "colors of balloons are retained by default", and display the image 2. Regions (filled with slashes in the figure) of two balloons on the image 2 are color images, and the other region is a grayscale image.

For another example, referring to (d) in FIG. 9A and FIG. 9B, the target object 1 is a preset target object, and the preset target object is the body type "people". The mobile phone displays an identifier 905 on the capture screen, to indicate that the mobile phone is currently in the color retention mode, and the mobile phone may prompt, by using text information 906, the user that "colors of people are retained by default", and display the image 2. A region (filled with slashes in the figure) of the girl on the image 2 is a color image, and the other region is a grayscale image.

In another embodiment, the target object 1 may be a target object that is automatically determined by the mobile phone based on a body on an original image captured by the camera lens, a position of the body, a size of the body, and the like. In this embodiment, after entering the color retention mode, the mobile phone may display the image 2 based on the automatically determined target object 1.

For example, a priority sequence of a plurality of body types is set on the mobile phone: Priorities of people are higher than priorities of animals, and the priorities of animals are higher than priorities of buildings. For example, if an original image includes people, animals, and buildings, a body type "people" having a highest priority is the target object 1, or two body types "people" and "animal" having highest priorities are the target object 1. For another example, if the original image does not include people, but includes animals and other bodies, "animal" having the highest priority on the original image is the target object 1.

For another example, the mobile phone may automatically determine a to-be-photographed subject on an original image, and the to-be-photographed subject is the target object 1, or a body type of the to-be-photographed subject is the target object 1. For example, the mobile phone determines that a body on a middle position of the original image is the to-be-photographed subject and the target object 1. For another example, the mobile phone determines that a body having a largest size on the original image is the to-be-photographed subject and the target object 1. For another example, the mobile phone determines that a body that is near a middle position and that has a largest size is the to-be-photographed subject, and a body type of the body that is near the middle position and that has the largest size is the target object 1.

Figure 10:
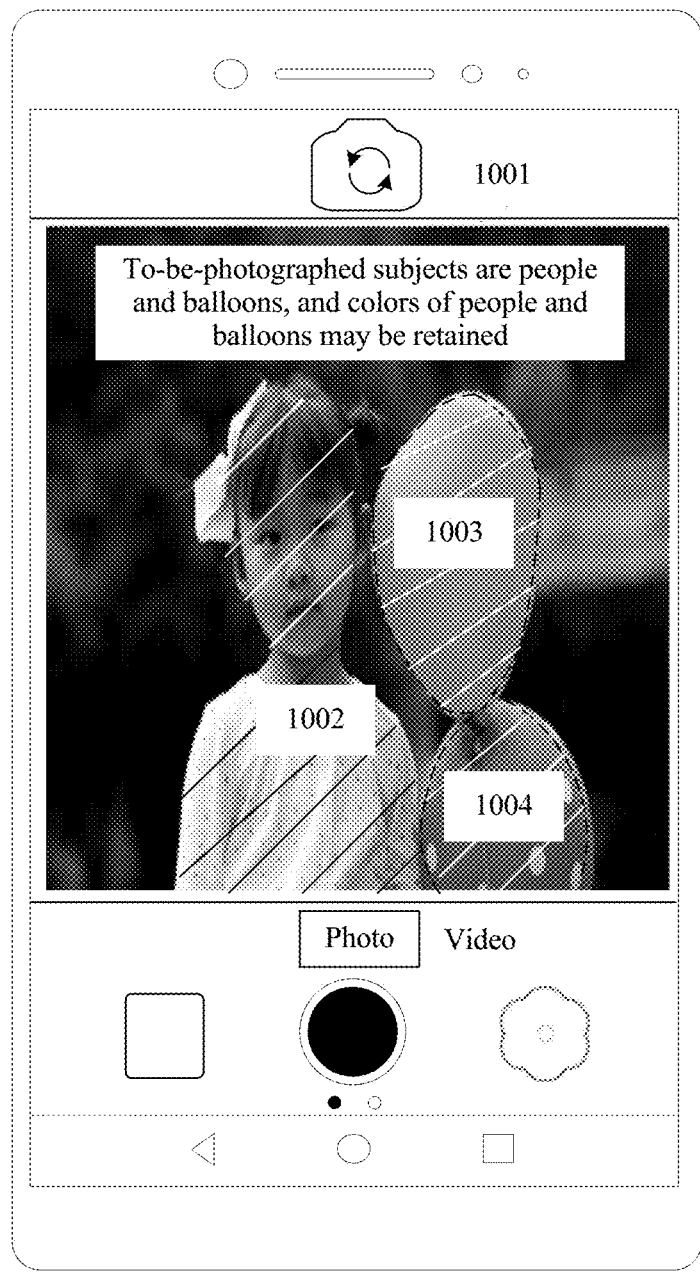
FIG. 10 is a schematic diagram of a display interface according to an embodiment of this application.

For example, after the mobile phone enters the color retention mode, if an original image captured by the mobile phone is the image 3 shown in (a) in FIG. 9A and FIG. 9B, referring to FIG. 10, the mobile phone may prompt, by using text information 1001, the user that the mobile phone determines that "the to-be-photographed subject is people and balloons, and colors of the people and the balloons may be retained", and display the image 2. On the image 2, colors of a region 1002 in which the girl is located and a region 1003 and a region 1004 (filled with slashes in the figure) in which the two balloons are located are all retained, and the other region is a grayscale image.

In another embodiment, the target object 1 may be a target object specified by the user. In this embodiment, after entering the color retention mode, the mobile phone may prompt, in a voice manner or through touchscreen display, the user to specify the target object 1. For example, after entering the color retention mode, referring to (a) in FIG. 11A and FIG. 11B, the mobile phone may prompt, by using text information 1101, the user to specify the target object 1. The user may specify the target object 1 in a voice manner or by using a gesture operation. The mobile phone displays the image 2 after determining that the user specifies the target object 1, and the mobile phone displays a pure color image or a pure grayscale image when the mobile phone does not detect that the user specifies the target object 1.

After the mobile phone prompts the user to specify the target object 1, the user may specify the target object 1 in a plurality of manners.

Figures 11A, 11B:
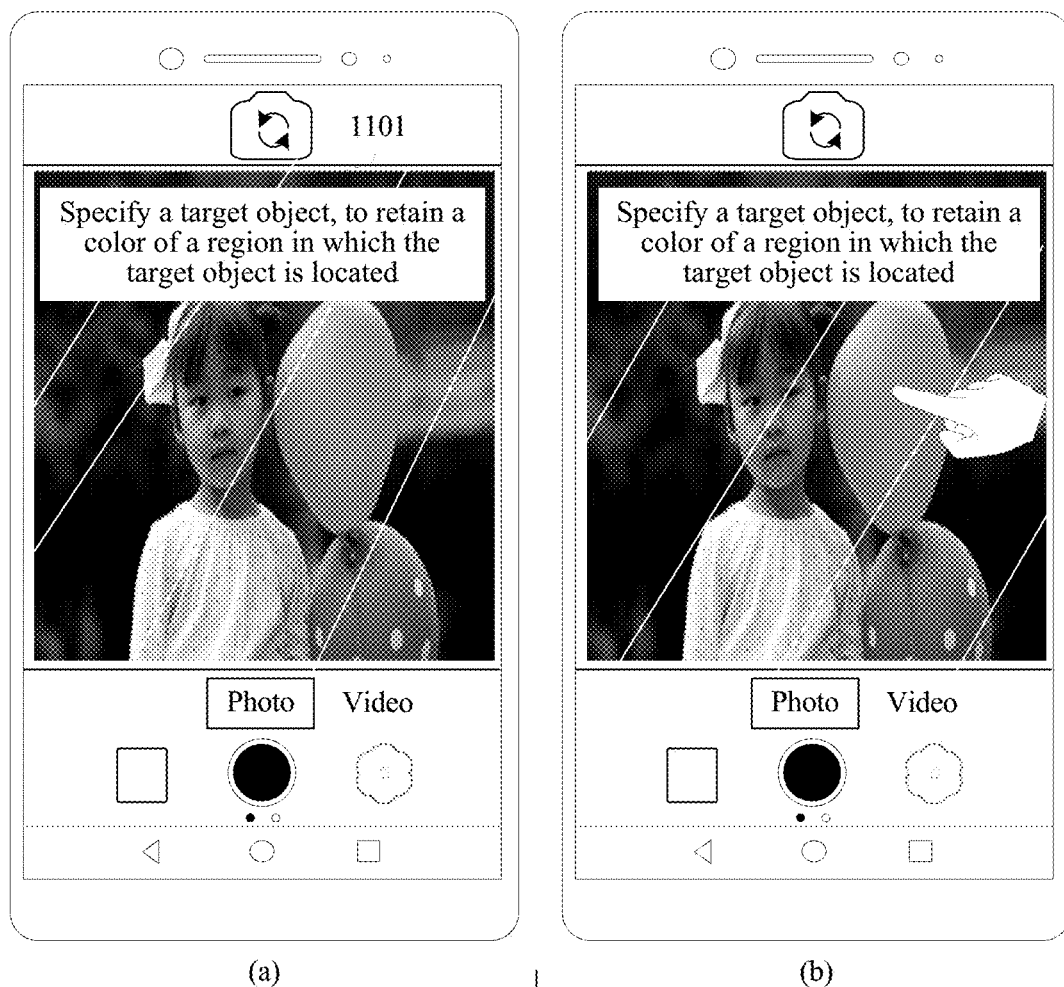
FIG. 11A and FIG. 11B are a schematic diagram of another group of display interfaces according to an embodiment of this application.
Figure 11B:
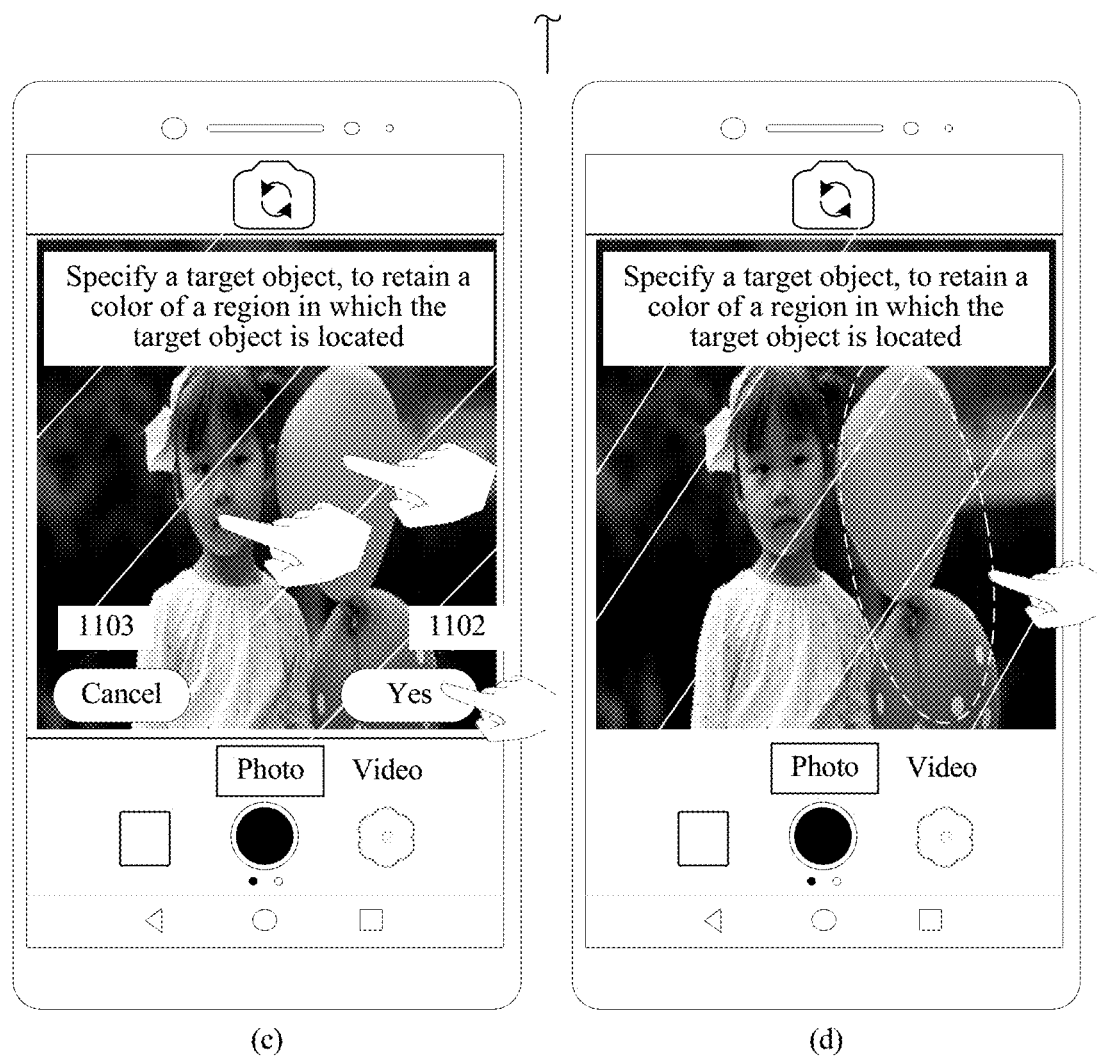

For example, referring to (b) in FIG. 11A and FIG. 11B, after the mobile phone detects an operation that the user taps a body (for example, a balloon) in the viewfinder frame, the body is the target object 1 specified by the user.

For another example, after the mobile phone detects an operation that the user taps a body (for example, a balloon) on an image displayed in the viewfinder frame, a body type of the body is the target object 1 specified by the user.

For another example, referring to (c) in FIG. 11A and FIG. 11B, after the mobile phone detects an operation that the user taps a plurality of bodies (for example, the girl and a balloon on the upper part) on an image displayed in the viewfinder frame and taps a determining control 1102, the plurality of bodies (the girl and the balloon on the upper part) are the target object 1 specified by the user. The plurality of bodies may belong to a same body type, or may belong to different body types. After the user taps a cancel control 1103, the user may re-specify the target object 1.

For another example, referring to (d) in FIG. 11A and FIG. 11B, after the mobile phone detects an operation that the user selects, by drawing a track, a region on an image displayed in the viewfinder frame, a main body (for example, two balloons) in the region is the target object 1 specified by the user.

Figure 12A:
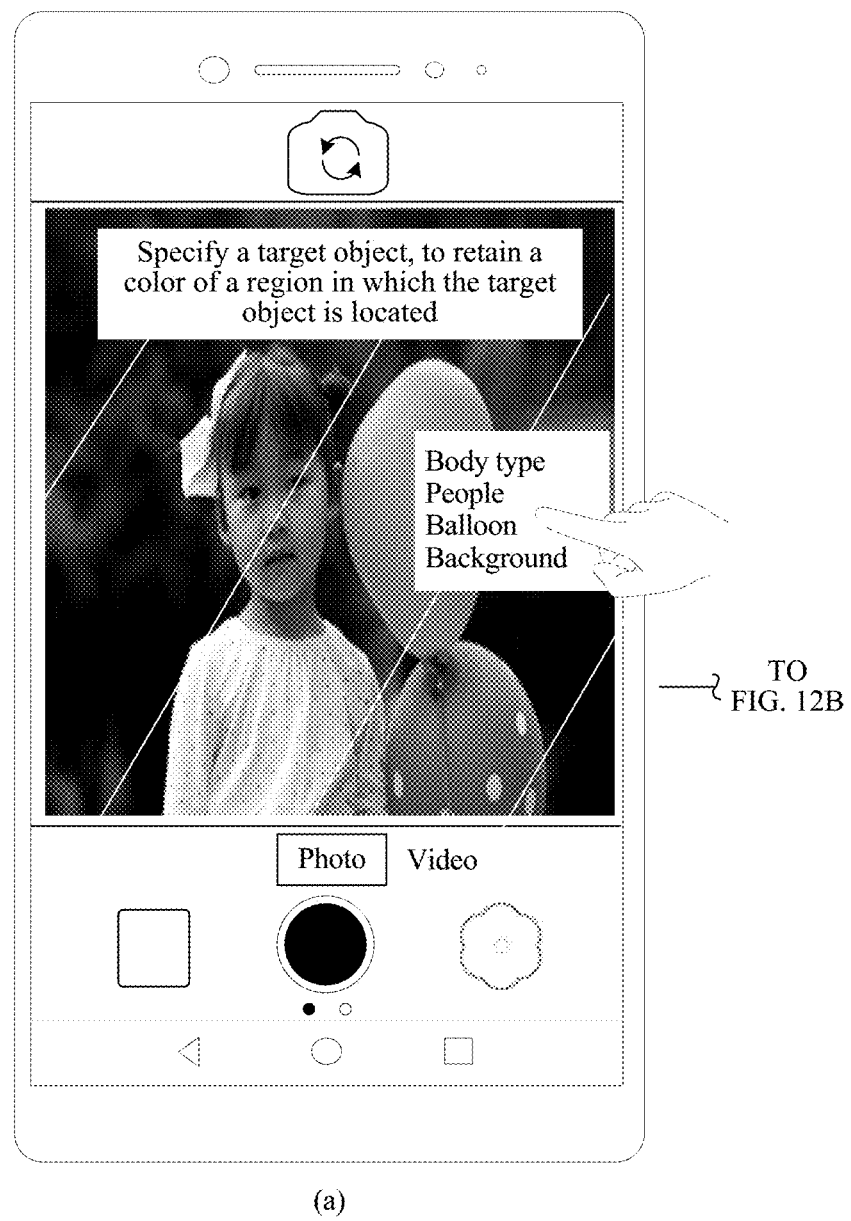
FIG. 12A, FIG. 12B, and FIG. 12C are a schematic diagram of another group of display interfaces according to an embodiment of this application.
Figure 12B:
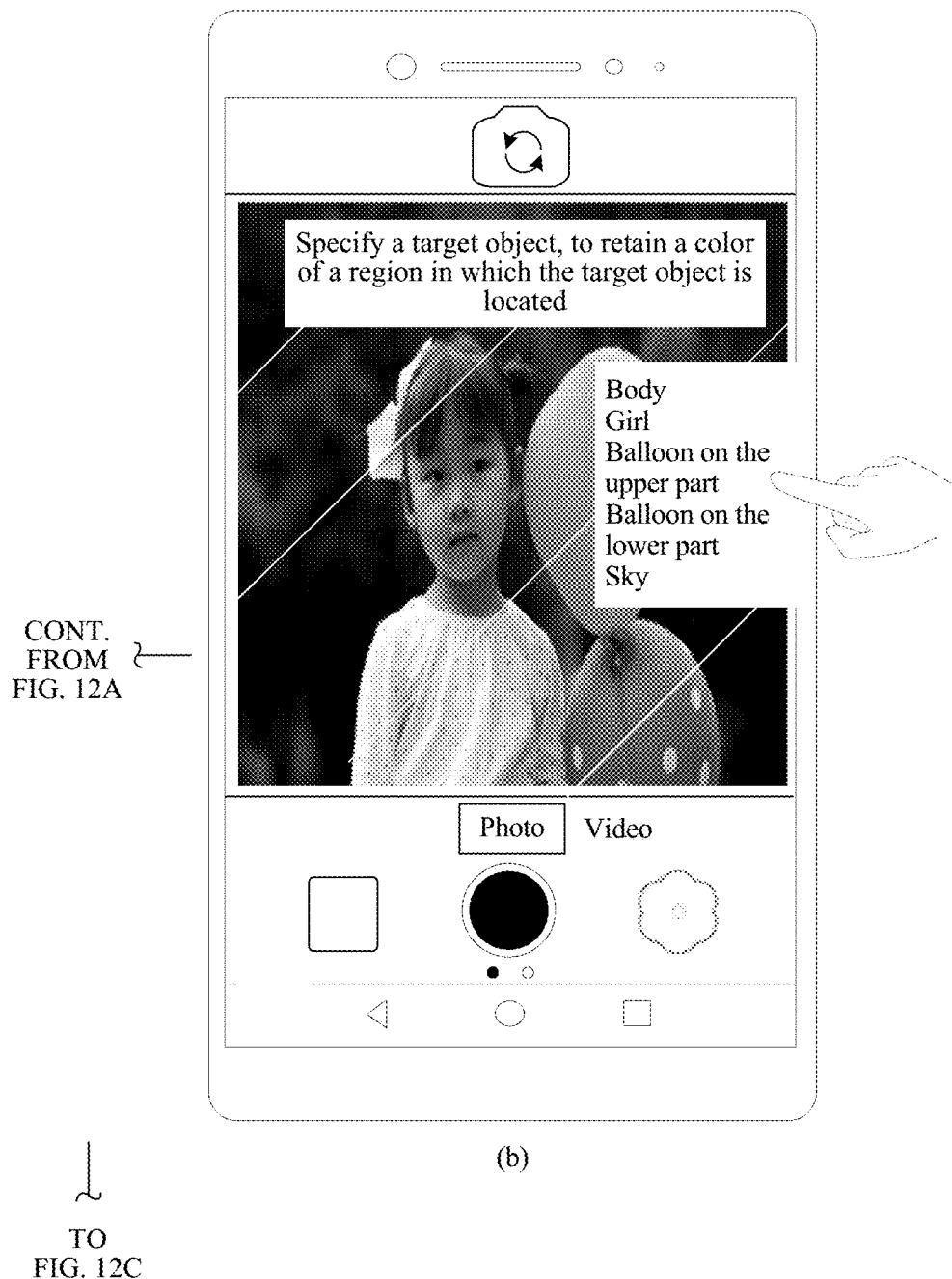
Figure 12C:
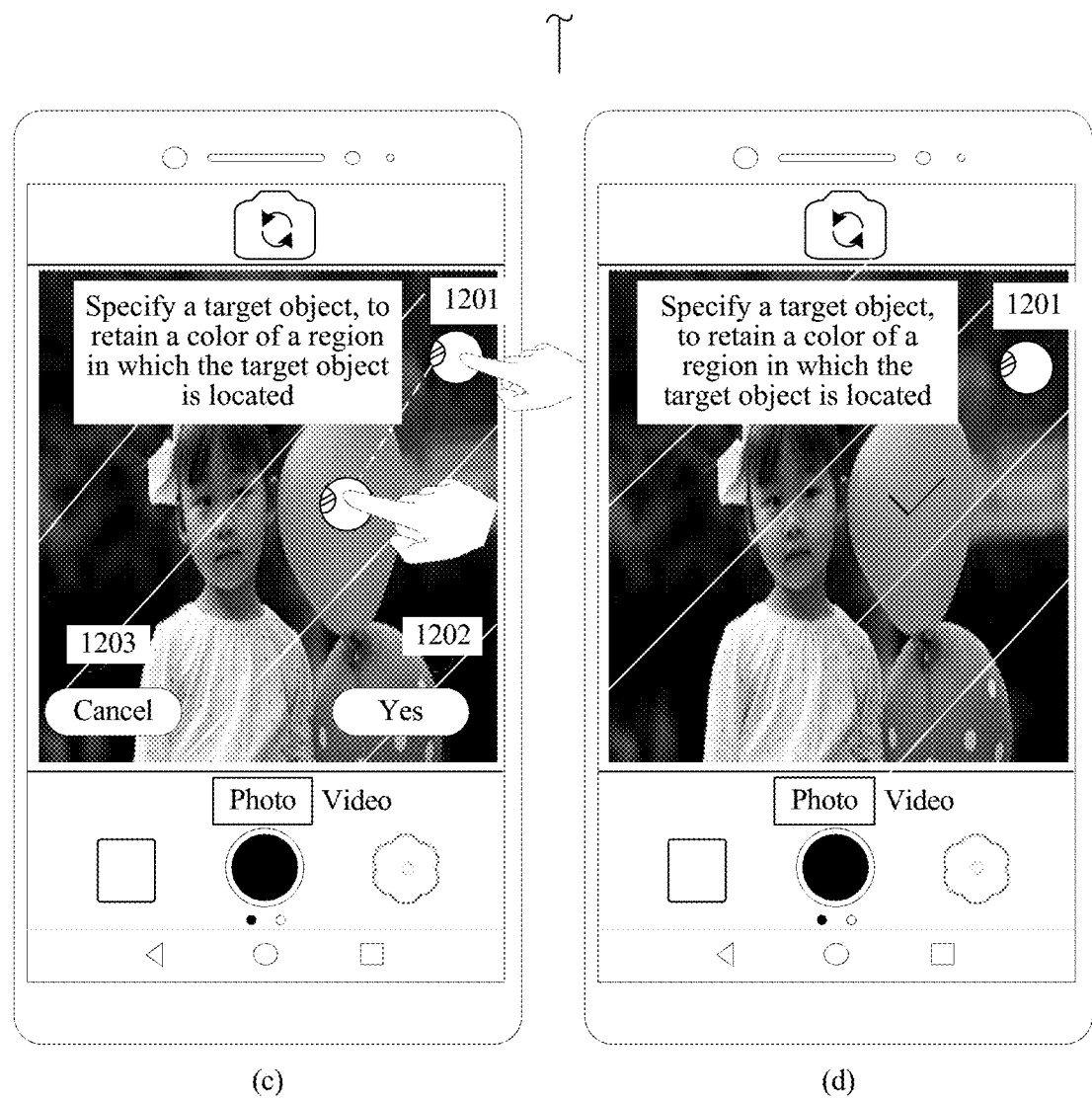

For another example, referring to (a) in FIG. 12A, FIG. 12B, and FIG. 12C, the mobile phone displays a body type list on the capture screen. The body type list may include a plurality of body types (for example, body types included in an image currently displayed in the viewfinder frame). When the mobile phone detects an operation that the user taps a body type (for example, people), the body type is the target object 1.

For another example, referring to (b) in FIG. 12A, FIG. 12B, and FIG. 12C, the mobile phone displays a body list on the capture screen. When the mobile phone detects an operation that the user selects a body (or several bodies), the body selected by the user is the target object 1.

For another example, the mobile phone displays a body type list and a body list on the capture screen. When the mobile phone detects an operation that the user selects a body type or a body, the body type or the body selected by the user is the target object 1.

For another example, bodies on an image displayed in the viewfinder frame of the mobile phone all have numbers. When the mobile phone detects an operation that the user taps a number of a body, the body is the target object 1.

For another example, the mobile phone displays a selection control 1201 on the capture screen. When the user drags the selection control 1201 to a position of a body and then releases the selection control 1201, the body is marked (for example, is ticked). In this manner, the user may select a plurality of bodies (which may belong to a same body type, or may belong to different body types). When the user taps a determining control 1202, the mobile phone determines that all marked bodies are the target object 1.

Figure 13:
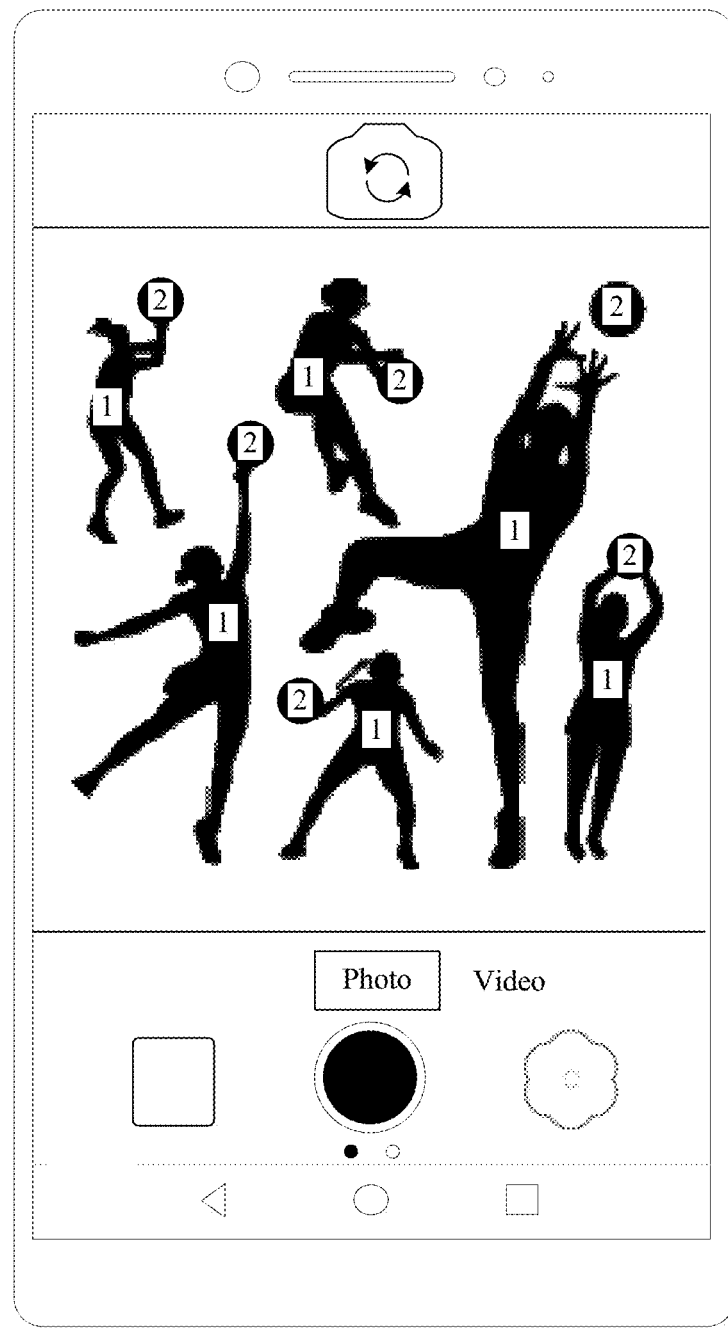
FIG. 13 is a schematic diagram of another display interface according to an embodiment of this application.

The camera lens constantly captures images in real time in the photographing scenario. Therefore, after determining the target object 1, the mobile phone may perform, in real time based on the target object 1, color retention processing on an original image captured by the camera lens, to retain a color of a region in which the target object 1 is located. For example, the target object 1 is people, and after a to-be-photographed object changes from the girl and the balloons shown in (b) in FIG. 9A and FIG. 9B to a team that are doing basketball training on a nearby basketball court, bodies corresponding to the target object 1 are a plurality of basketball players. Referring to FIG. 13, on an image obtained after the mobile phone performs color retention processing based on the target object 1, regions (regions marked with "1") in which the basketball players are located are color images, and other regions (for example, regions in which basketballs are located, namely, regions marked with "2") are grayscale images.

It should be noted that after the mobile phone determines the target object 1, if the original image captured by the camera lens does not include a body corresponding to the target object 1, the mobile phone processes an entire region of the original image as a grayscale image. For example, if the target object 1 is people, and after the mobile phone moves or a position of the girl changes, the original image captured by the camera lens includes only scenery but does not include people, an entire image that is displayed in the viewfinder frame and that is obtained after the color retention processing is a grayscale image.

After the mobile phone displays the image 2 based on the target object 1, if the user needs to change the target object, the user may further specify a new target object 2 in a voice manner or by using a gesture operation, so that when subsequently performing color retention processing, the mobile phone may retain a color of a region in which the target object 2 is located, and perform grayscale processing on a region other than the region in which the target object 2 is located.

For example, the capture screen displays a second control used to specify a target object. After detecting an operation that the user taps the second control, the mobile phone may specify the target object 2 in a manner that is the same as a manner of specifying the target object 1 in (b) to (d) in FIG. 11A and FIG. 11B and (a) to (d) in FIG. 12A, FIG. 12B, and FIG. 12C. Details are not described herein again. For example, the second control may be the control 1201 shown in (d) in FIG FIG. 12A, FIG. 12B, and FIG. 12C. For another example, the second control may be a control 1401 shown in FIG. 14.

For example, a to-be-photographed object is the girl and the balloons shown in (a) in FIG. 9A and FIG. 9B, and the target object 1 is people. For an image obtained after the mobile phone performs color retention processing based on the target object 1, refer to (b) in FIG. 9A and FIG. 9B. After the user specifies the target object 2, and the target object 2 is the balloons, the target object 1 changes to the target object 2. For an image obtained after the mobile phone performs color retention processing based on the target object 2, refer to (c) in FIG. 9A and FIG. 9B.

In an embodiment, after entering the color retention mode, the mobile phone may perform, by default, color retention processing by using the preset target object 1 (for example, people), and display an image obtained after the color retention processing. After the user taps a body (for example, a balloon) on the image displayed in the viewfinder frame, a body type of the body is the target object 2.

After the mobile phone detects an operation performed by the user to instruct to take a photo (for example, an operation that the user taps a photographing control on the capture screen), the mobile phone may store an image obtained after color retention processing is performed on an original image currently captured by the camera lens, in other words, a photographed image is an image obtained after the color retention processing. Specifically, the mobile phone may perform color retention processing based on a current target object (for example, the target object 1 before the change or the target object 2 after the change).

For example, in a single-photo taking mode, after detecting an operation performed by the user to instruct to take a photo, the mobile phone may store an image obtained after the color retention processing.

For another example, in a continuous capture mode, after detecting an operation performed by the user to instruct to take a photo, the mobile phone may perform color retention processing on an original image captured by the camera lens in real time, and store n images obtained after the color retention processing, where n is a preset quantity of images that can be continuously photographed in the continuous capture mode.

Figures 1, 15A:
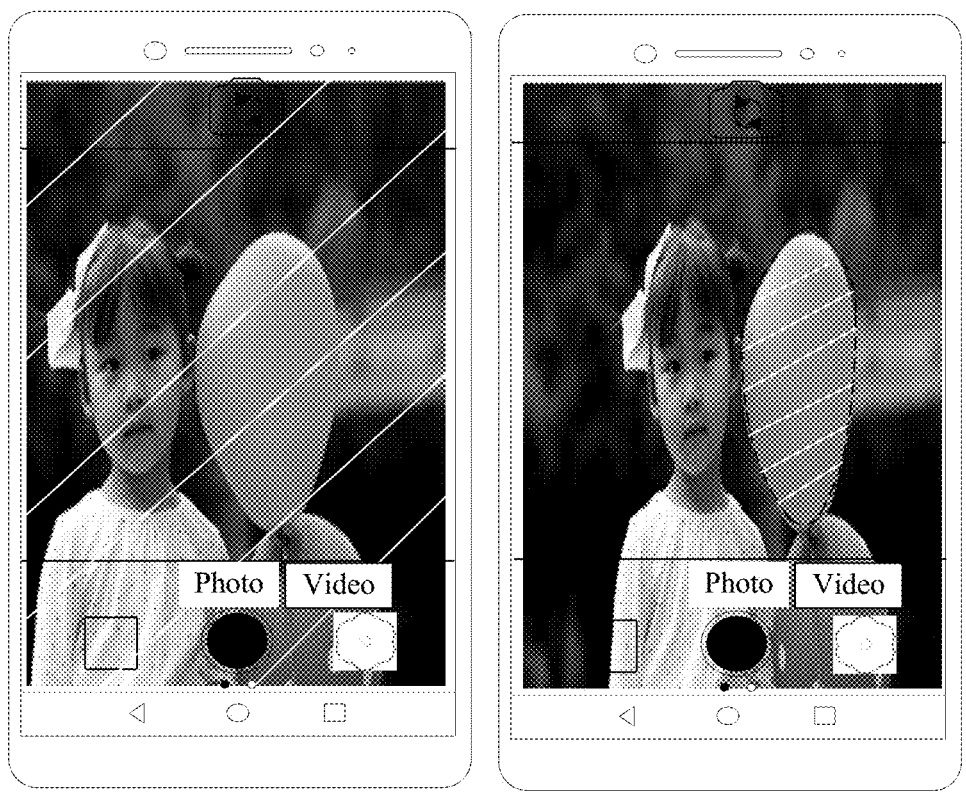
Figures 2, 15A:
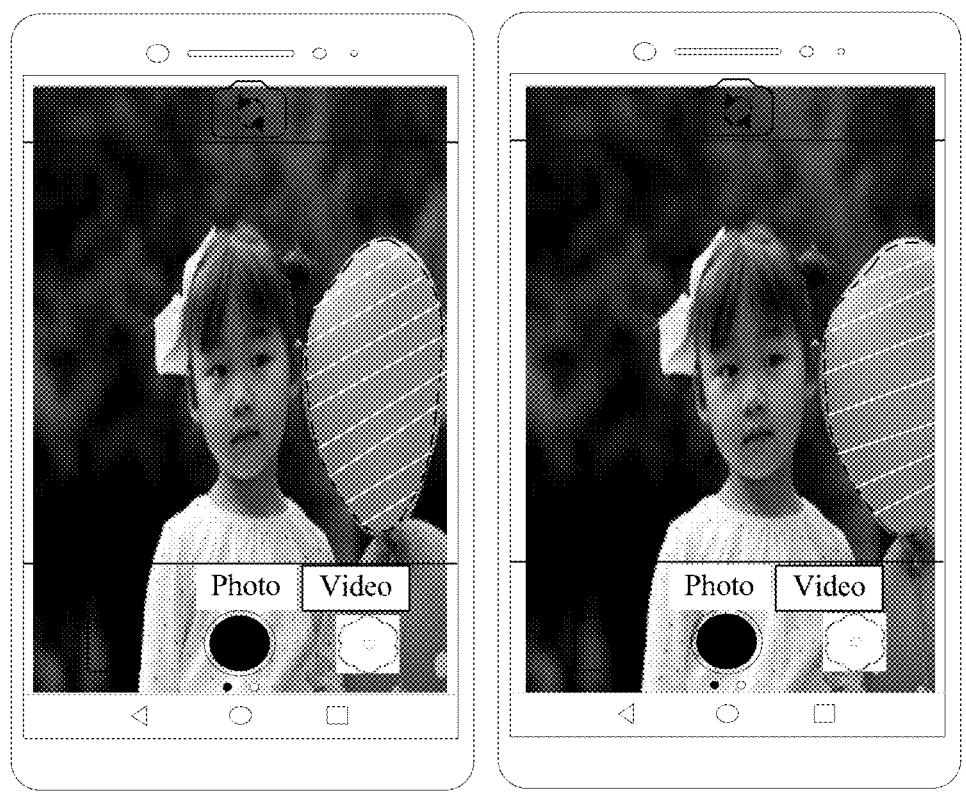

For another example, after the mobile phone opens the camera application, if the mobile phone detects an operation that the user taps the control 406 that is used to indicate a video recording mode and that is shown in (b) in FIG. 4A and FIG. 4B, the mobile phone may display a video shooting screen shown in (a) in FIG. 15A. After entering the color retention mode, after detecting an operation performed by the user to instruct to take a photo (for example, an operation that the user taps a photographing control on the video shooting screen), the mobile phone may perform, in real time, color retention processing on an original image captured by the camera lens, and store an image obtained after the color retention processing, until a video recording process ends. For example, in this process, for a plurality of images displayed by the mobile phone in the viewfinder frame, refer to (a) to (d) in FIG. 15A-1 and FIG. A-2. Parts filled with slashes are color images. It should be noted that in the video shooting process, if an original image does not include a body corresponding to a current target object, an entire image obtained after the color retention processing is a grayscale image.

In another embodiment, after detecting the operation performed by the user to instruct to take a photo, the mobile phone stores both an image obtained after color retention processing is performed on the original image currently captured by the camera lens and the original image.

In another embodiment, the mobile phone may further switch from a normal mode to the color retention mode in the video recording process. For example, after detecting that the user taps the icon 402 shown in (a) in FIG. 4A and FIG. 4B, the mobile phone may display the video shooting screen. After the mobile phone detects that the user taps the photographing control, the mobile phone may start to record a video, and display and store, in real time, color original images captured by the camera lens. After detecting an operation performed by the user to indicate the color retention mode, the mobile phone enters the color retention mode. In the color retention mode, the mobile phone continues to record a video, and displays and stores, in real time, images obtained after color retention processing is performed on original images captured by the camera lens. In other words, the video recorded by the mobile phone includes a video segment recorded in a normal video recording mode and a video segment recorded in the color retention mode, images in the video segment recorded in the normal video recording mode are color images, and images in the video segment recorded in the color retention mode are grayscale images. For example, in this process, for a plurality of images displayed by the mobile phone in the viewfinder frame, refer to (a) to (d) in FIG. 15B-1 and FIG. 15B-2. Parts filled with slashes are color images.

Figure 16:
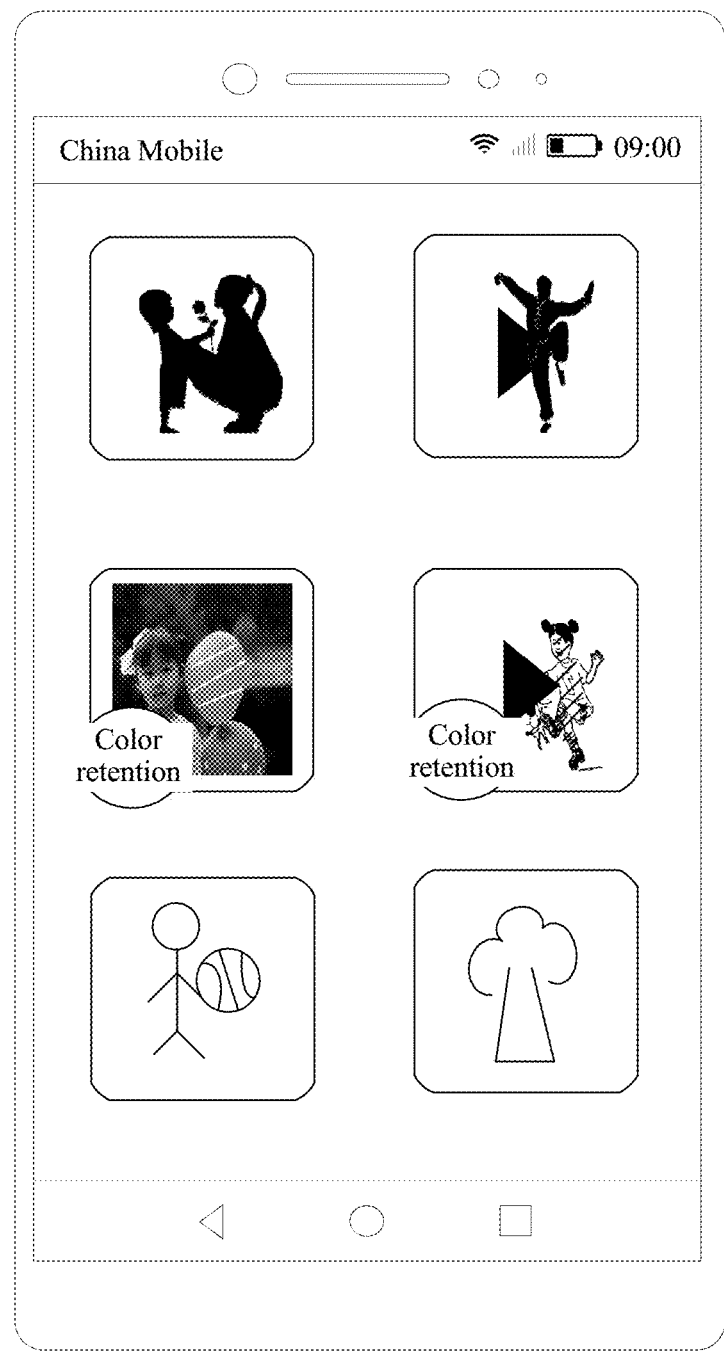
FIG. 16 is a schematic diagram of another display interface according to an embodiment of this application.

In an embodiment, the mobile phone may further mark a photo and a video that are obtained in the color retention mode. For example, referring to FIG. 16, the mobile phone may tag the photo and the video, to indicate that the photo and the video are obtained after the color retention processing. For another example, the mobile phone may classify photos photographed in the color retention mode into one file, and classify videos shot in the color retention mode into one file.

In another embodiment, in a lock screen state or on the desktop, after detecting another preset gesture of the user (for example, the user draws a track "R" by using a finger), the mobile phone may directly open the camera application and enter the color retention mode.

In an embodiment, in the color retention mode, after completing a current photographing operation (for example, photographing a photo or shooting a video), the mobile phone may automatically exit the color photographing mode.

In another embodiment, in the color retention mode, the mobile phone is still in the color retention mode after completing the current photographing operation. After exiting the camera application, the mobile phone may automatically exit the color retention mode.

In another embodiment, in the color retention mode, after detecting that the user instructs, in a voice manner or by using a gesture operation, to exit the color retention mode, the mobile phone may exit the color retention mode. For example, in the color retention mode, if detecting an operation that the user taps a back (back) control, the mobile phone exits the color retention mode.

For another example, in the color retention mode, when the capture screen displays a control used to identify the color retention mode, if the mobile phone detects an operation that the user attempts to drag the control outside the touchscreen of the mobile phone, the mobile phone exits the color retention mode. If the mobile phone does not exit the color retention mode when previously exiting the camera, after the mobile phone currently opens the camera application, the mobile phone may directly enter the color retention mode.

For another example, in the color retention mode, the capture screen displays a control used to identify the color retention mode. The control may be the identifier 905 shown in (d) in FIG. 9A and FIG. 9B, and the identifier 905 is attached with a mark "x". When detecting an operation that the user taps the mark "x", the mobile phone exits the color retention mode.

The method for displaying an image in this embodiment of this application is described above by using the (photo or video) photographing scenario as an example. The method for displaying an image in this embodiment of this application may be further applied to another scenario.

For example, the method for displaying an image in this embodiment of this application may be further applied to a case in which color retention processing is performed on a previously photographed image or a image obtained from another device.

Figure 17A:
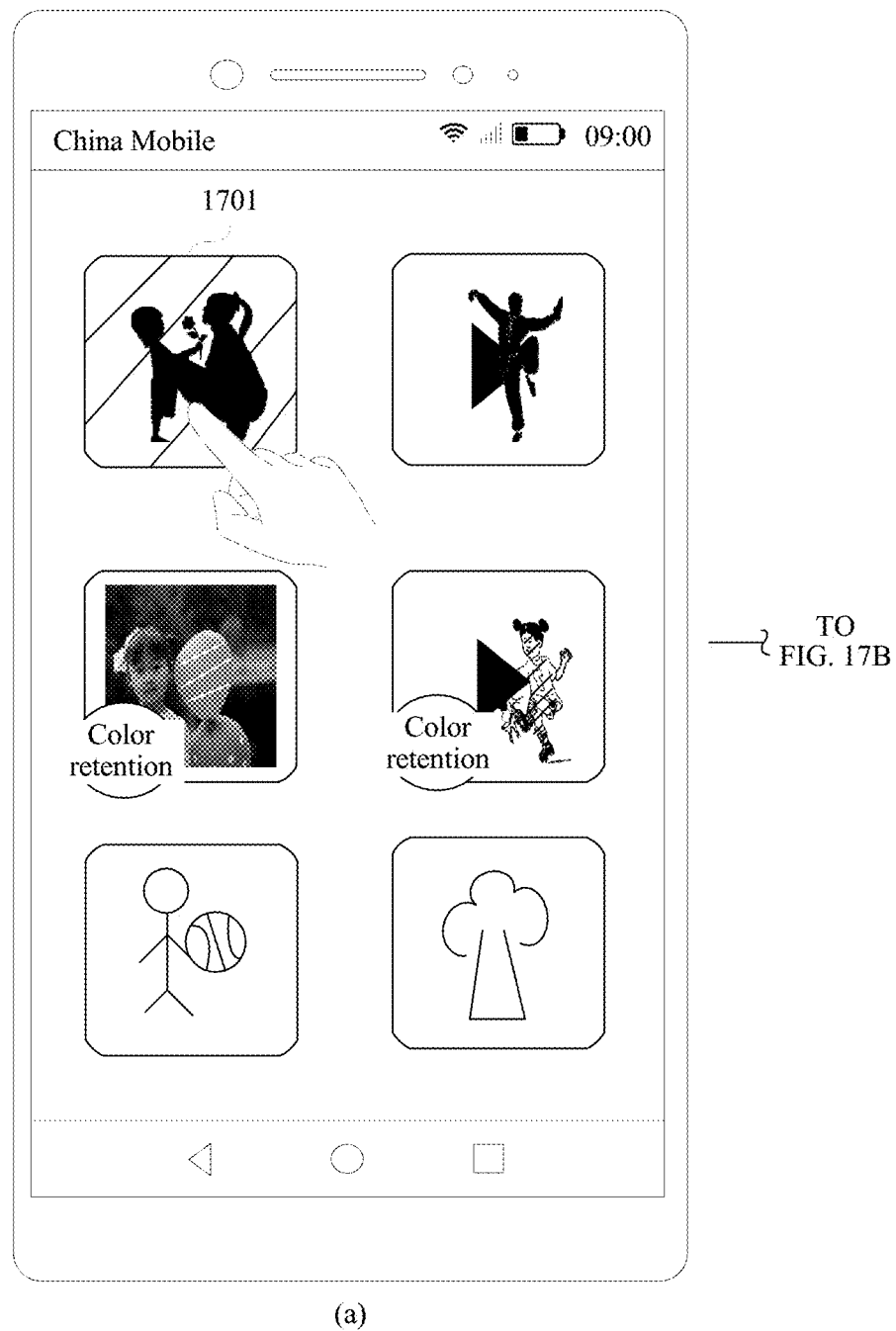
FIG. 17A, FIG. 17B, and FIG. 17C are a schematic diagram of another group of display interfaces according to an embodiment of this application.
Figure 17B:
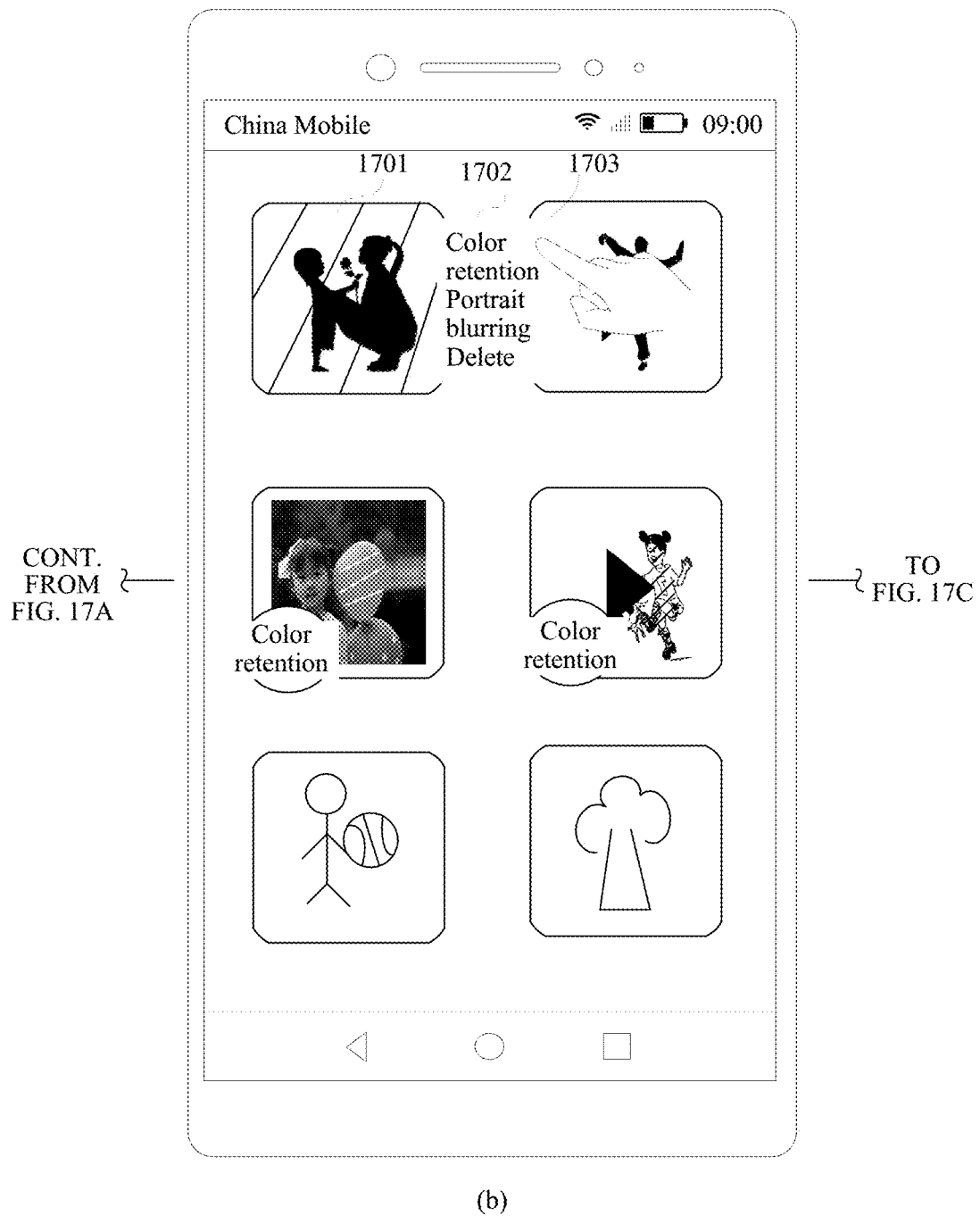
Figure 17C:
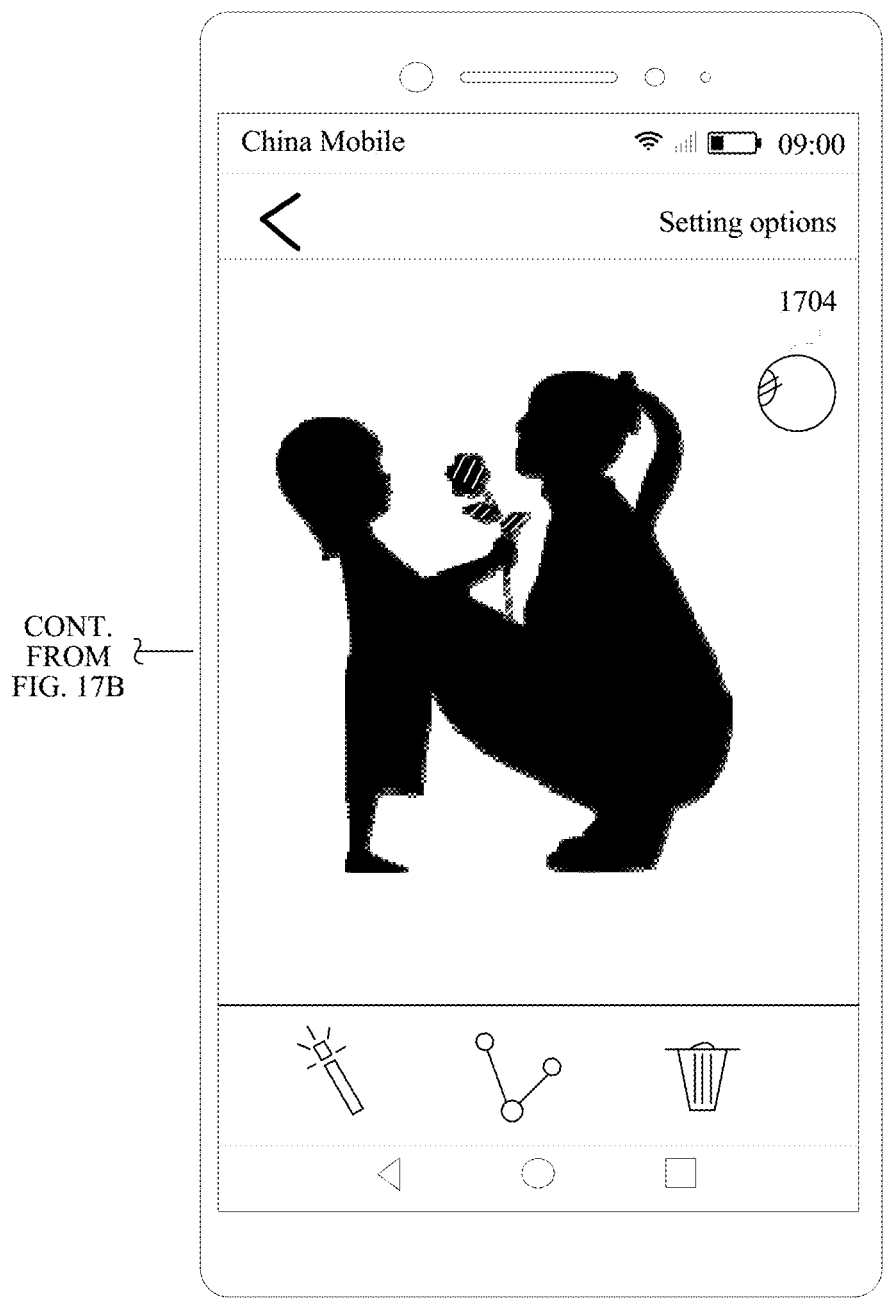

For example, referring to (a) in FIG. 17A, FIG. 17B, and FIG. 17C, when the mobile phone detects an operation that the user touches and holds a thumbnail 1701 of a photographed image 1 in photos (filling with slashes is used to indicate that the image 1 is a color image), referring to (b) in FIG. 17A, FIG. 17B, and FIG. 17C, the mobile phone may display a menu list 1702. The menu list 1702 includes a color retention option 1703, a portrait blurring option, a deletion option, and the like. After detecting an operation that the user taps the color retention option, the mobile phone may open the image 1 (in other words, amplify the image 1 for display, where filling with the slashes is used to indicate that the image 1 is the color image), and enter the color retention mode. As shown in (c) in FIG. 17A, FIG. 17B, and FIG. 17C, the mobile phone may prompt the user that the mobile phone has entered the color retention mode, and display an identifier 1704 of the color retention mode.

For another example, after detecting an operation that the user taps a thumbnail 1701 of a photographed image 1 in photos, the mobile phone opens the image 1. After the mobile phone detects an operation performed by the user to indicate the color retention mode in a voice manner or by using a gesture operation, the mobile phone enters the color retention mode.

For another example, after the image 1 is opened, a display interface of the image 1 includes a third control used to indicate the color retention mode. When the user taps the third control, the mobile phone enters the color retention mode.

Figure 18A:
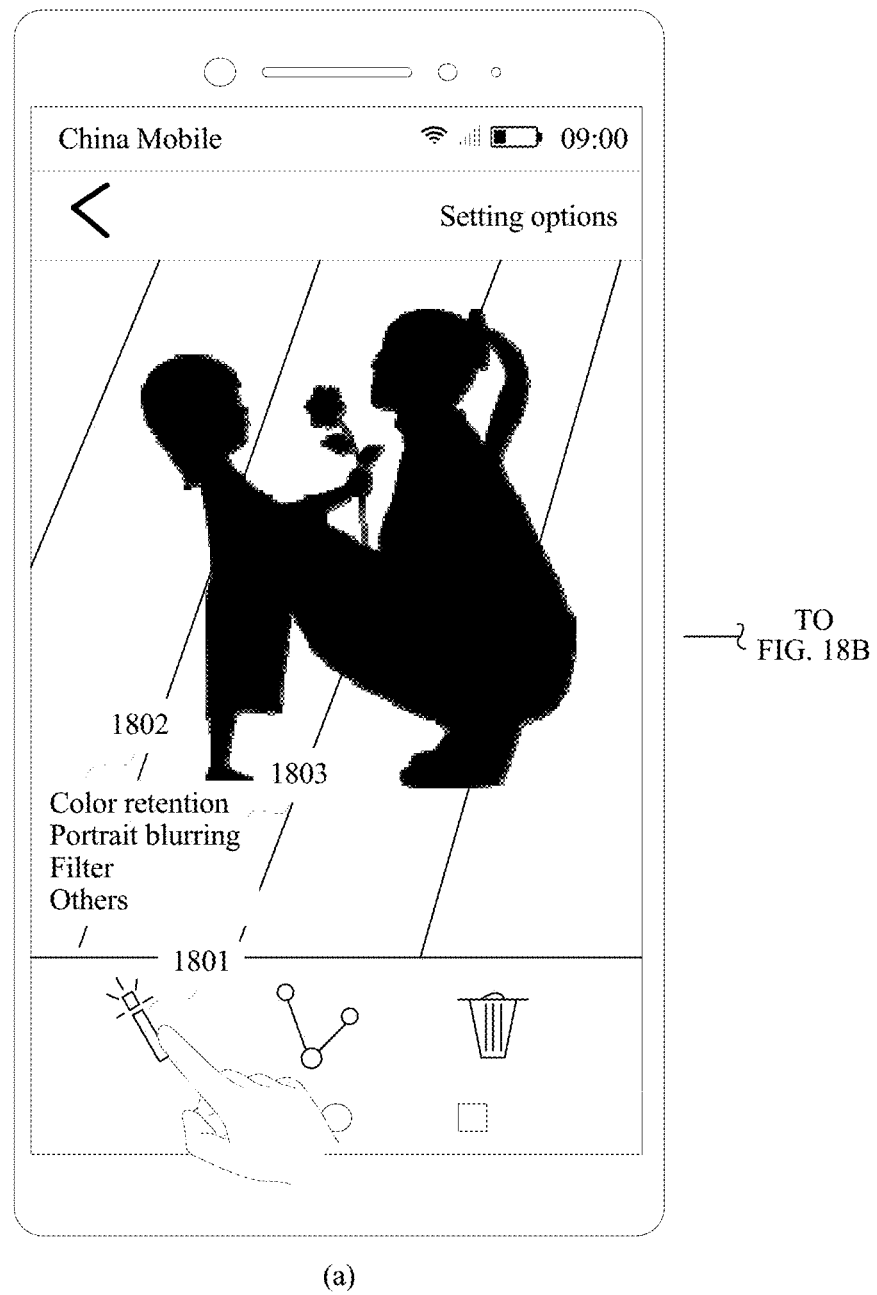
FIG. 18A, FIG. 18B, and FIG. 18C are a schematic diagram of another group of display interfaces according to an embodiment of this application.
Figure 18B:
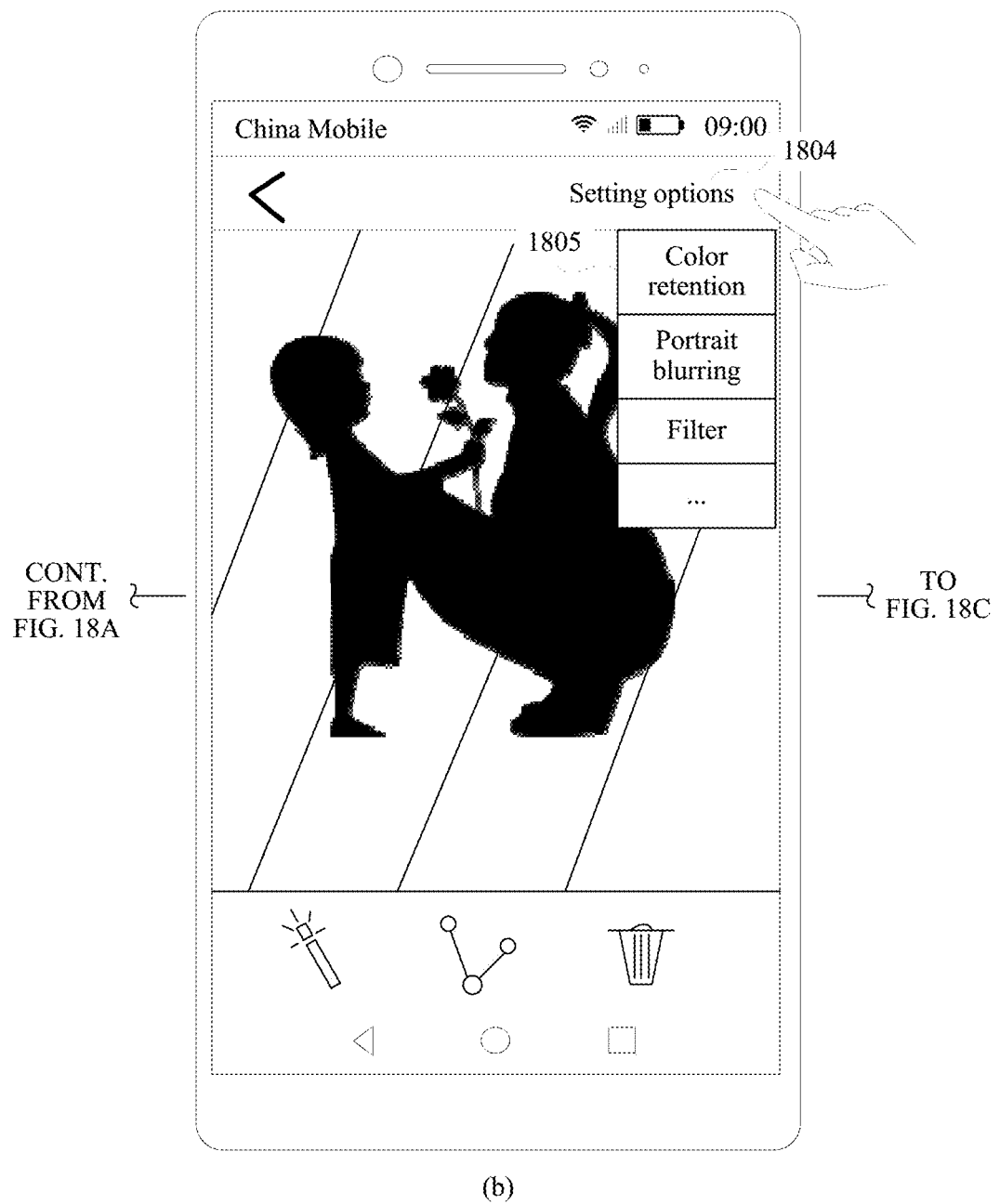
Figure 18C:
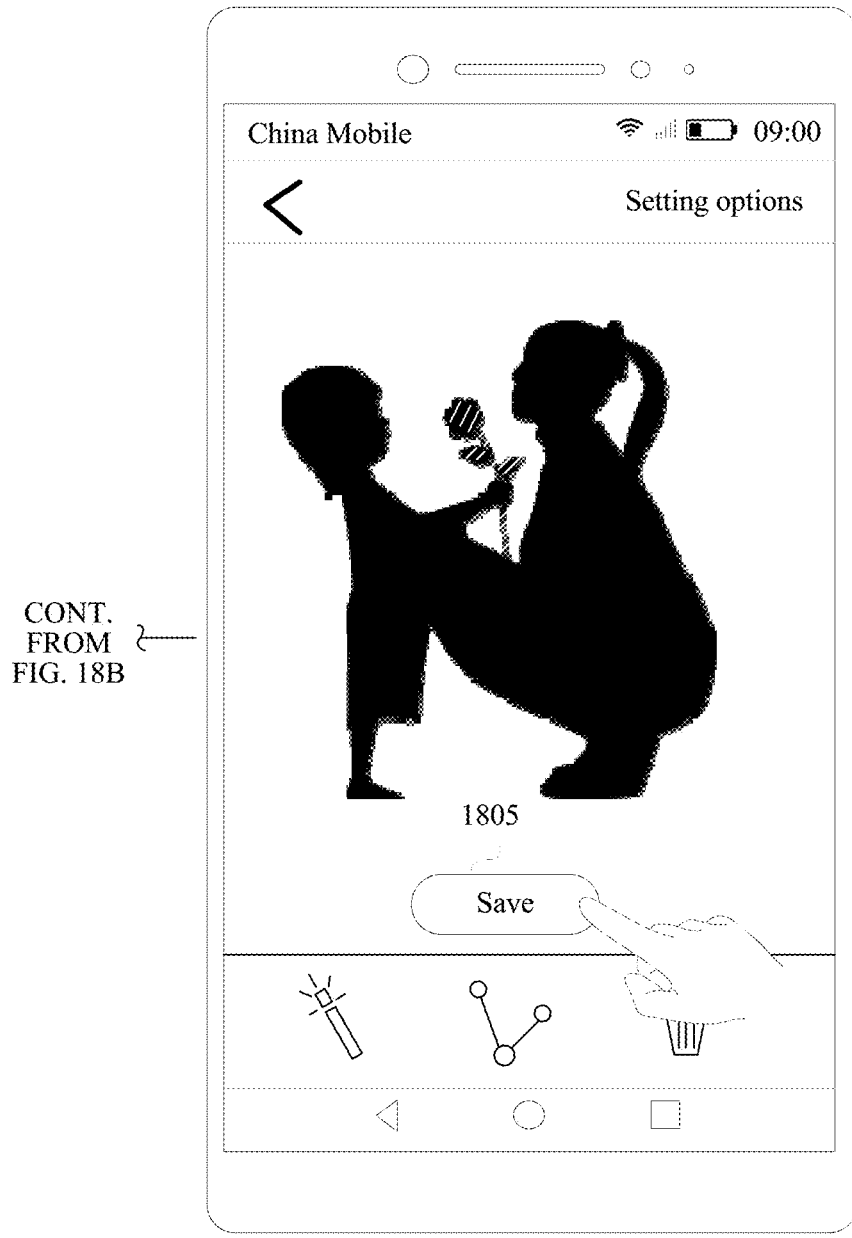

For another example, referring to (a) in FIG. 18A, FIG. 18B, and FIG. 18C, after the image 1 is opened, a display interface of the image 1 (filling with slashes is used to indicate that the image 1 is a color image) includes a magic wand control 1801. After the mobile phone detects that the user taps the control 1801, the mobile phone displays a function list 1802. The function list 1802 includes a control 1803 used to indicate the color retention mode. After the mobile phone detects that the user taps the control 1803, the mobile phone enters the color retention mode.

For another example, referring to (b) in FIG. 18A, FIG. 18B, and FIG. 18C, after the image 1 is opened, a display interface of the image 1 (filling with slashes is used to indicate that the image 1 is a color image) includes a setting option 1804. After the mobile phone detects an operation that the user taps the setting option 1804, referring to (b) in FIG. 18A, FIG. 18B, and FIG. 18C, the mobile phone displays a setting option interface. After the mobile phone detects that the user taps a control 1805 used to indicate a color retention mode on the setting option interface, the mobile phone enters the color retention mode.

Similar to the photographing scenario, after entering the color retention mode, the mobile phone may further determine a target object (the target object may be preset, may be automatically determined by the mobile phone, or may be specified by the user). The user may further change the target object, and the mobile phone may perform color retention processing on the image 1 based on a current target object.

For example, if the target object is a flower, for an image obtained after color retention processing is performed on the image 1, refer to (c) in FIG. 17A, FIG. 17B, and FIG. 17C or (c) in FIG. 18A, FIG. 18B, and FIG. 18C. A region (a region filled with slashes in the figure) in which the flower is located is a color image, and the other region is a grayscale image.

In addition, after the mobile phone enters the color retention mode, the display interface of the image 1 may further display a control used to instruct to determine the color retention processing or a control used to instruct to store a image. In an embodiment, after detecting that the user taps the control, the mobile phone may store an image obtained after color processing is performed on the image 1 and the image 1. In another embodiment, after detecting that the user taps the control, the mobile phone may store an image obtained after color processing is performed on the image 1, and delete the image 1. For example, the control used to instruct to store a image may be a control 1805 shown in (c) in FIG. 18A, FIG. 18B, and FIG. 18C.

Similar to a process in which the mobile phone performs color retention processing on the previously photographed image or the image obtained from the another device, the method for displaying an image in this embodiment of this application may be further applied to a case in which color retention processing is performed on a previously shot video or a video obtained from another device. Details are not described herein again. In a simple example, after detecting an operation performed by the user to open a video 1, the mobile phone may display an interface corresponding to the video 1 (the video 1 is not played). After detecting an operation performed by the user to indicate the color retention mode, the mobile phone enters the color retention mode. After detecting an operation performed by the user to instruct to play the video 1, the mobile phone plays the video 1, and images in the video 1 displayed by the mobile phone are images obtained after color retention processing is performed on color original images in the video 1. In another simple example, after the mobile phone detects an operation performed by the user to open a video 1, the mobile phone may display an interface corresponding to the video 1. After detecting an operation performed by the user to instruct to play the video 1, the mobile phone plays the video 1, and images in the video 1 displayed by the mobile phone are color images. After detecting an operation performed by the user to indicate the color retention mode, the mobile phone enters the color retention mode, and images in the video 1 subsequently displayed by the mobile phone are images obtained after color retention processing is performed on color original images in the video 1.

In the foregoing embodiment, after entering the color retention mode, the mobile phone may perform image segmentation on the original image captured by the camera lens, to obtain the region in which each body is located or the region corresponding to each body type on the original image. After the mobile phone determines the target object, the mobile phone keeps pixel values of pixels in a region in which the target object is located unchanged, in other words, a target region corresponding to the target object is a color image, and converts pixel values of pixels in a region other than the region in which the target object is located into grayscale values, in other words, a region other than the target region corresponding to the target object is a grayscale image. In this way, an image color of a region in which the target object is located on an image obtained after the color retention processing is the same as an image color of a region in which the target object is located on the original image.

As mentioned above, the mobile phone may perform image segmentation by using a plurality of algorithms, and an example in which image segmentation is performed by using a CNN-based deep learning algorithm is used herein for description.

Figure 19:
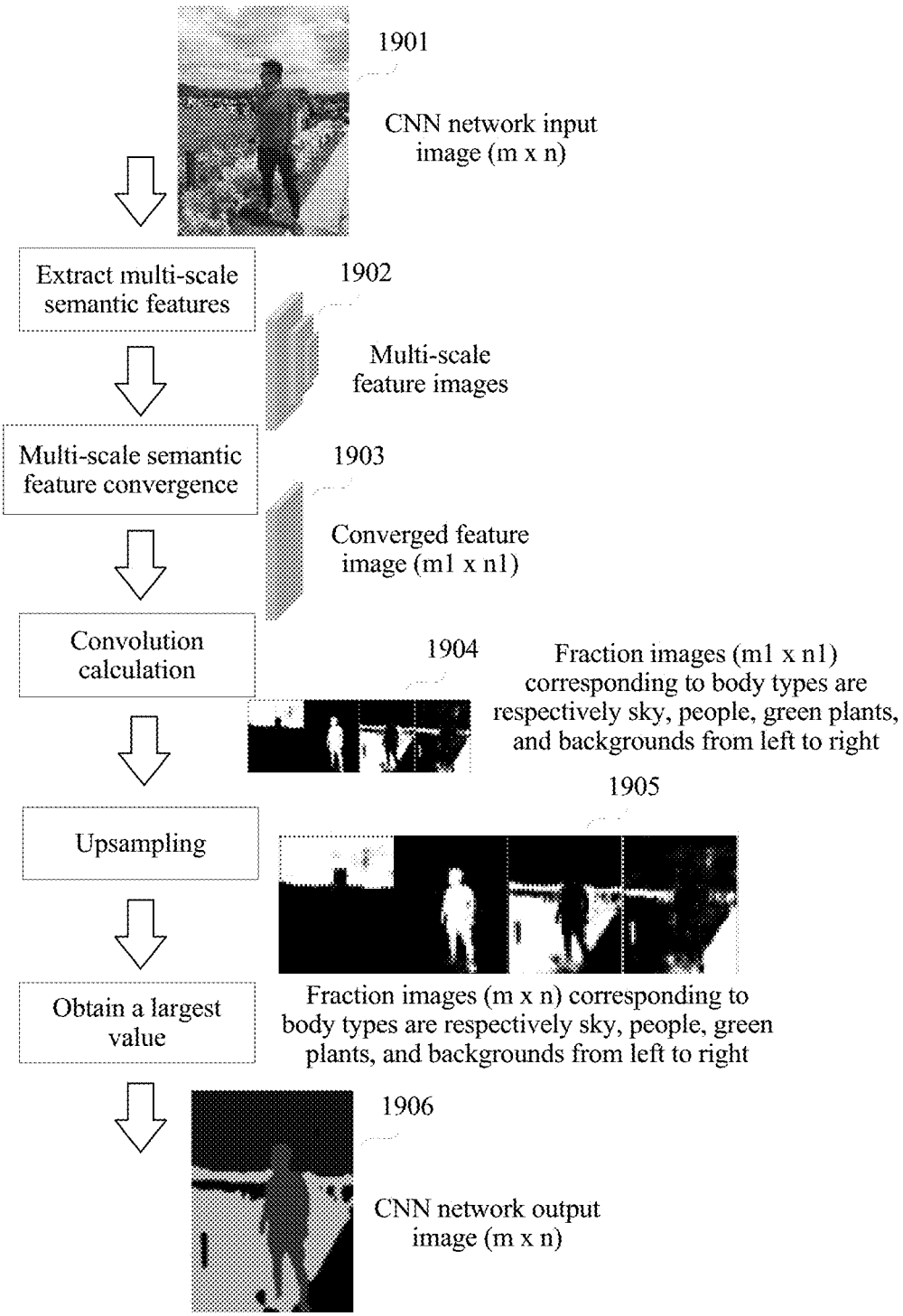
FIG. 19 is a schematic diagram of an image segmentation process according to an embodiment of this application.

Based on this algorithm, after obtaining the original image captured by the camera lens, the mobile phone may perform downsampling on the original image, and convert the original image into an image with relatively low resolution for complex CNN-based calculation, so as to reduce a calculation amount. For example, referring to FIG. 19, the original image is an image 1901, a unit for image segmentation is a body type, and the body type includes sky, people, green plants, and the background. The mobile phone processes a size of M×N (namely, resolution of M×N) of the original image as a size of m×n, where m is less than M, and n is less than N. The mobile phone extracts semantic features of the image layer by layer through convolution and downsampling operations (including but not limited to stride convolution, pooling, and the like), to obtain multi-scale feature images 1902 whose sizes are respectively m1×n1, m2×n2, and m3×n3, where a multiple relationship exists between m1, m2, and m3, m1, m2, and m3 are less than m, a multiple relationship exists between n1, n2, and n3, and n1, n2, and n3 are less than n. Then, the mobile phone converges the obtained multi-scale feature images 1902 through convolution and upsampling operations, to obtain a converged feature image 1903 with a size of m1×n1. Next, the mobile phone performs convolution calculation on the converged feature image 1903, and calculates a segmentation value of each object on each pixel, to obtain four fraction images 1904 that are respectively corresponding to sky, people, green plants, and the background. A size of the fraction image is m1×n1. An upsampling operation is performed on each of the obtained four fraction images, to obtain four fraction images 1905 with a size of m×n. Segmentation values of corresponding pixels on the four fraction images are compared with each other pixel by pixel, and a body type corresponding to a fraction image of a largest segmentation value is a body type corresponding to a current pixel, to obtain a body type corresponding to each pixel, in other words, obtain a mask image 1906 (with a size of m×n). On the mask image 1906, regions corresponding to different body types have different marks. For example, colors of the regions corresponding to the different body types are different.

After the mask image is obtained, upsampling is performed on the mask image to obtain a size of M×N that is the same as that of the original image. In this way, pixel regions corresponding to different body types on the original image can be obtained by making a comparison with the mask image. The mobile phone determines, one by one, whether pixels on the original image are in a region in which the target object is located. If the pixels are in the region in which the target object is located, the mobile phone retains pixel values of the pixels. If the pixels are not in the region in which the target object is located, the mobile phone converts pixel values of the pixels into grayscale values. In this way, the region in which the target object is located is a color image, and a region other than the region in which the target object is located is a grayscale image. Subsequently, the mobile phone may perform processing such as encoding on the image obtained after the color retention processing, and display the image on the capture screen.

It should be noted that the foregoing examples are described by using an example in which the unit for image segmentation is the body type, and the unit for image segmentation may be alternatively a body. In this way, a region in which each body is located on the original image may be obtained through image segmentation, so that the region in which the target object is located (which may be corresponding to one or more bodies) may be retained as a color image based on the region in which each body is located, and a region other than the region in which the target object is located is set to a grayscale image.

Figure 20:
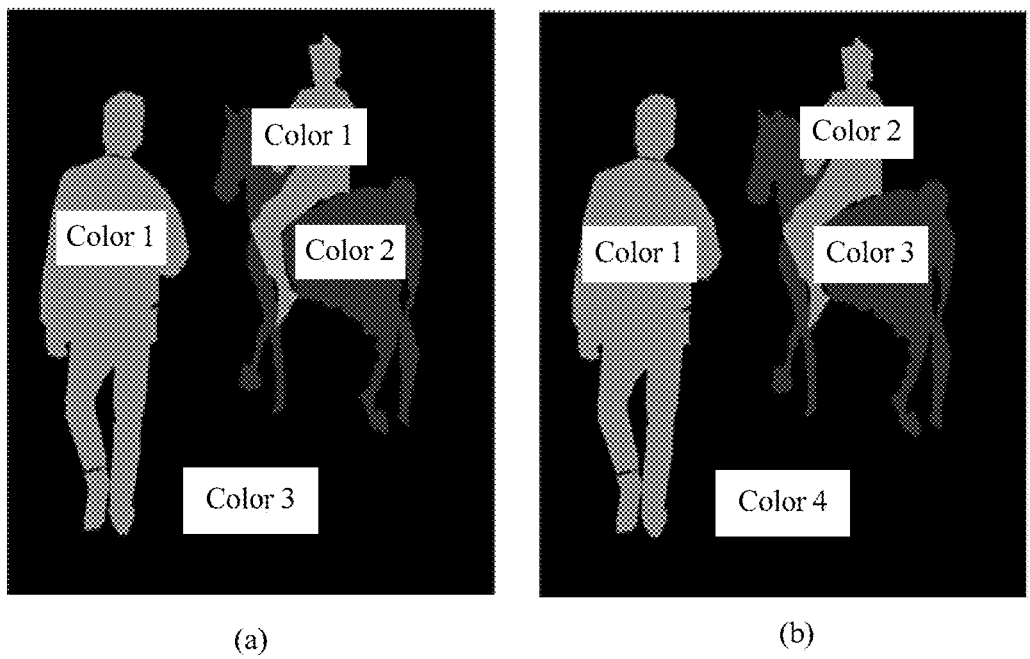
FIG. 20 is a schematic diagram of a group of image segmentation results according to an embodiment of this application.

For example, for a color original image, when the unit for image segmentation is a body type, the mask image may be an image shown in (a) in FIG. 20. Regions in which a person 1 and a person 2 are located are both a color 1, which indicates that the person 1 and the person 2 are corresponding to a same body type. A region in which a horse is located is color 2, and a region in which a background is located is a color 3. When the unit for image segmentation is a body, the mask image may be an image shown in (b) in FIG. 20. A region in which a person 1 is located is a color 1, a region in which a person 2 is located is a color 2, and the person 1 and the person 2 are different bodies. A region in which a horse is located is a color 3, and a region in which a background is located is a color 4.

Figure 21:
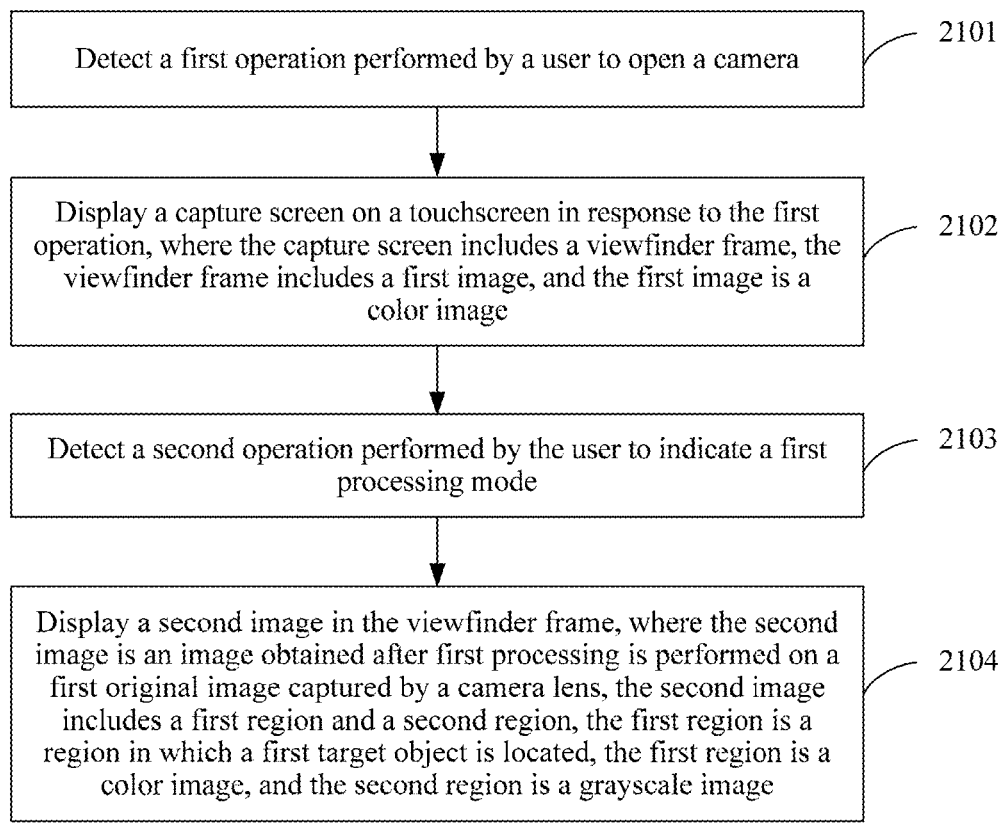
FIG. 21 is a flowchart of a method for displaying an image according to an embodiment of this application.

With reference to the foregoing embodiments and related accompanying drawings, an embodiment of this application provides a method for displaying an image in a photographing scenario. The method may be implemented by an electronic device (for example, a mobile phone or a tablet computer) having a touchscreen and a camera lens in FIG. 2 and FIG. 3. As shown in FIG. 21, the method may include the following steps.

2101. The electronic device detects a first operation performed by a user to open a camera.

For example, the first operation may be an operation that the user taps an icon 402 of the camera shown in (a) in FIG. 4A and FIG. 4B.

2102. The electronic device displays a capture screen on the touchscreen in response to the first operation, where the capture screen includes a viewfinder frame, the viewfinder frame includes a first image, and the first image is a color image.

In response to the first operation, the electronic device enters a photographing mode, and displays the capture screen. The capture screen includes the viewfinder frame. The photographing mode may be a photo taking mode, or may be a video recording mode (namely, a video shooting mode). For example, the capture screen may be the capture screen 403 shown in (b) in FIG. 4 FIG. 4A and FIG. 4B.

2103. The electronic device detects a second operation performed by the user to indicate a first processing mode.

The first processing mode may be the foregoing color retention mode. For example, the capture screen may include a control used to indicate the first processing mode, and the second operation is an operation that the user taps the control. For example, the second operation may be an operation that the user taps a control 501 shown in (a) in FIG. 5, or an operation that the user taps a control 502 shown in (b) in FIG. 5.

In another example, the second operation may be an operation that the user taps a control 601 shown in (a) in FIG. 6A and FIG. 6B and taps a control 603 shown in (b) in FIG. 6A and FIG. 6B.

2104. The electronic device displays a second image in the viewfinder frame in response to the second operation, where the second image is an image obtained after first processing is performed on a first original image captured by the camera lens.

The first processing may be the foregoing color retention processing. The second image includes a first region and a second region, the first region is a region in which a first target object is located on the second image, and the second region is a region other than the first region on the second image. The first region is a color image, and the second region is a grayscale image. The first target object is one or more body types, or the first target object is one or more bodies. When the first target object is a body type, the region in which the first target object is located is a region in which a body belonging to a first target type is located.

For example, the first original image may be an image 3 shown in (a) in FIG. 9A and FIG. 9B, the first target object may be people, the second image may be an image 2 shown in (b) in FIG. 9A and FIG. 9B, the first region may be a region in which the girl is located, and the second region may be a region other than the region in which the girl is located.

An image in the first region is the same as an image in a region in which the first target object is located on the first original image, and a color of the image in the first region is the same as a color of the image in the region in which the first target object is located on the first original image. In other words, the color of the image in the region in which the first target object is located on the first original image is retained on the second image. In addition, an image in the second region on the second image is an image obtained after grayscale processing is performed on an image in a region other than the region in which the first target object is located on the first original image.

In the solution described in step 2101 to step 2104, in a photographing scenario, the electronic device may retain a color based on a body or a body type, to completely retain a color of an entire region in which a body is located on an image. Therefore, a prior-art case in which a part of a body is a color image and the other part of the body is a grayscale image does not occur, so as to improve an image processing effect and an image display effect.

In an embodiment, that the electronic device displays a second image in the viewfinder frame in step 2104 may specifically include: obtaining, by the electronic device, the first original image captured by the camera lens; performing, by the electronic device, image segmentation on the first original image, to obtain regions in which a plurality of objects included in the first original image are respectively located, where the object is a body type or a body; retaining, by the electronic device, pixel values of pixels in the first region in which the first target object is located on the first original image, and converting pixel values of pixels in a region other than the first region on the first original image into grayscale values; and generating and displaying, by the electronic device, the second image.

In other words, the electronic device may perform image segmentation, to obtain regions respectively corresponding to a plurality of body types included in the color first original image, or to obtain regions in which a plurality of bodies included in the color first original image are respectively located. Then, the electronic device may retain the color of the region in which the first target object is located and perform grayscale processing on the other region based on the regions obtained through segmentation, to retain a color of an entire region in which each body in the first target object is located.

In an embodiment, the first target object is a preset target object.

In another embodiment, the first target object is a target object that is automatically determined based on a to-be-photographed subject on the first original image.

In another embodiment, the first target object is a target object specified by the user. In this solution, step 2104 may specifically include: prompting, by the electronic device, the user to specify the first target object. For example, referring to (a) in FIG. 11A and FIG. 11B, the electronic device may prompt, by using text information 1101, the user to specify the target object.

If a third operation performed by the user to specify the first target object is detected, the second image is displayed in the viewfinder frame in response to the third operation.

For example, the third operation may be an operation that the user taps a first body on an image displayed in the viewfinder frame. The first target object is the first body, or the first target object is a body type of the first body. For example, referring to (b) in FIG. 11A and FIG. 11B, when the user taps a balloon, the first target object is the balloon.

For another example, the third operation may be that the electronic device detects an operation that the user selects, by drawing a track, a fifth region on an image displayed in the viewfinder frame. The first target object is a body included in the fifth region, or the first target object is a body type of a body included in the fifth region. For example, referring to (d) in FIG. FIG. 11A and FIG. 11B, when the region selected by the user by drawing the track includes two balloons, the two balloons are the first target object.

Figure 22:
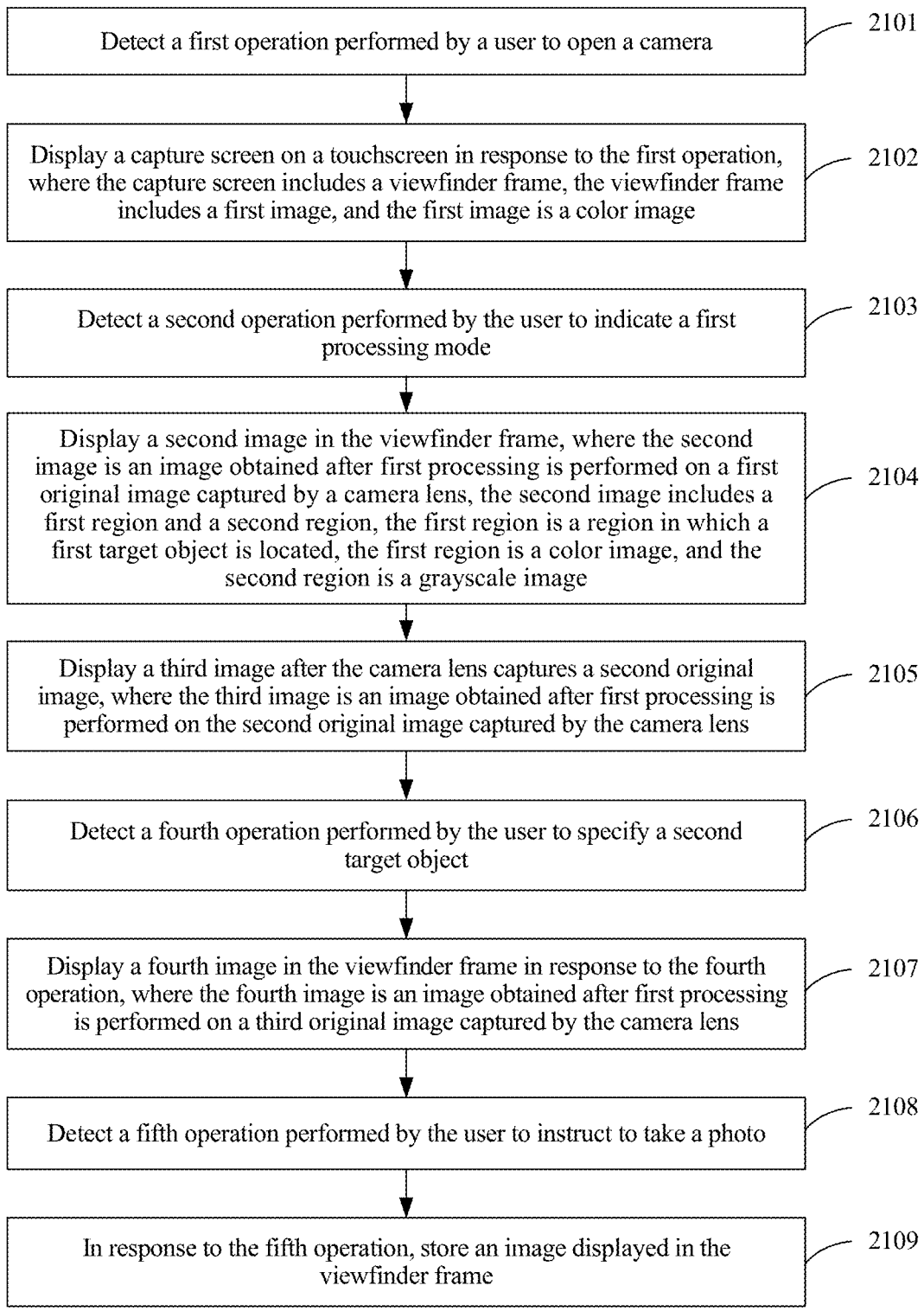
FIG. 22 is a flowchart of another method for displaying an image according to an embodiment of this application.

In another embodiment, referring to FIG. 22, after step 2104, the method may further include the following step:

2105. The electronic device displays a third image in the viewfinder frame after the camera lens captures a second original image, where the third image is an image obtained after first processing is performed on the second original image.

The third image includes a third region and a fourth region, the third region is a region in which the first target object is located on the third image, and the fourth region is a region other than the third region on the third image. The third region is a color image, the fourth region is a grayscale image, an image in the third region is the same as an image in a region in which the first target object is located on the second original image, and an image in the fourth region is an image obtained after grayscale processing is performed on an image in a region other than the region in which the first target object is located on the second original image.

For example, the second image may be an image shown in (b) in FIG. 9A and FIG. 9B, and the third image may be an image shown in FIG. 13. On the image shown in FIG. 13, the third region is regions in which basketball players are located, and the fourth region is a region other than the regions in which the basketball players are located.

In other words, the electronic device may perform color retention processing based on an original image captured by the camera lens in real time, and display, in the viewfinder frame in real time, an image obtained after the color retention processing. Details are not described herein again.

In another embodiment, the method may further include the following steps.

2106. The electronic device detects a fourth operation performed by the user to specify a second target object, where the second target object is one or more body types, or the second target object is one or more bodies.

Figure 14:
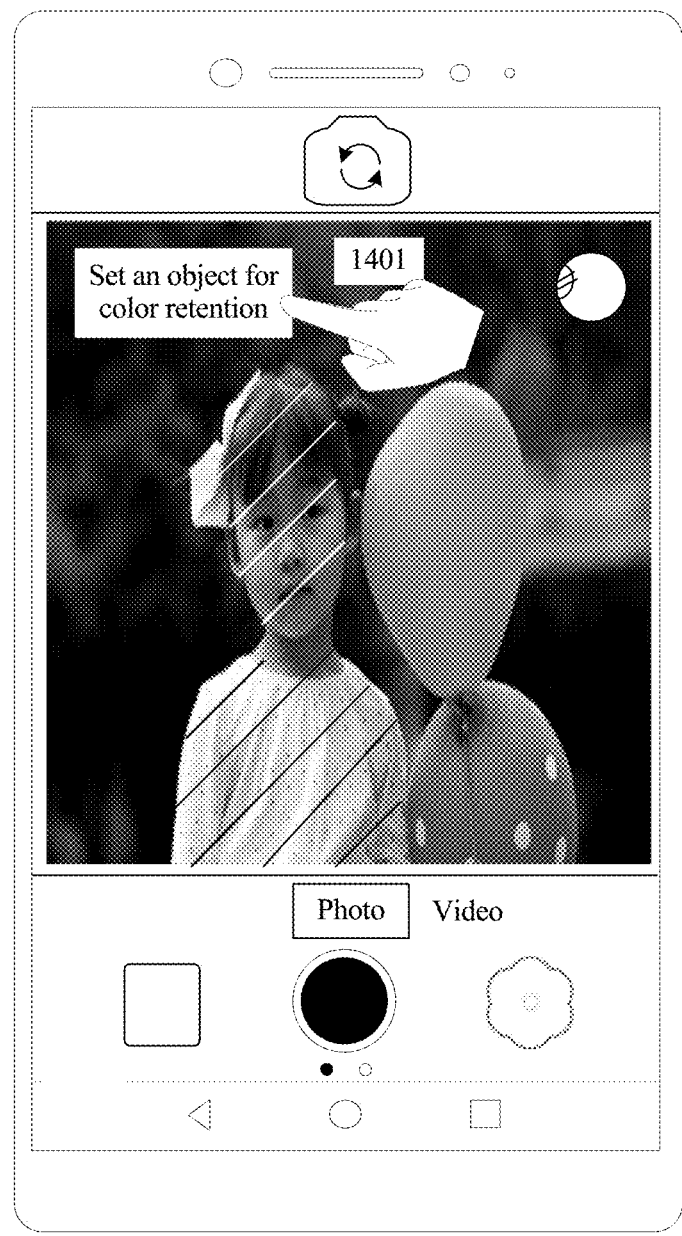
FIG. 14 is a schematic diagram of another display interface according to an embodiment of this application.

For example, the fourth operation may be an operation that the user taps a control 1401 shown in FIG. 14, and an operation performed by the user to specify a target object in FIG. 12A, FIG. 12B, and FIG. 12C.

2107. The electronic device displays a fourth image in the viewfinder frame in response to the fourth operation, where the fourth image is an image obtained after first processing is performed on a third original image captured by the camera lens.

The fourth image includes a fifth region and a sixth region, the fifth region is a region in which the second target object is located, and the sixth region is a region other than the fifth region. The fifth region is a color image, and the sixth region is a grayscale image. An image in the fifth region is the same as an image in a region in which the second target object is located on the third original image, and an image in the sixth region is an image obtained after grayscale processing is performed on an image in a region other than the region in which the second target object is located on the third original image.

For example, the first target object is people, and the second image may be an image shown in (b) in FIG. 9A and FIG. 9B. The second target object is people and balloons, the fourth image may be an image (excluding text information 1001) shown in FIG. 10, the fifth region is regions in which the girl and the balloons are located, and the sixth region is a region other than the regions in which the girl and the balloons are located.

In another embodiment, the method may further include the following steps.

2108. The electronic device detects a fifth operation performed by the user to instruct to take a photo.

For example, the fifth operation may be an operation that the user taps a photographing control 407.

2109. In response to the fifth operation, the electronic device stores an image displayed in the viewfinder frame.

Step 2108 may include: detecting, by the electronic device, the fifth operation performed by the user to instruct to take a photo in a video shooting mode or a continuous capture mode. Step 2109 may include: in response to the fifth operation, storing, by the electronic device, a plurality of frames of images displayed in the viewfinder frame in a photographing process, where the plurality of frames of images are images obtained after a plurality of original images captured by the camera lens are processed.

For example, referring to FIG. 15A-1 and FIG A-2, in the video shooting process, the electronic device stores an image obtained after the color retention processing after entering the color retention mode.

In another embodiment, before step 2103, the method may further include the following step: 2110. The electronic device detects a sixth operation performed by the user to instruct to shoot a video; and in response to the sixth operation, the electronic device displays, in the viewfinder frame, color images captured by the camera lens in a video shooting process, and stores the color images. Step 2103 may specifically include: in response to the second operation, displaying, in the viewfinder frame in a subsequent video shooting process, the second image obtained after each frame of original image captured by the camera lens is processed. Subsequently, the method may further include: storing, by the electronic device, a plurality of frames of images displayed in the viewfinder frame in the video recording process.

Figures 1, 15B:
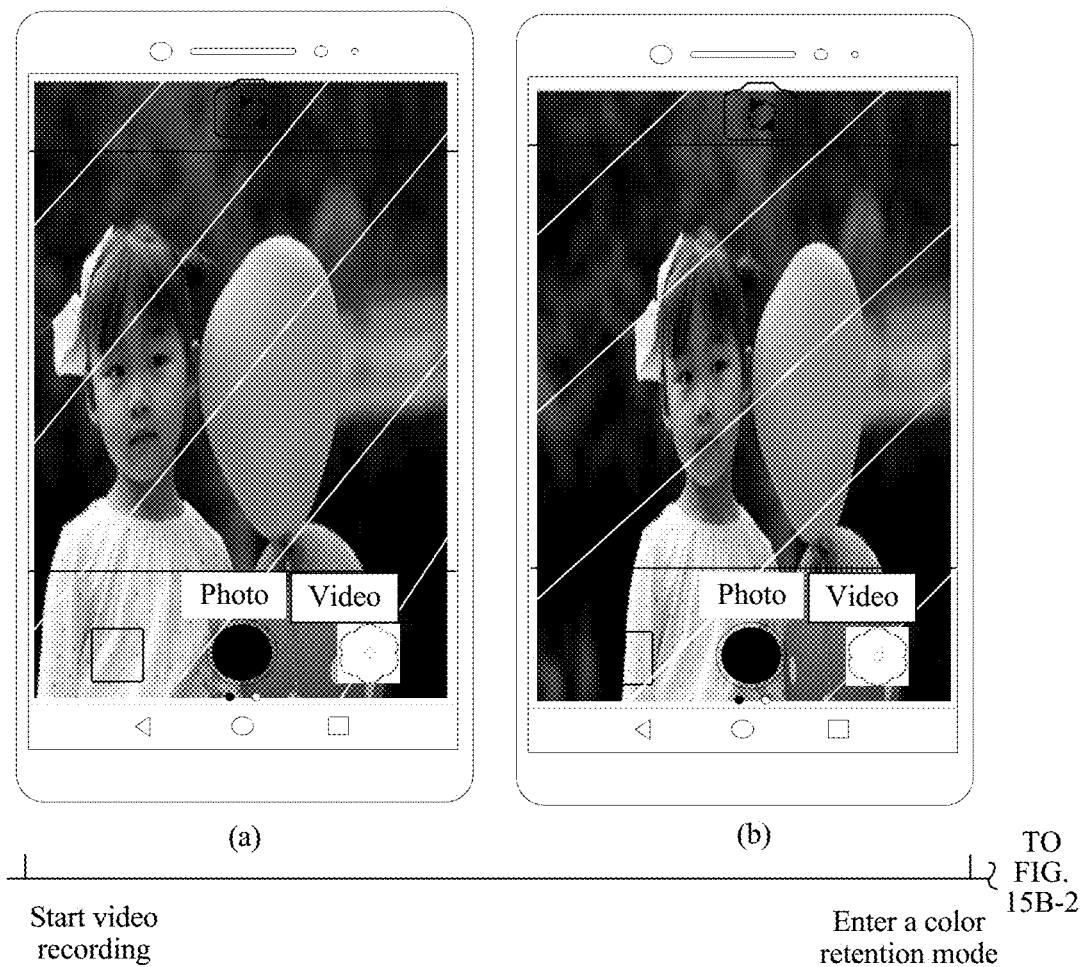
Figures 2, 15B:

For example, referring to FIG. 15B-1 and FIG. 15B-2, when starting to record a video, the electronic device stores color images. After entering the color retention mode, the electronic device stores images obtained after the color retention processing. The video shot by the electronic device includes two types of images.

Figure 24:
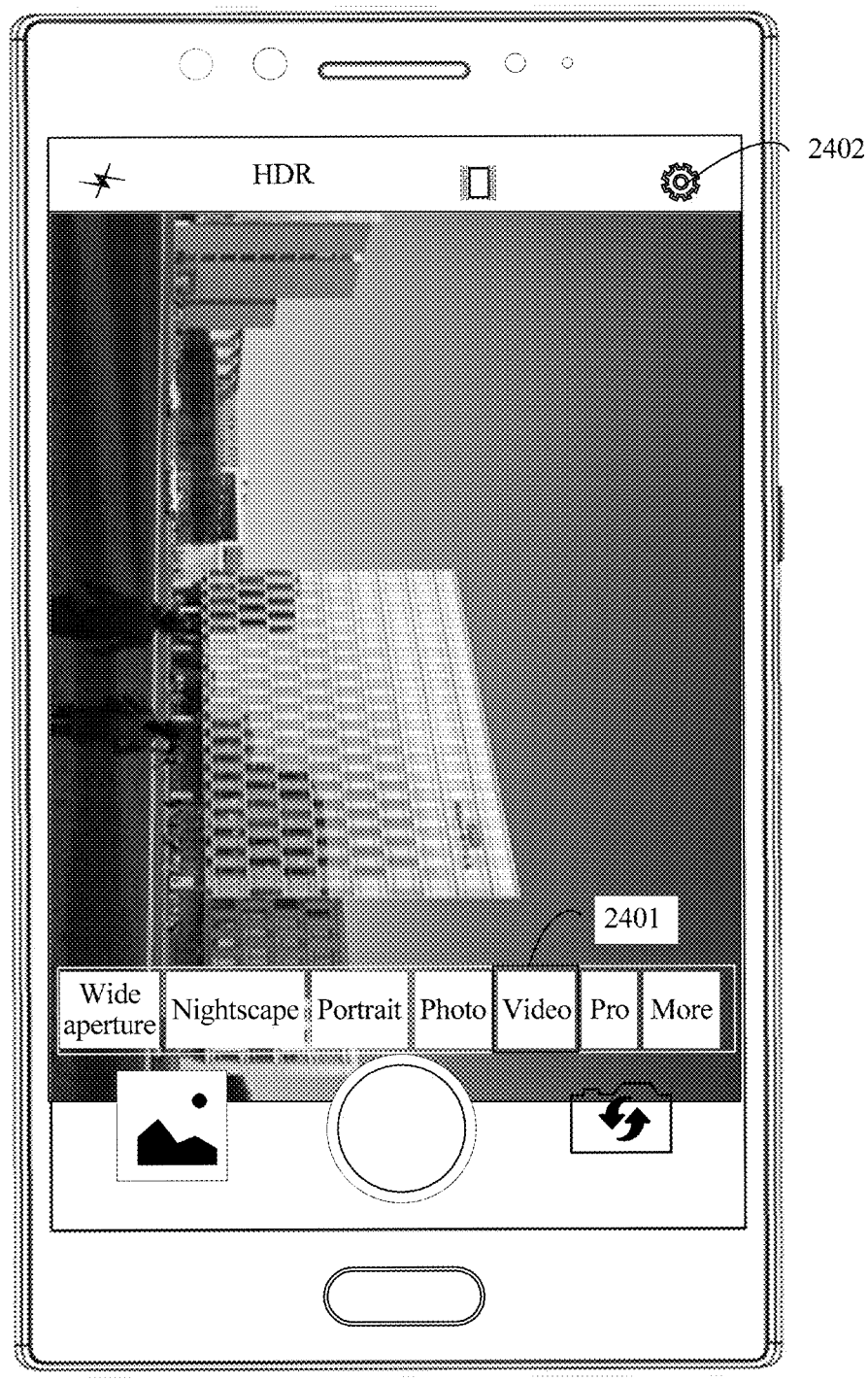
FIG. 24 is a schematic diagram of another display interface according to an embodiment of this application.

In another embodiment of this application, after the mobile phone detects that the user taps the icon 402 shown in (a) in FIG. 4, the mobile phone may display a capture screen shown in FIG. 24, and display a preview image based on currently specified image resolution. For example, the currently specified image resolution may be 4:3 or 18:9, where 4:3 and 18:9 each indicate a pixel ratio of a length to a width of an image. After the mobile phone detects an operation that the user taps the control 2401 used to indicate a video recording mode, the mobile phone enters the video recording mode.

In the video recording mode, the user may switch the currently specified image resolution to 21:9, to record a video with image resolution of 21:9.

Figure 25A:
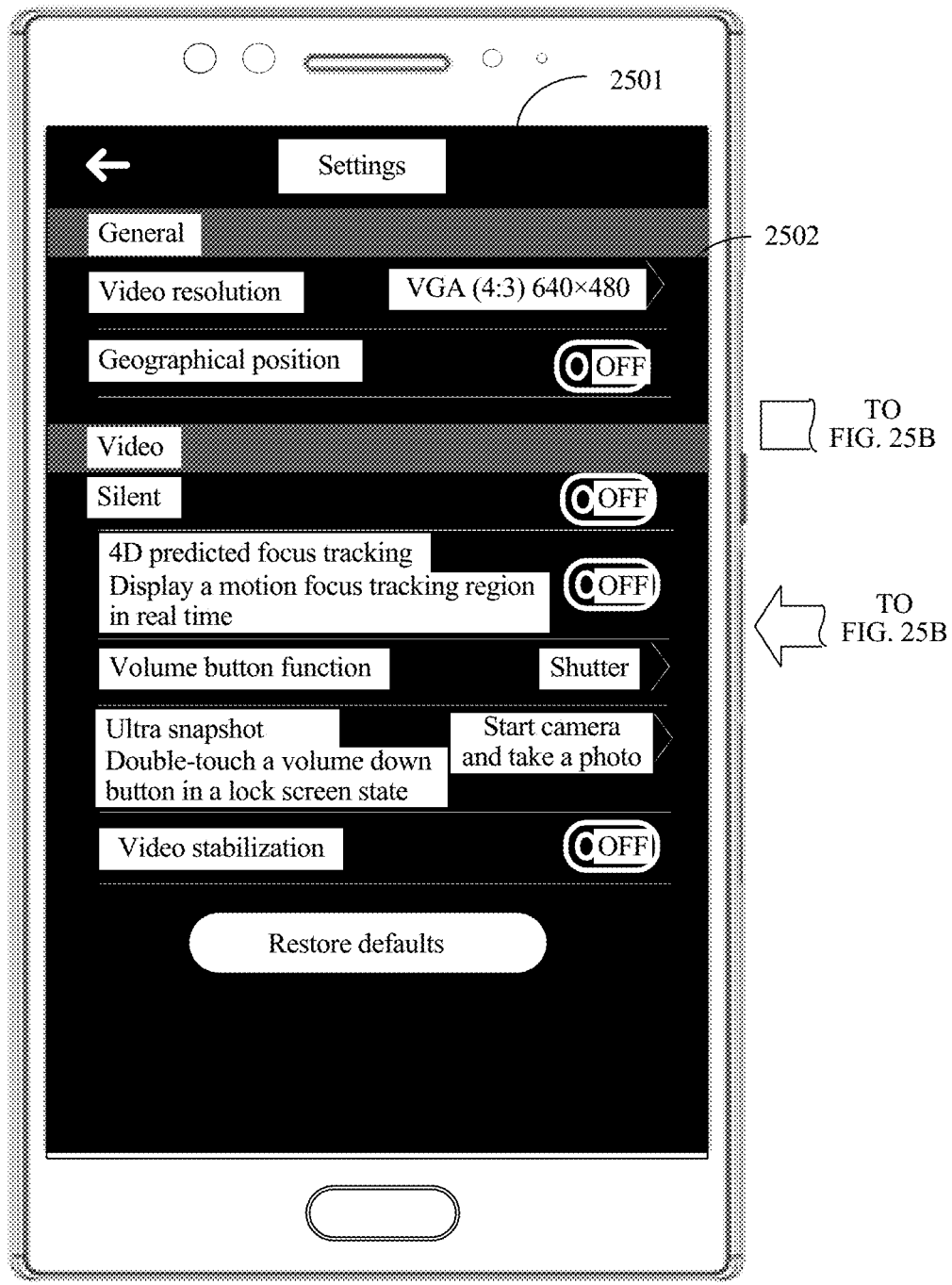
FIG. 25A and FIG. 25B are a schematic diagram of another display interface according to an embodiment of this application.
Figure 25B:
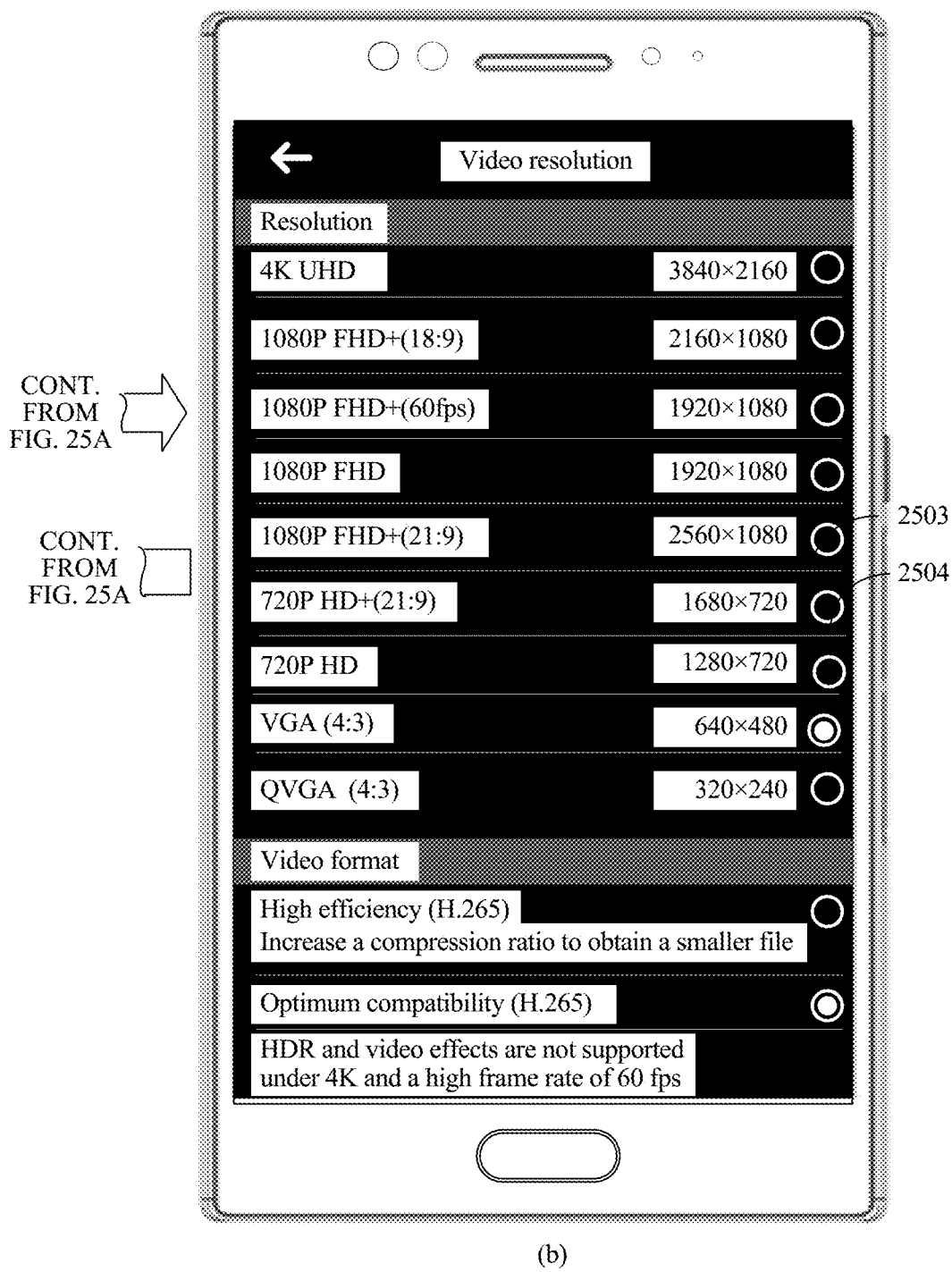
Figure 26:
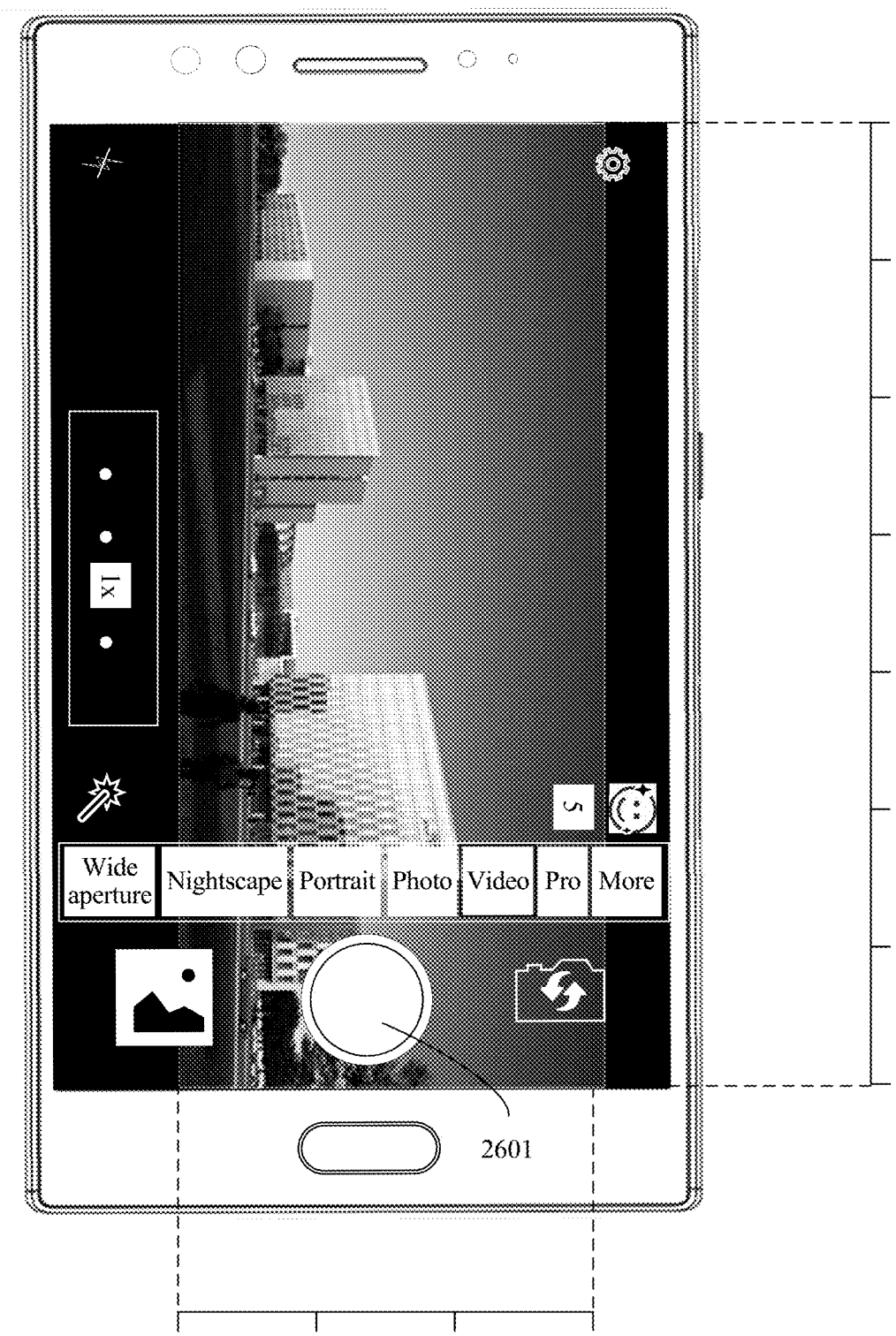
FIG. 26 is a schematic diagram of another display interface according to an embodiment of this application.

For example, after the mobile phone detects an operation that the user taps a setting control 2402 shown in FIG. 24, the mobile phone may display a setting interface 2501 shown in (a) in FIG. 25A and FIG. 25B. After the mobile phone detects that the user taps a control 2502 used to set video resolution, the mobile phone may display a video resolution interface shown in (b) in FIG. 25A and FIG. 25B. After the mobile phone detects that the user taps a control (for example, a control 2503 or a control 2504) used to indicate the resolution 21:9, as shown in FIG. 26, the mobile phone may display a preview image with the resolution of 21:9 in a preview state. It can be learned, by making a comparison with a preview image displayed by the mobile phone in FIG. 24, that a width of the preview image displayed by the mobile phone in FIG. 26 is reduced, a length of the preview image displayed by the mobile phone in FIG. 26 is increased, and a ratio of the length to the width of the image is 21:9.

Figure 27:
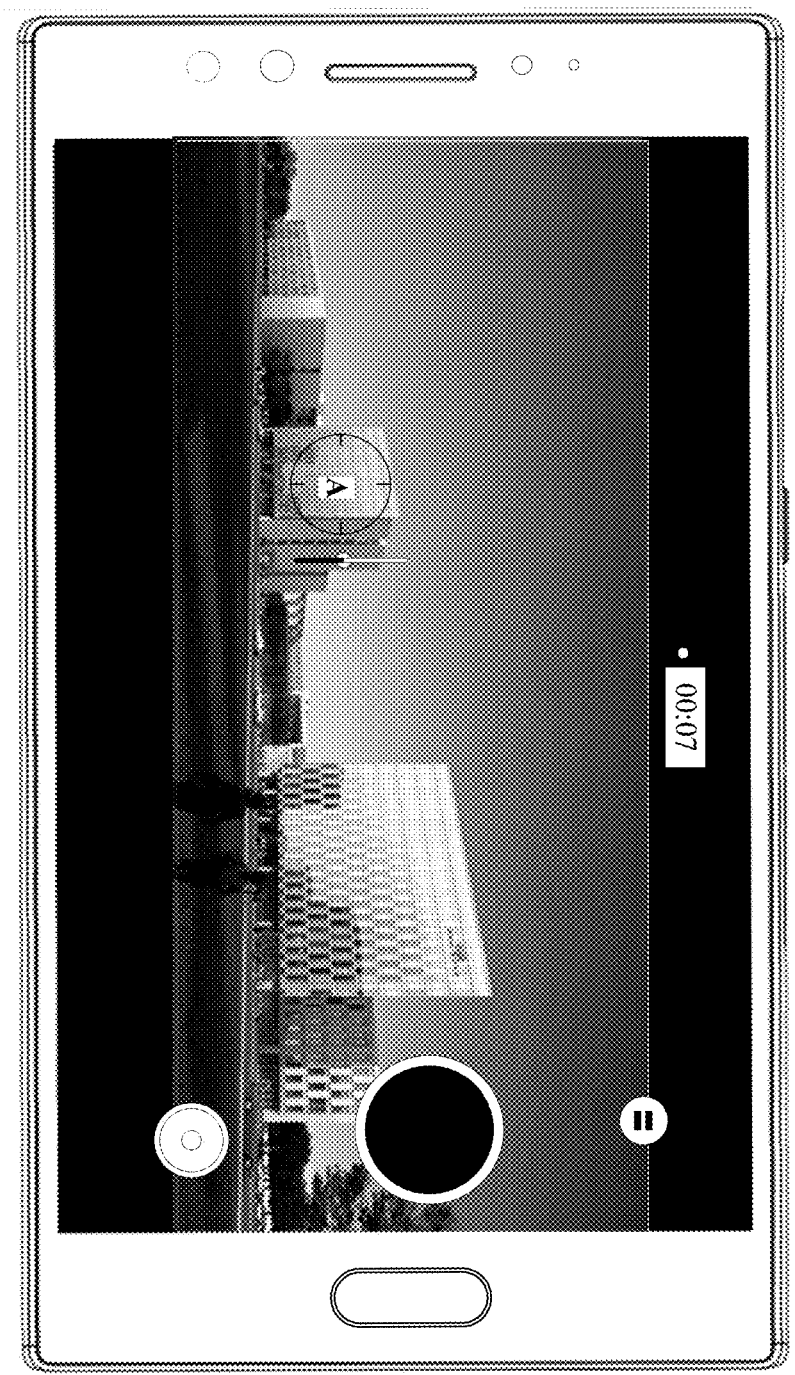
FIG. 27 is a schematic diagram of another display interface according to an embodiment of this application.

After the mobile phone detects an operation that the user taps a photographing control 2601 in FIG. 26, the mobile phone starts to record a video. Referring to FIG. 27, in a video recording process, resolution of each frame of image in a video recorded by the mobile phone is 21:9.

It may be understood that to implement the foregoing functions, the electronic device includes corresponding hardware and/or software modules for performing the functions. Algorithm steps in the examples described with reference to the embodiments disclosed in this specification can be implemented by hardware or a combination of hardware and computer software in this application. Whether a function is implemented by hardware or in a manner of driving hardware by a computer software depends on a particular application and a design constraint of the technical solution. A person skilled in the art may use a different method to implement the described functions for each particular application, but it should not be considered that the implementation goes beyond the scope of this application.

In the embodiments, function modules of the electronic device may be divided based on the foregoing method example. For example, each function module may be divided according to each function, or two or more functions may be integrated into one processing module. The integrated module may be implemented in a form of hardware. It should be noted that, the module division in the embodiments is an example and is only logical function division. There may be another division manner in actual implementation.

Figure 23:
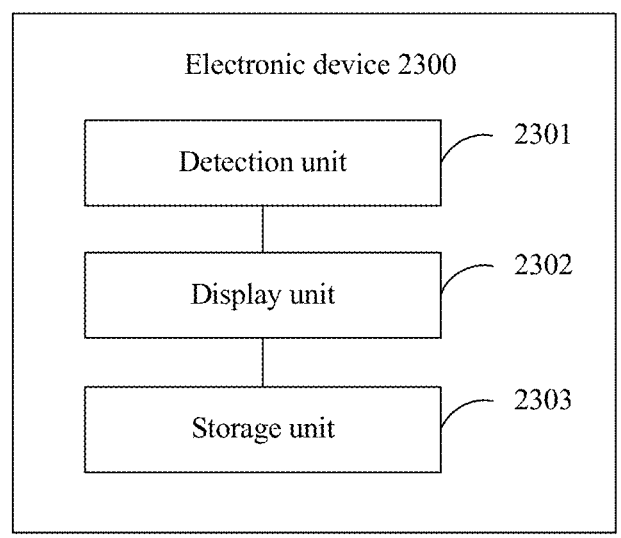
FIG. 23 is a schematic structural diagram of another electronic device according to an embodiment of this application.

When function modules are obtained through division by using corresponding functions, FIG. 23 is a schematic diagram of possible composition of an electronic device 2300 according to an embodiment. As shown in FIG. 23, the electronic device 2300 may include a detection unit 2301, a display unit 2302, and a storage unit 2303.

The detection unit 2301 may be configured to support the electronic device 2300 in performing step 2101, step 2103, step 2106, step 2108, and/or another process used for a technology described in this specification.

The display unit 2302 may be configured to support the electronic device 2300 in performing step 2102, step 2104, step 2105, step 2107, and/or another process used for a technology described in this specification.

The storage unit 2303 may be configured to support the electronic device 2300 in performing step 2109 and/or another process used for a technology described in this specification.

It should be noted that all related content of the steps in the method embodiment can be incorporated into the descriptions of the functions of the corresponding function modules by reference. Details are not described herein again.

The electronic device provided in this embodiment is configured to perform the method for displaying an image. Effects that are the same as those of the foregoing implementation method can be achieved.

When an integrated unit is used, the electronic device may include a processing module, a storage module, and a communications module. The processing module may be configured to control and manage actions of the electronic device, for example, may be configured to support the electronic device in performing the steps performed by the detection unit 2301 and the display unit 2302. The storage module may be configured to: support the electronic device in performing the steps performed by the storage unit 2303, and store program code, data, and the like. The communications module may be configured to support communication between the electronic device and another device.

The processing module may be a processor or a controller. The processing module may implement or execute various example logical blocks, modules, and circuits described with reference to content disclosed in this application. Alternatively, the processor may be a combination of processors implementing a calculation function, for example, a combination of one or more microprocessors, or a combination of a digital signal processor (DSP) and a microprocessor. The storage module may be a memory. The communications module may be specifically a device that interacts with another electronic device, for example, a radio frequency circuit, a Bluetooth chip, or a Wi-Fi chip.

In an embodiment, when the processing module is a processor and the storage module is a memory, the electronic device in this embodiment may be a device in the structure shown in FIG. 2.

An embodiment further provides a computer storage medium. The computer storage medium stores a computer instruction, and when the computer instruction runs on an electronic device, the electronic device is enabled to perform the related method steps, to implement the method for displaying an image in the foregoing embodiment.

An embodiment further provides a computer program product. When the computer program product runs on a computer, the computer performs the related steps, to implement the method for displaying an image in the foregoing embodiment.

In addition, an embodiment of this application further provides an apparatus. The apparatus may be specifically a chip, a component, or a module. The apparatus may include a processor and a memory that are connected. The memory is configured to store a computer executable instruction, and when the apparatus runs, the processor may execute the computer executable instruction stored in the memory, so that the chip performs the method for displaying an image in the method embodiment.

The electronic device, the computer storage medium, the computer program product, or the chip provided in the embodiments may be configured to perform the corresponding method provided above. Therefore, for beneficial effects that can be achieved, refer to the beneficial effects of the corresponding method provided above. Details are not described herein again.

The foregoing descriptions of implementations allow a person skilled in the art to understand that, for the purpose of convenient and brief description, division of the foregoing function modules is merely used as an example for illustration. In actual application, the foregoing functions can be allocated to different modules for implementation according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The foregoing storage medium includes any medium that can store program code, for example, a USB flash drive, a removable hard disk, a read only memory (read only Memory, ROM), a random access memory (random access memory, RAM), a magnetic disk, or an optical disc.

The foregoing content is merely a specific implementation of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for generating an image using an electronic device having a color camera, comprising:
    activating the color camera and a camera application on the electronic device;
    activating a video recording function;
    capturing a first original color image by the color camera;
    determining, automatically, whether the first original color image includes an image of a first object;
    dividing, in response to a determination that the first original color image includes the image of the first object, the first original color image into a first region associated with the first object and a second region that does not include the first object
    generating a first image based on the first original color image by keeping color pixels of the first region and converting color pixels of the second region to grayscale pixels;
    displaying, through the camera application, the first image, wherein the first image includes a color region associated with the first object and a grayscale region that does not include the first object;
    displaying, through the camera application and in response to a determination that the first original color image does not include any image of the first object, a second image generated based on the first original color image, wherein the second image is a grayscale image; and
    generating, in response to a user input, a video including at least one of the first image or the second image.

2. The method of claim 1, wherein the first object is a human.

3. The method of claim 1, further comprising activing a color retention mode of the camera application.

4. The method of claim 3, further comprising:
    receiving a user input for capturing an image generated by the color camera in the color retention mode;
    capturing a second original color image by the color camera;
    determining, automatically, whether the second original color image includes an image of the first object;
    dividing, in response to a determination that the second original color image includes the image of the first object, the second original color image into a region associated with the first object and a region that does not include the first object;
    generating a target image based on the second original color image by keeping color pixels of the region associated with the first object and converting color pixels of the region that does not include the first object to grayscale pixels; and
    saving the target image, wherein the target image includes a color region associated with the first object and a grayscale region that does not include the first object.

5. The method of claim 3, further comprising:
    displaying, through the camera application, a target image for editing by a user; and
    editing the target image in the color retention mode.

6. The method of claim 1, further comprising:
    activating a first mode of the camera application;
    recording a video in the first mode based on color images generated by the color camera;
    switching the camera application from the first mode to a second mode while the video is being recorded; and
    continuing the recording of the video in the second mode, a portion of the video recorded in the second mode including at least one of the first image or the first original color image.

7. The method of claim 1, further comprising:
    determining, in the first original color image, a selected object based on a user input; and
    displaying, through the camera application, a fourth image generated by the color camera, wherein the fourth image includes a color region associated with the selected object and a grayscale region that does not include the selected object.

8. The method of claim 1, further comprising:
    determining the first original color image includes images of the first object and a second object;
    determining a preset priority of the first object is greater than a preset priority of the second object; and
    displaying a fifth image generated by the color camera, wherein the fifth image includes a color region associated with the first object and a grayscale region associated with the second object.

9. The method of claim 1, further comprising:
    determining the image of the first object is at a center of the first original color image; and
    displaying, through the camera application, a sixth image generated by the color camera, wherein the sixth image includes a first region at the center of the first original color image associated with the first object and a second region associated with objects that are not the first object, wherein the first region being color and the second region being grayscale.

10. A mobile device, including computer-executable instructions, that when executed by a processor, cause the processor to carry out at least the following operation:
    activating a color camera and a camera application on an electronic device;
    activating a video recording function;
    capturing a first original color image by the color camera;
    determining, automatically, whether the first original color image includes an image of a first object;
    dividing, in response to a determination that the first original color image includes the image of the first object, the first original color image into a first region associated with the first object and a second region that does not include the first object;
    generating a first image based on the first original color image by keeping color pixels of the first region and converting color pixels of the second region to grayscale pixels;
    displaying, through the camera application, the first image, wherein the first image includes a color region associated with the first object and a grayscale region that does not include the first object;
    displaying, through the camera application and in response to a determination that the first original color image does not include any image of the first object, a second image generated based on the first original color image, wherein the second image is a grayscale image; and
    generating, in response to a user input, a video including at least one of the first image or the second image.

11. The mobile device of claim 10, wherein the computer-executable instructions further cause the processor to carry out activing a color retention mode of the camera application.

12. The mobile device of claim 11, wherein the computer-executable instructions further cause the processor to carry out:
- receiving a user input for capturing an image generated by the color camera in the color retention mode;
- capturing a second original color image by the color camera;
- determining, automatically, whether the second original color image includes an image of the first object;
- dividing, in response to a determination that the second original color image includes the image of the first object, the second original color image into a region associated with the first object and a region that does not include the first object;
- generating a target image based on the second original color image by keeping color pixels of the region associated with the first object and converting color pixels of the region that does not include the first object to grayscale pixels; and
- saving the target image, wherein the target image includes a color region associated with the first object and a grayscale region that does not include the first object.

13. The mobile device of claim 11, wherein the computer-executable instructions further cause the processor to carry out:
- displaying, through the camera application, a target image for editing by a user; and
- editing the target image in the color retention mode.

14. The mobile device of claim 10, wherein the computer-executable instructions further cause the processor to carry out:
- activating a first mode of the camera application;
- recording a video in the first mode based on color images generated by the color camera;
- switching the camera application from the first mode to a second mode while the video is being recorded; and
- continuing the recording of the video in the second mode, wherein a portion of the video recorded in the second mode includes at least one of the first image or the first original color image.

15. The mobile device of claim 10, wherein the computer-executable instructions further cause the processor to carry out:
- determining, in the first original color image, a selected object based on a user input; and
- displaying, through the camera application, a fourth image generated by the color camera, wherein the fourth image includes a color region associated with the selected object and a grayscale region that does not include the selected object.

16. The mobile device of claim 10, wherein the computer-executable instructions further cause the processor to carry out:
- determining the first original color image includes images of the first object and a second object;
- determining a preset priority of the first object is greater than a preset priority of the second object; and
- displaying a fifth image generated by the color camera, wherein the fifth image includes a color region associated with the first object and a grayscale region associated with the second object.

17. The mobile device of claim 10, wherein the computer-executable instructions further cause the processor to carry out:
- determining the image of the first object is at a center of the first original color image; and
- displaying, through the camera application, a sixth image generated by the color camera, wherein the sixth image includes a first region at the center of the first original color image associated with the first object and a second region associated with objects that are not the first object, and wherein the first region being color and the second region being grayscale.

18. The mobile device of claim 10, wherein the first object is a human.

* * * * *